(12) United States Patent
Zhou et al.

(10) Patent No.: US 11,223,039 B2
(45) Date of Patent: Jan. 11, 2022

(54) ANODES FOR SODIUM-ION BATTERIES

(71) Applicant: UNIVERSITY OF SOUTHERN CALIFORNIA, Los Angeles, CA (US)

(72) Inventors: Chongwu Zhou, Arcadia, CA (US);
Xuan Cao, Los Angeles, CA (US);
Qingzhou Liu, Los Angeles, CA (US);
Yihang Liu, Pasadena, CA (US);
Yuqiang Ma, Los Angeles, CA (US);
Chenfei Shen, Los Angeles, CA (US);
Liang Chen, Los Angeles, CA (US);
Anyi Zhang, Los Angeles, CA (US);
Paul David Asimow, South Pasadena, CA (US)

(73) Assignees: University of Southern California, Los Angeles, CA (US); California Institute of Technology, Pasadena, CA (US)

( * ) Notice: Subject to any disclaimer, the term of this patent is extended or adjusted under 35 U.S.C. 154(b) by 23 days.

(21) Appl. No.: 16/418,506

(22) Filed: May 21, 2019

(65) Prior Publication Data
US 2019/0355976 A1    Nov. 21, 2019

Related U.S. Application Data

(60) Provisional application No. 62/674,218, filed on May 21, 2018, provisional application No. 62/694,671, filed on Jul. 6, 2018.

(51) Int. Cl.
*H01M 4/00* (2006.01)
*H01M 4/1393* (2010.01)
(Continued)

(52) U.S. Cl.
CPC ....... *H01M 4/1393* (2013.01); *H01M 4/0471* (2013.01); *H01M 4/133* (2013.01);
(Continued)

(58) Field of Classification Search
CPC ...... H01M 4/38; H01M 4/139; H01M 10/054; H01M 4/0404; H01M 4/0471
See application file for complete search history.

(56) References Cited

U.S. PATENT DOCUMENTS

| 6,872,492 B2 | 3/2005 | Barker et al. |
| 2017/0214035 A1* | 7/2017 | Xu ........................ H01M 4/382 |
| 2019/0062161 A1* | 2/2019 | Chang ................ H01M 4/5805 |

OTHER PUBLICATIONS

Liu, Y. et al., "Red Phosphorus Nanodots on Reduced Graphene Oxide as a Flexible and Uitra-Fast Anode for Sodium-Ion Batteries," ACS Nano (2017), 11 (6), pp. 5530-5537.
(Continued)

*Primary Examiner* — Cynthia H Kelly
*Assistant Examiner* — Monique M Wills
(74) *Attorney, Agent, or Firm* — Brooks Kushman P.C.

(57) ABSTRACT

A method for forming an anode of a sodium ion battery includes a step of heat treating the red phosphorus precursor and reduced graphene oxide powder at a first temperature that vaporizes the red phosphorus precursor such that red phosphorus structures grow on the reduced graphene oxide powder. Another method for forming an anode of a sodium ion battery includes steps of placing a red phosphorus precursor and a graphene oxide precursor in a reaction chamber; establishing a reducing environment in the reaction chamber; and heating the red phosphorus precursor and a graphene oxide precursor to a first temperature that is sufficient temperature to form a composite of red phosphorus and reduced graphene oxide. Characteristically, red phosphorus deposition and graphene oxide reduction are completed simultaneously in a single-step heat treatment. A method for making a black phosphorus-composite for sodium-ion batter anodes is also provided.

20 Claims, 41 Drawing Sheets

(51) Int. Cl.
*H01M 10/054* (2010.01)
*H01M 4/04* (2006.01)
*H01M 4/133* (2010.01)
*H01M 4/587* (2010.01)
*H01M 4/02* (2006.01)

(52) U.S. Cl.
CPC ......... *H01M 4/587* (2013.01); *H01M 10/054* (2013.01); *H01M 2004/027* (2013.01)

(56) References Cited

OTHER PUBLICATIONS

Liu, Y. et al., "Room-Temperature Pressure Synthesis of Layered Black Phosphorus-Graphene Composite with Sodium-Ion Battery Anodes," ACS Nano (2018), 12 (8), pp. 8323-8329.

Li, X. et al., "Synthesis of thin-film black phosphorus on a flexible substrate," 2D Materials, Letter, published Aug. 6, 2015, 6 pgs (downloaded from IOPscience).

* cited by examiner

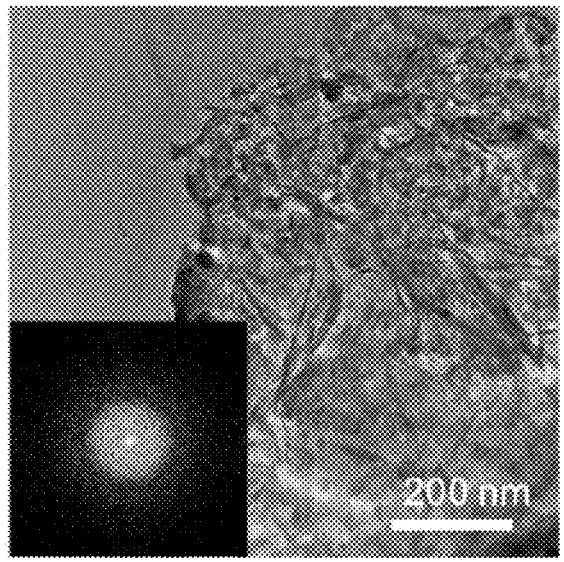
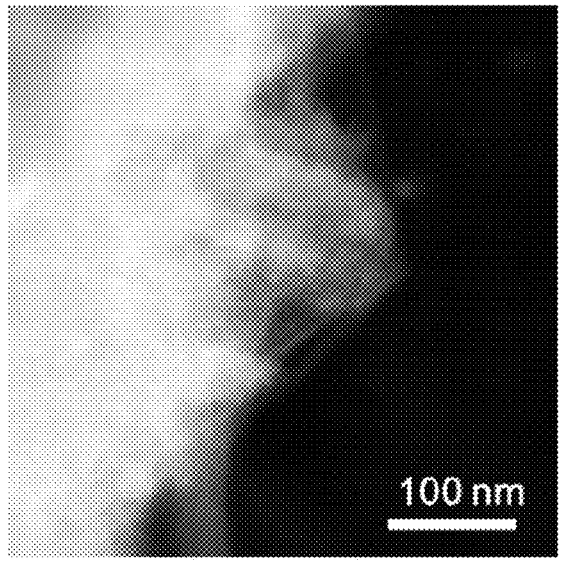
Fig. 18A
Fig. 18B
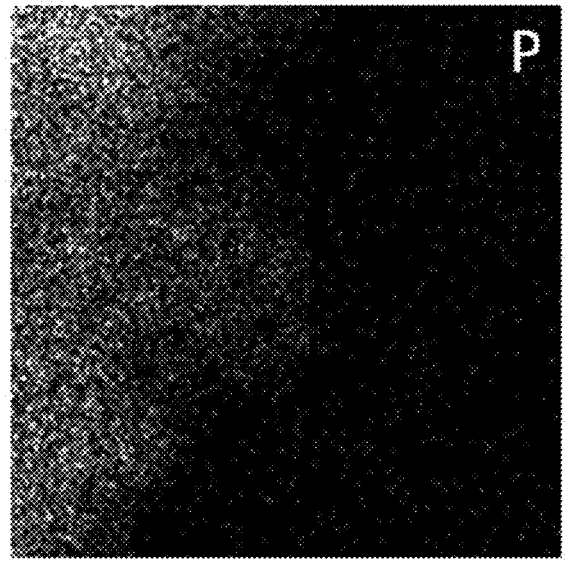
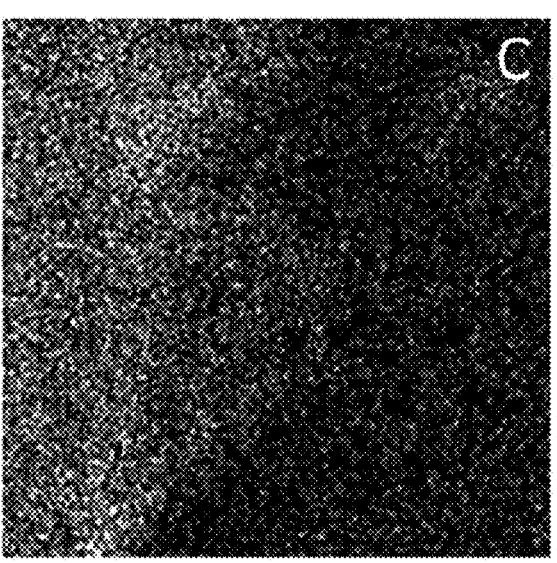
Fig. 18C
Fig. 18D

ANODES FOR SODIUM-ION BATTERIES

CROSS-REFERENCE TO RELATED APPLICATIONS

This application claims the benefit of U.S. provisional application Ser. No. 62/674,218 filed May 21, 2018 and U.S. provisional application Ser. No. 62/694,671 filed Jul. 6, 2018; the disclosures of which are hereby incorporated in their entirety by reference herein.

TECHNICAL FIELD

In at least one aspect, the present invention relates to sodium-ion batteries, and in particular, to sodium-ion batteries having anodes that include red phosphorus. In another aspect, the present invention relates to sodium-ion batteries having anodes that include black phosphorus.

BACKGROUND

Red phosphorus (RP) has attracted considerable attention as the anode for high-performance Na-ion batteries, owing to its low cost and high theoretical specific capacity of 2,600 mAh/g.

In energy storage technology, lithium-ion batteries have dominant power supply of portable devices and electrical vehicle due to its high energy density and stable cycling performance. The looming cost and environmental limits of this promising battery system has led to an exploration of several alternative strategies, such as sodium-ion battery. However, the anode part becomes the main drawback of sodium-ion batteries because the typical graphite anode employed in lithium-ion batteries does not intercalate with sodium ions thermodynamically; this problem is related to the larger size of the sodium ions, and thus makes it impossible to simply adopt the recent knowledge developed for high performance lithium-ion batteries directly onto sodium-ion chemistry. Recently, anode materials for sodium-ion batteries that have been investigated include metal oxides, alloys, two-dimensional compounds, and carbonaceous materials. Phosphorus offers much promise because it alloys with sodium at a high specific capacity of 2596 mAh/g when $Na_3P$ is formed. Due to the unstable property and toxicity of white phosphorus, black phosphorus and red phosphorus are the two major forms explored for sodium-ion storage. Thanks to the high conductance and the two-dimensional material nature, several promising studies of black phosphorus were reported with stable high capacity with impressive rate capability up to 10 C charge/discharge rate were reported. However, the intrinsic challenges stemming from the high cost and sophisticated synthesis of black phosphorus promote red phosphorus to a better position in sodium-ion chemistry. Recently, several red phosphorus anodes developed with ball-milling technique and carbonaceous scaffold were presented to solve the poor conductivity, slow sodium ion transport kinetics, and large volume variation during cycling. On the other hand, due to the rising importance of the wearable electronics, flexible power sources employing free-standing electrodes using carbon nanotube, carbon nanofiber, carbon cloth, and graphene-based flexible electrodes frames have attracted a lot of interest for both lithium-ion and sodium-ion batteries. Therefore, there is great importance to combine red phosphorus with carbonaceous material-based flexible platforms, such as graphene free-standing film.

Accordingly, there is a need for improved methods for forming battery anodes that include red phosphorus.

SUMMARY

In at least one aspect of the present invention method to deposit red phosphorus nanodots densely and uniformly onto reduced graphene oxide sheets (P@RGO) to minimize the sodium ion diffusion length and the sodiation/desodiation stresses, and the RGO network also serves as electron pathway and creates free space to accommodate the volume variation of phosphorus particles. The resulted P@RGO flexible anode achieved 1165.4, 510.6, and 135.3 mAh/g specific charge capacity at 159.4, 31878.9, and 47818.3 mA/g charge/discharge current density in rate capability test, and a 914 mAh/g capacity after 300 deep cycles in cycling stability test at 1593.9 mA/g current density, which marks a significant performance improvement for red phosphorus anodes for sodium-ion chemistry and flexible power sources for wearable electronics.

In another aspect, a facile single-step flash-heat treatment was developed to achieve the reduction of graphene oxide (GO) and the simultaneous deposition of RP onto the reduced graphene oxide (rGO) sheets is provided. The resulting RP/rGO composite was shown to be a promising candidate for overcoming the issues associated with the poor electronic conductivity and large volume variation of RP during cycling. The RP/rGO flexible film anode delivered an average capacity of 1,625 mAh/g during 200 cycles at a charge/discharge current density of 1 A/g. Average charge capacities of 1,786, 1,597, 1,324, and 679 mAh/g at 1, 2, 4, and 6 A/g current densities were obtained in the rate capability tests. Moreover, owing to the RP component, the RP/rGO film presented superior flame retardancy compared to an rGO film. This work thus introduces a highly accessible synthesis method to prepare flexible and safe RP anodes with superior electrochemical performance toward Na-ion storage.

In another aspect, a method for forming a black phosphorus-containing anode to be used in a sodium ion battery is provided. The method includes a step of arranging red phosphorus powder and graphene oxide powder in a layered structure having alternating layers of phosphorus powder and graphene oxide. The layered structure is heat treated at a first temperature to form a red phosphorus/reduced graphene oxide combination film. The red phosphorus/reduced graphene oxide combination film is then placed on a substrate. A pressure is applied to the red phosphorus/reduced graphene oxide combination film that is sufficient to convert the red phosphorus to black phosphorus such that a black phosphorus/reduced graphene oxide combination film is formed. Characteristically, the pressure is greater than or equal to about 5 GPa. The pressure is typically applied with the red phosphorus/reduced graphene oxide combination being at a second temperature of about 20 to 40 degrees C. Typically, the substrate is a metal sheet or metal foil that is used as a current collector in a battery.

In another aspect, an anode for sodium ion batteries formed by the methods disclosed herein is provided.

In yet another aspect, a sodium ion battery using the anodes disclosed herein is provided. The sodium ion battery includes an electrolyte disposed in a container, a cathode at least partially immersed in the electrolyte, and an anode at least partially immersed in the electrolyte, wherein the anode includes a component selected from the group consisting of a red phosphorus-reduced graphene oxide composite having red phosphorus nanodots disposed over reduced graphene oxide substrates, a layered black phosphorus graphene composite, a layered black phosphorus graphene composite, and combinations thereof.

BRIEF DESCRIPTION OF THE DRAWINGS

FIGS. 18A, 18B, 18C, and 18D. TEM results for the post-cycling BP/rGO anode: (A) TEM image with FFT inset; (B) STEM image; (C) EDS map of phosphorus X-ray intensity; (D) EDS map of carbon X-ray intensity.

DETAILED DESCRIPTION

Figure 1:
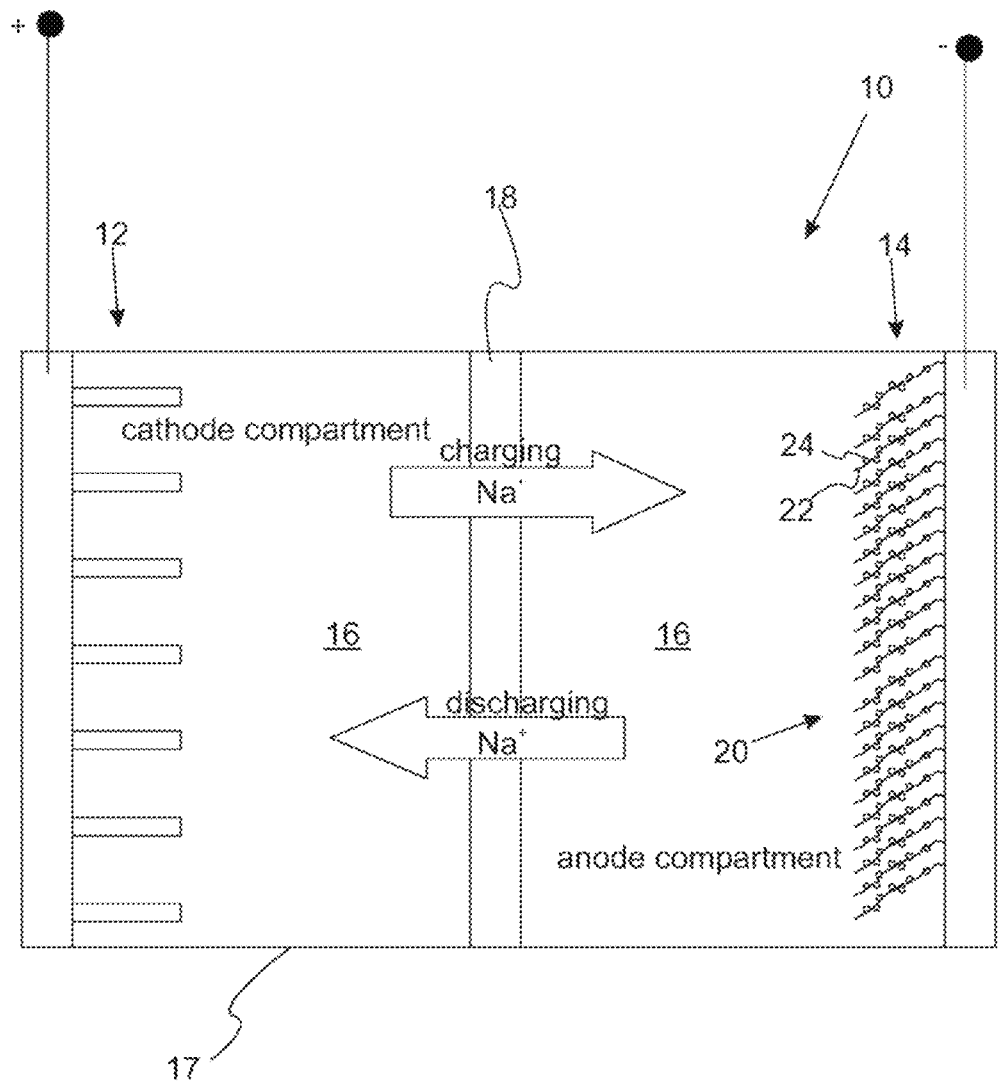
FIG. 1. Schematic of a sodium ion battery that include an anode having a red phosphorus graphene composite.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the different between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Throughout this application, where publications are referenced, the disclosures of these publications in their entireties are hereby incorporated by reference into this application to more fully describe the state of the art to which this invention pertains.

The term "nanosized particle" means a structure of particle having at least one dimension less than 100 nm.

The term "micro-sized particle" means a structure of particle having at least one dimension less than 1 micron. In a refinement, the micro-sixed particles have all dimensional greater than 100 nm and less than 1 micron.

The term "nanodot" means nanometer-scale localized structures. In some refinements, nanodots are quantum dots.

The term "graphene oxide" refers to a material that includes 1 or more layers of graphite with various oxygen containing functionalities such as hydroxyl, epoxide, carbonyl, and carboxyl. In a refinement, graphene oxide includes 1 to 20 monolayers. In another aspect, graphene oxide includes 1, 2, 3, 4, 5, 6, 7, 8, 9, or 10 monolayers.

"Reduced graphene oxide" refers to a form of graphene oxide in which oxygen content is reduced. In a refinement, reduced graphene oxide includes 1 to 20 monolayers. In another aspect, reduced graphene oxide includes 1, 2, 3, 4, 5, 6, 7, 8, 9, or 10 monolayers.

Abbreviations

"BP" means black phosphorus.
"GO" means graphene oxide.
"RP" means red phosphorus.
"rGO" means reduced graphene oxide.
"P@)RGO" means red phosphorus on reduced graphene oxide.

In general, embodiments of the present invention provide methods for forming a red phosphorus-containing anode to be used in a sodium ion battery as depicted in FIG. 1. In this regard, sodium ion battery 10 includes cathode 12 and an anode 14 each of which independently contact and is at least partially disposed in electrolyte 16 which is held in container 17. Separator 18 allows sodium ions to move between the anode and cathode compartments during charging and discharging. Characteristically, anode 14 includes red phosphorus-graphene oxide composite 20 that includes graphene oxide and/or reduced graphene oxide substrates 22 with red phosphorus structures 24 disposed thereon that are formed by the methods depicted in FIGS. 2 and 3. Typically, the graphene oxide or reduced graphene oxide substrates 22 are sheets (e.g., flakes) of these materials. As set forth above, the graphene oxide or reduced graphene oxide substrates include one or more monolayers (e.g., 1 to 20) of the respective materials. In a refinement, anode 14 includes nanosized or micro-sized red phosphorus particles. The nanosized or micro-sized red phosphorus particles typically have a spatial dimension from 50 to 300 nm. In a refinement, the nanosized or micro-sized red phosphorus particles have a spatial dimension from 50 to 100 nm. In another refinement, the nanosized or micro-sized red phosphorus particles have an average volume from about $6 \times 10^4$ nm$^3$ to about 1.5×nm$^3$. In still another refinement, In another refinement, the nanosized or micro-sized red phosphorus have an average volume from about $6 \times 10^4$ nm$^3$ to about $6 \times 10^5$ nm$^3$. In one variation, the nanosized or micro-sized red phosphorus particles are nanodots (or microdots) having diameters from 50 to 300 nm. In still another refinement, the nanosized or micro-sized red phosphorus particles are nanodots having diameters from 50 to 100 nm. Advantageously, the composite can be easily fabricated into a highly flexible and free-standing film by a filtration method.

In some variations, the combination of the graphene or reduced graphene oxide nanostructure and red phosphorus exhibit greater sodium intercalation than pristine graphene when these materials are contacted with a sodium ion-containing solution. In these variations, a phosphorus-doped RGO film can contribute to sodium ion storage by having an average sodium charge capacity from about 50 to 200 mAh/g over 50 cycles. The composites can have a charge capacity over 800 mAh/g after 300 cycles and a charge/discharge current density over 1200 mA/g.

Figure 2:
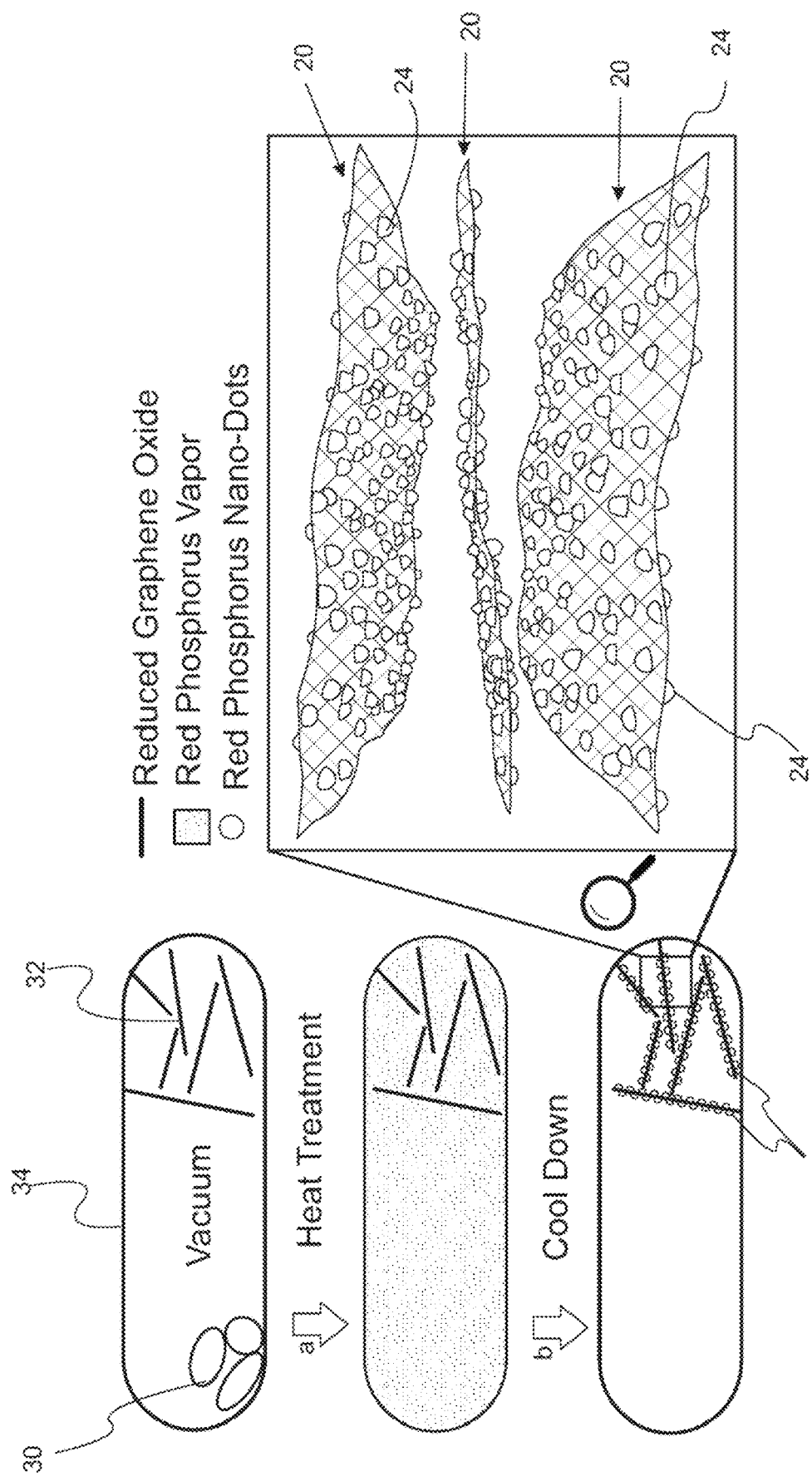
FIG. 2. Schematic description of P@RGO synthesis.

With reference to FIG. 2, a method for forming anode 14 of the sodium ion battery depicted in FIG. 1 is provided. The method includes steps of placing a red phosphorus precursor 30 (e.g., red phosphorus powder) and reduced graphene oxide powder 32 into a reaction chamber 34. In step a), the red phosphorus precursor 30 and reduced graphene oxide precursor 32 (e.g., graphene oxide or reduced graphene oxide) is heat treated under vacuum at a first temperature (e.g., 550° C. to 650° C.) that vaporizes (i.e. red phosphorus vaper 38) the red phosphorus precursor such that the red phosphorus structures 24 (as set forth above) grow on graphene oxide or reduced graphene oxide substrates 22 of reduced graphene oxide powder 32 to form red phosphorus-graphene oxide composite 20. In step b), the reaction products are then allowed to cool down. The reduced graphene oxide powder can include reduced graphene oxide sheets or flakes. In a refinement, the red phosphorus structures 24 are nanostructures or microstructures as set forth above. In particular, the red phosphorus structures are nanodots.

With reference to FIGS. 3A, 3B, 3C, and 3D, another method for forming anode 14 of the sodium ion battery depicted in FIG. 1 is provided. Red phosphorus precursor 38 (e.g., red phosphorus powder) and a graphene oxide precursor 40 is placed in a reaction chamber 42. A reducing environment is established in the reaction chamber. The red phosphorus precursor 38 and a graphene oxide precursor 40 heated to a first temperature (e.g., 400 to 550° C.) that is sufficient temperature to form a composite 44 of red phosphorus and reduced graphene oxide. In a refinement, the red phosphorus deposition and graphene oxide reduction are completed simultaneously in a single-step heat treatment. As set forth above, the composite of red phosphorus and reduced graphene oxide includes nanostructures or microstructures 24 dispose on reduced graphene oxide substrates 22. In most variations, the reducing environment includes molecular hydrogen (e.g., from 1 to 20 weight percent) and an inert gas (e.g., the balance of the mixture). In a refinement, the red phosphorus precursor and a graphene oxide precursor are arranged in a layered structure. During the reaction, the red phosphorus precursor and a graphene oxide precursor can be arranged in a layered structure with a graphene precursor layer interposed between two red phosphorus layers. The method of this embodiment, may further incudes a step of maintaining a reaction product of red phosphorus precursor and a graphene oxide precursor at a second temperature (e.g., 250 to 350° C.) to convert white phosphorus to red phosphorus. Finally, the reaction products are allowed to cool down.

Figure 4:
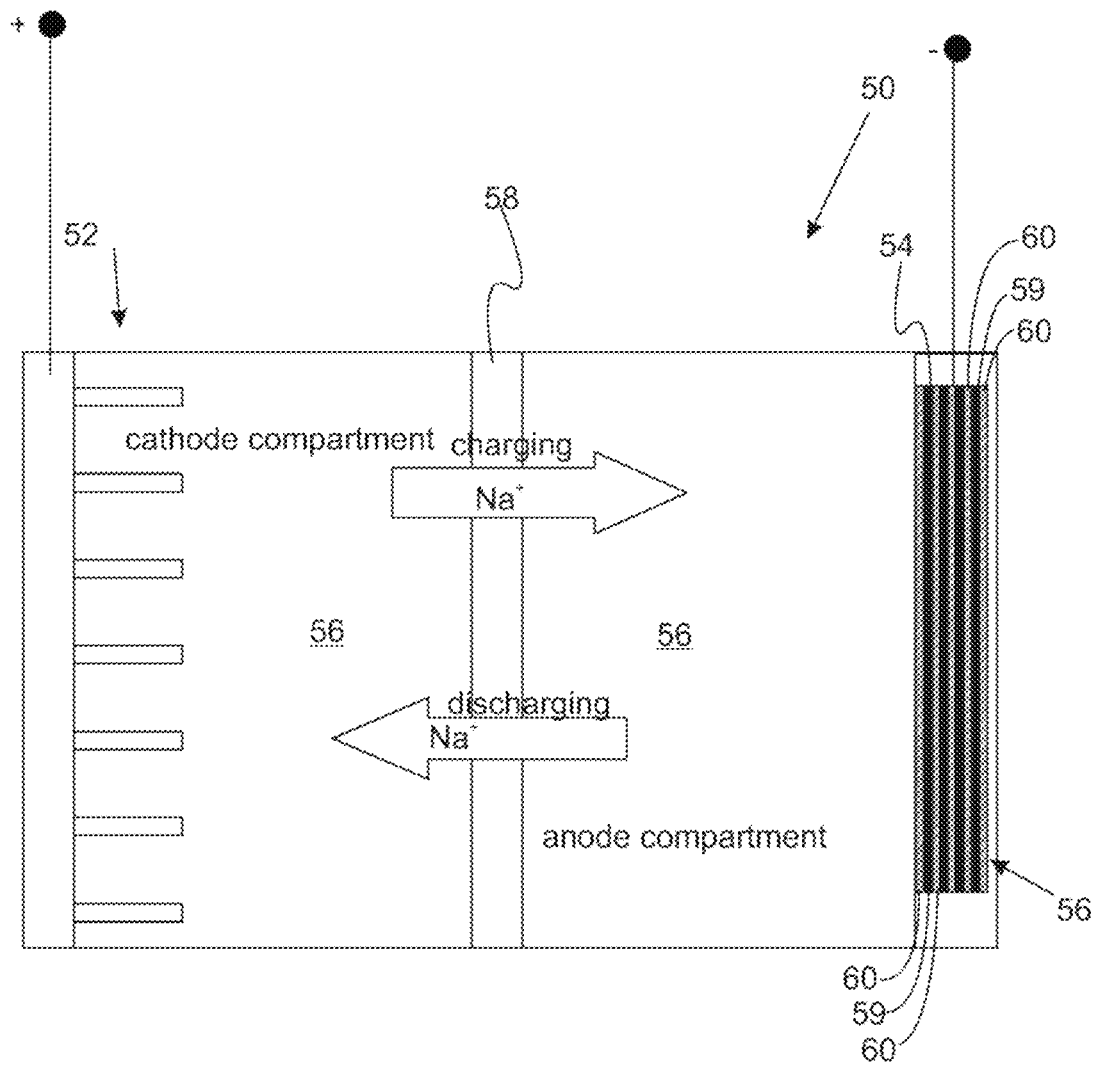
FIG. 4. Schematic of a sodium ion battery that include an anode having a black phosphorus anode.

In another embodiment, a sodium ion battery that includes black phosphorus is provided. With reference to FIG. 4, sodium ion battery 50 includes cathode 52 and an anode 54 each of which independently contact electrolyte 56. Separator 58 allows sodium ions to move between the anode and cathode compartments during charging and discharging. Characteristically, anode 54 includes layered BP/graphene composite 56 that includes black phosphorus layer 59 interposed between graphene oxide and/or reduced graphene oxide layers 60 (i.e., a BP/rGO layered structure). In a refinement, black phosphorus layer 59 has a thickness from about 5 nm to about 100 nm. In another refinement, black phosphorus layer 59 has a thickness from about 10 nm to about 80 nm. Typically, the graphene oxide or reduced graphene oxide layers 60 are sheets of these materials. As set forth above, graphene oxide or reduced graphene oxide layers 60 includes one or more monolayers (e.g., 1 to 20) of graphene oxide and/or reduced graphene oxide. In a refinement, anode 14 includes a BP/rGO layered structure formed by the method set forth below.

In another embodiment, a method for forming the anode of FIG. 4 is provided. A red phosphorus/graphene oxide (RP/rGO) composite (i.e., a precursor in the present embodiment) is prepared as set forth above with respect to the description regarding FIGS. 2 and 3. In this regard, the flash-heat-treatment method of FIG. 3 is found to be particularly useful. With reference to FIG. 5, in step a), red phosphorus powder 64 and graphene oxide powder 66 are arranged in a layered structure having alternating layers of phosphorus powder and graphene oxide is step a). Typically, the graphene oxide powder 66 includes plurality of graphene substrates. The layered structure is heat treated at a first temperature to form a red phosphorus/reduced graphene oxide layers film 68 (e.g., the (RP/rGO) composite). Typically, red phosphorus/reduced graphene oxide combination includes red phosphorus nanostructures or microstructures. In a refinement, the first temperature is from about 450° C. to 650° C. The red phosphorus/reduced graphene oxide layered film is then placed on a substrate 70 (e.g., aluminum foil). In step b), a pressure is applied to the red phosphorus/reduced graphene oxide layer composite 68 that is sufficient to convert the red phosphorus to black phosphorus such that a black phosphorus/reduced graphene oxide layered composite 72 is formed. Characteristically, the pressure is greater than or equal to about 5 GPa. In a refinement, the pressure is from about 5 to 12 GPa. The pressure is typically applied with the red phosphorus/reduced graphene oxide combination being at a second temperature of about 20 to 40 degrees C. Typically, the substrate is a metal sheet or metal foil that is used as a current collector in a battery.

Figures 5A, 5B:
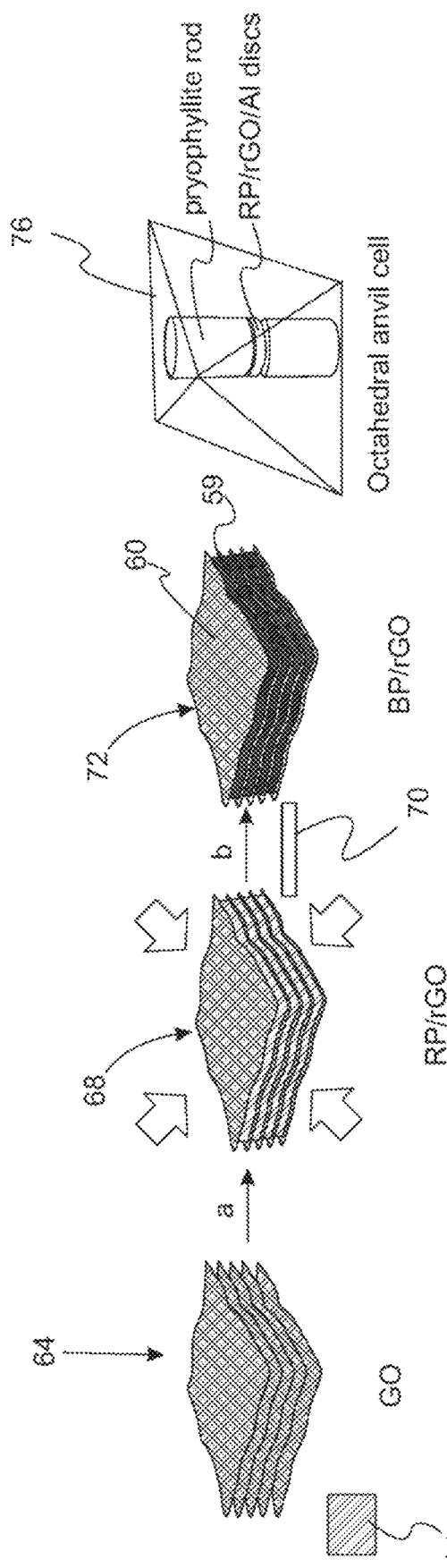
FIGS. 5A and 5B. (A) Schematic description of the BP/rGO synthesis. (B) Anvil for compressing layer red phosphorus/graphene.

In a variation, a plurality of red phosphorus/reduced graphene oxide layered composites are stacked and then subject to the pressure in a compression device such as anvil 76 depicted in FIG. 5B.

In another variation, an anode for a sodium ion battery can include a combination of the red phosphorus composite described by FIGS. 1-3 and the related description of these figures and the black phosphorus composited described by FIGS. 2-5 and the related description of these figures.

As set forth above, sodium ion battery 10 and 50 each independently include a cathode and electrolyte in addition to the anodes of FIGS. 1 and 4. Characteristically, cathode 12 includes an electrochemically active sodium based material. The sodium based active material is primarily a sodium metal phosphate as set forth in U.S. Pat. No. 6,872,492; the entire disclosure of which is hereby incorporated by reference. Examples of sodium containing active materials include, but are not limited to, $NaVPO_4F$, $Na_{1+y}VPO4F_{1-y}$, $NaVOPO_4$, $Na_3V_2(PO_4)_2F_3$, $Na_3V_2(PO_4)_3$, $NaFePO_4$, $NaFe_xMg_{1-x}PO_4$, $Na_2FePO_4F$ and combinations thereof, wherein $0<x<1$, and $-0.2<y<0.5$. Another preferred active material has the general formula $Li_{1-z}Na_zVPO_4F$ wherein $0<z<1$. In addition to vanadium (V), various transition metals and non-transition metal elements can be used individually or in combination to prepare sodium based active materials. Electrolyte 16 provides a physical separation but allows transfer of ions between the cathode and anode. The electrolyte is preferably a material that exhibits high ionic conductivity, as well as having insular properties to prevent self-discharging during storage. The electrolyte can be either a liquid or a solid. A liquid electrolyte comprises a solvent and an alkali metal salt that together form an ionically conducting liquid. Electrolyte 16 can be a "solid electrolyte" which includes a matrix material (e.g., polymer) that is used to separate the electrodes.

Additional details of the methods set forth herein are provided in: Red Phosphorus Nanodots on Reduced graphene oxide as a Flexible and Ultra-Fast Anode for Sodium-Ion Batteries; Yihang Liu, Anyi Zhang, Chenfei Shen, Qingzhou Liu, Xuan Cao, Yuqiang Ma, Liang Chen, Christian Lau, Tian-Chi Chen, Fei Wei, and Chongwu Zhou; ACS Nano 2017 11 (6), 5530-5537; DOI: 10.1021/acsnano.7b00557; and Room-Temperature Pressure Synthesis of Layered Black Phosphorus-Graphene Composite for Sodium-Ion Battery Anodes; Yihang Liu, Qingzhou Liu, Anyi Zhang, Jiansong Cai, Xuan Cao, Zhen Li, Paul D. Asimow, and Chongwu Zhou; ACS Nano 2018 12 (8), 8323-8329; DOI: 10.1021/acsnano.8b03615; the entire disclosures of which are hereby incorporated by reference.

The following examples illustrate the various embodiments of the present invention. Those skilled in the art will recognize many variations that are within the spirit of the present invention and scope of the claims.

I. Red Phosphorus Nanodots on Reduced Graphene Oxide as a Flexible and Ultra-Fast Anode for Sodium-Ion Batteries As set forth above, a method for forming red phosphorus is provided. The method provides a solution to solve the above issues of red phosphorus, which allows the growth of red phosphorus particles with diameters varying from several hundreds to tens of nanometers on reduce graphene oxide (RGO) densely and uniformly by physical vapor deposition (PVD) method, resulting in the P@)RGO composite. The preparation steps of P@RGO are presented in FIG. 2. Red phosphorus precursor and RGO powder were placed at two ends of a quartz tube, which was sealed into an ampule under vacuum with the materials loaded. During a 15 min heat-treatment at 600° C., red phosphorus precursor was vaporized and filled into the gaps between RGO layers due to the vacuum environment. After that, the phosphorus nanodots would grow on the RGO surface during the condensation of the phosphorus vapor. In this design, the RGO sheets serve as an intimate electronic pathway between the red phosphorus active material and external circuit, and the precisely controlled deposited red phosphorus nanodots effectively facilitate the sodium ion transfer, thus accelerating the electrochemistry reaction rate of the whole battery system. The free space between the RGO sheets can accommodate the volume variation of the red phosphorus to stabilize the P@RGO anode further. Moreover, the architectural P@RGO is proven to be a convenient and reliable solution to sodium-ion batteries, which is not only mechanically stable but also amenable toward red phosphorus PVD processes, hence allowing the architecture of flexible power sources for wearable electronics.

Results and Discussion

Figure 6A:
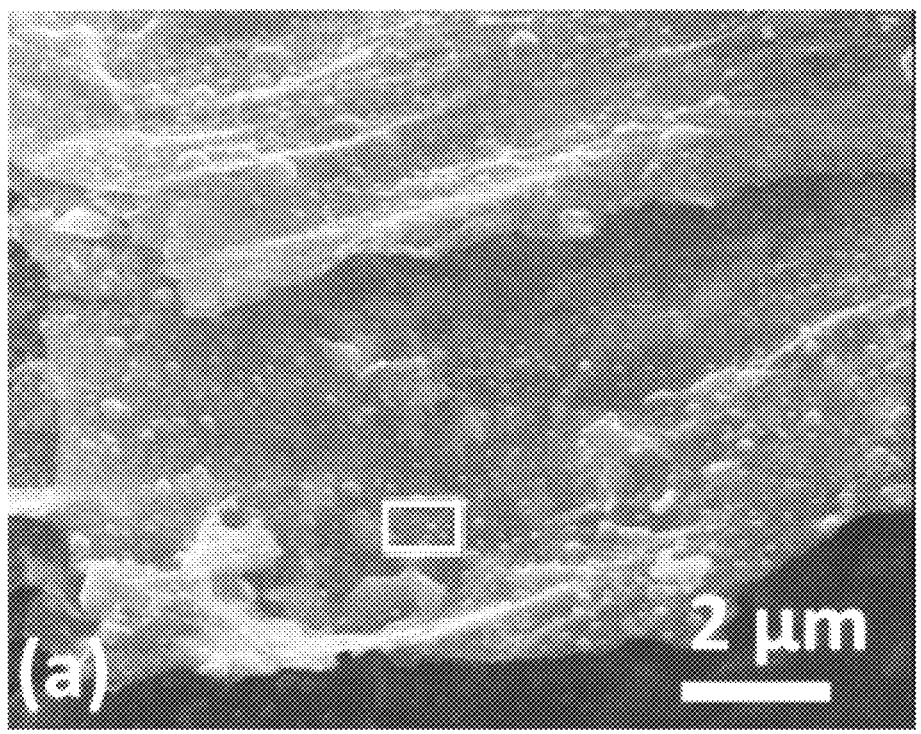
FIGS. 6A, 6B, 6C, 6D, 6E, 6F, 6G, 6H, and 6I. (A) SEM image of the P@RGO composite. (B) The enlarged SEM image and (C) the corresponding EDS mapping profile for phosphorus element in the area marked with red rectangle in (A). (D) TEM and (E) STEM image of the P@RGO composite. (F) EDS line-scan profile for phosphorus element of three particles marked in (E). (G) TEM image of a single phosphorus particle on a RGO sheet. (H) The high-resolution TEM image of the area marked with blue dashed rectangle in (G), the graphene layer is marked with light blue dashed line. (I) The bending test of the P@RGO flexible film with the resistance measurement at different bending radius, the optical images of the flexible film are inserted.
Figure 6B:
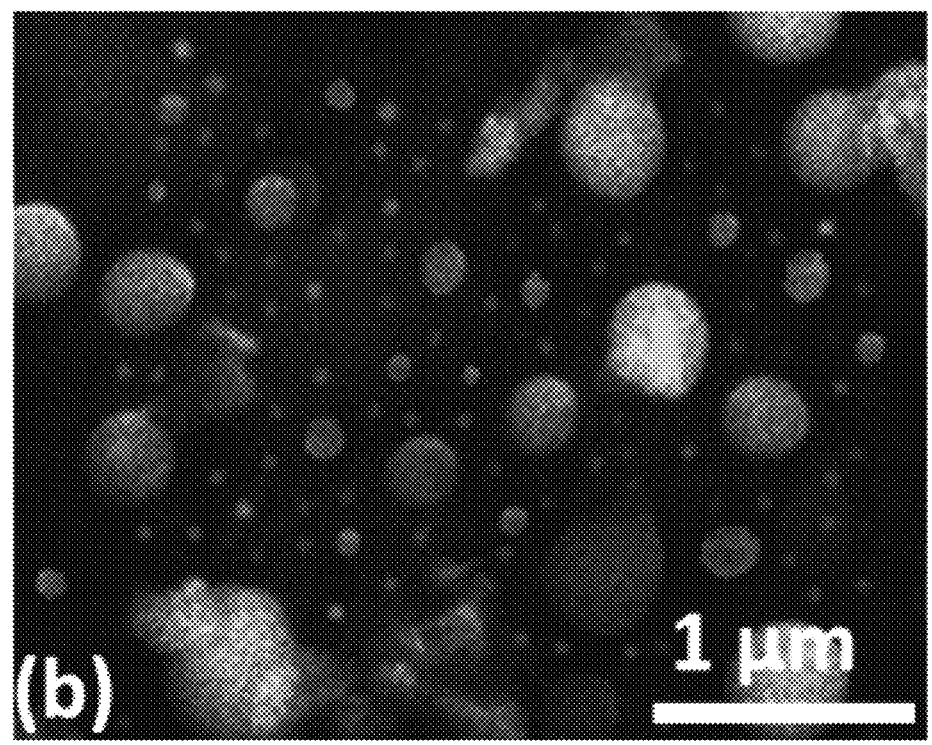
Figure 6C:
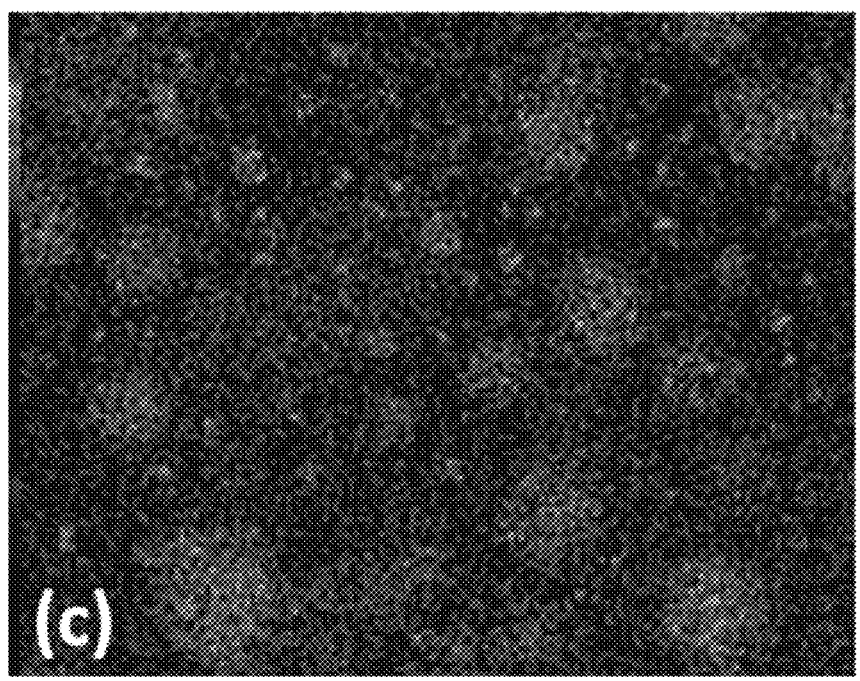
Figure 6D:
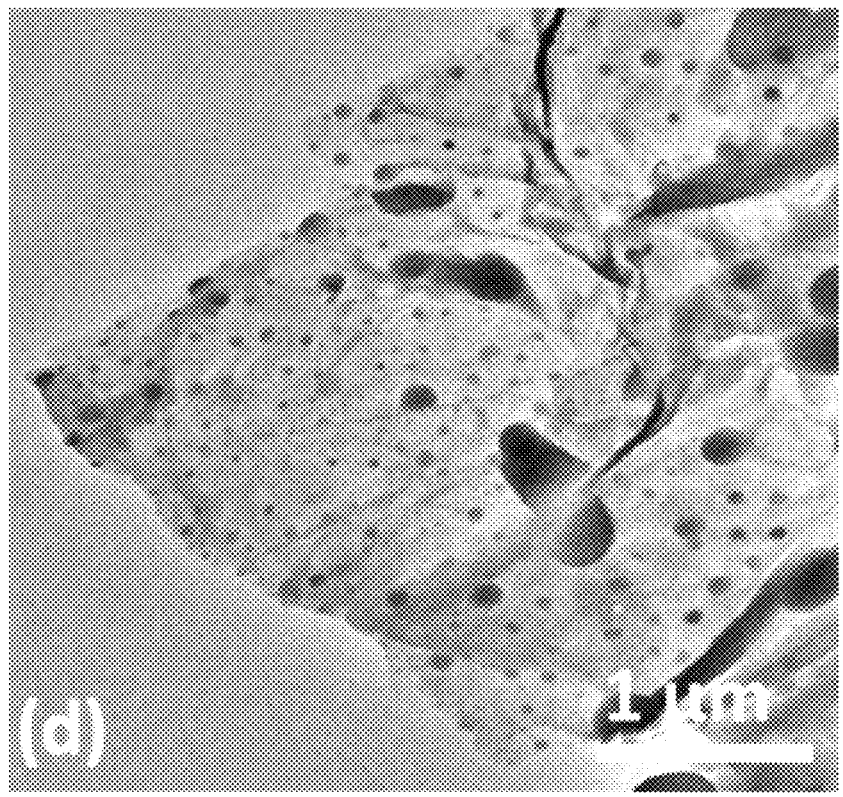
Figure 6E:
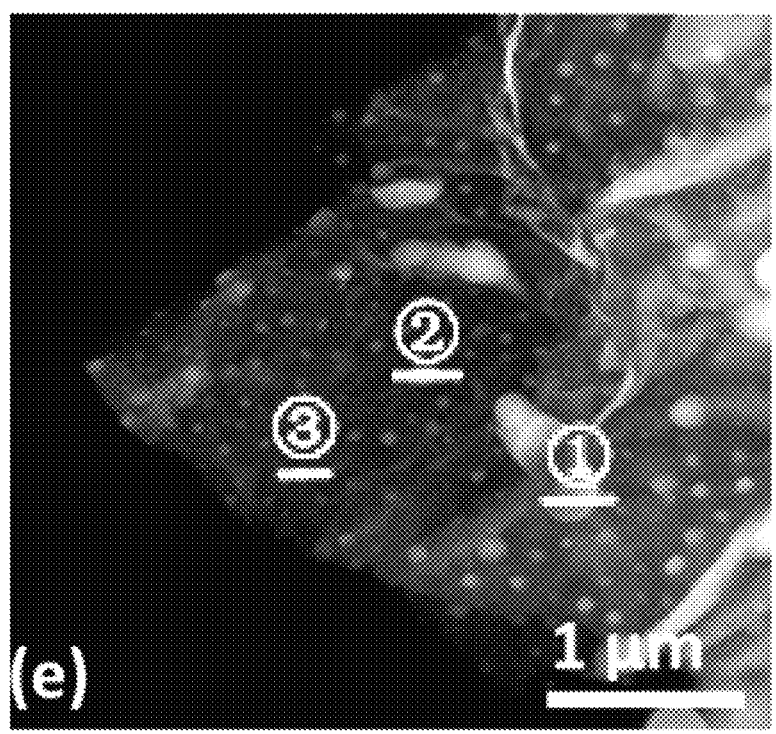
Figure 6F:
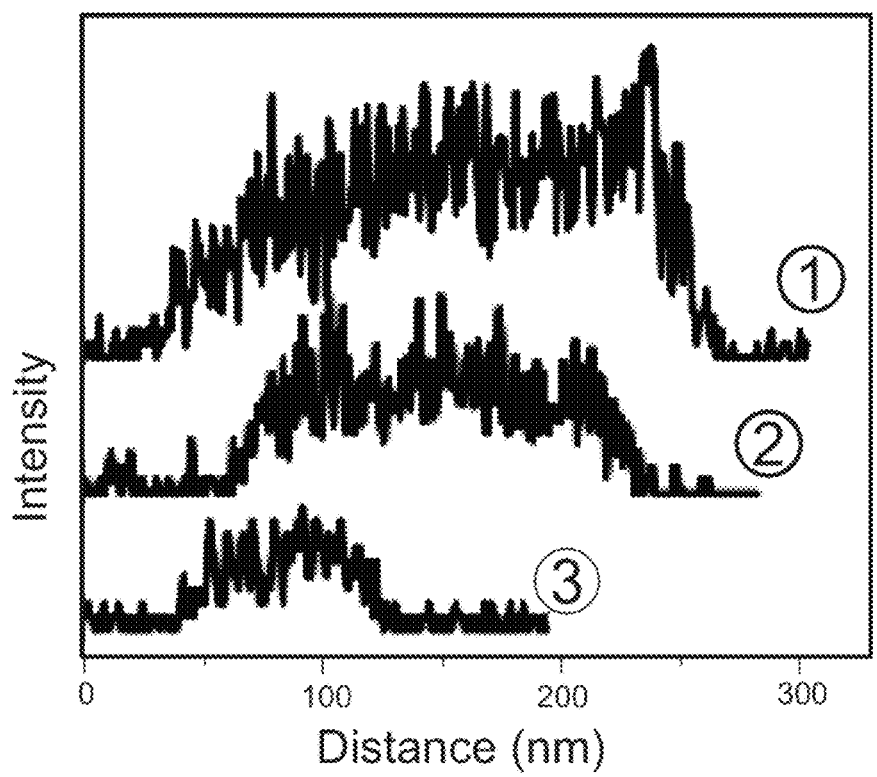
Figure 6G:
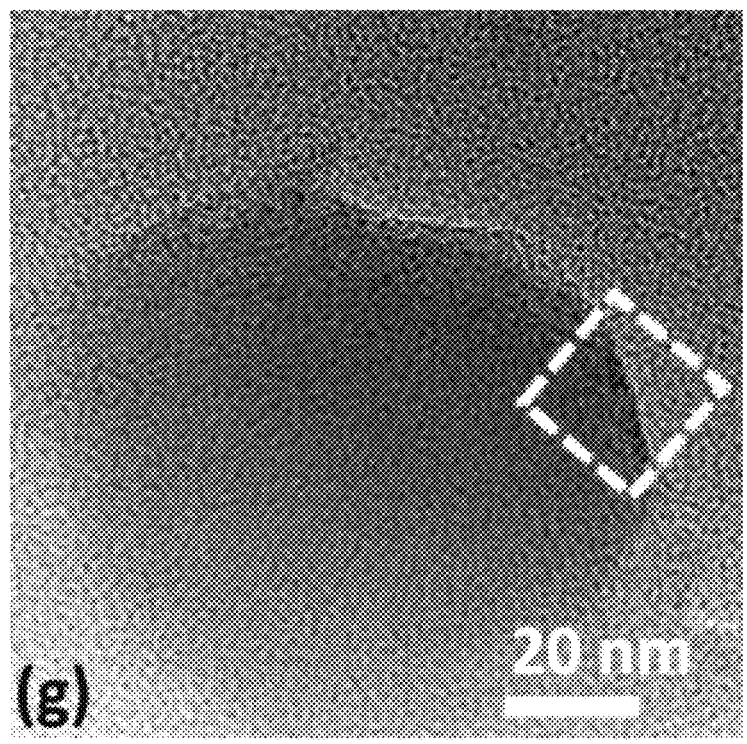
Figure 6H:
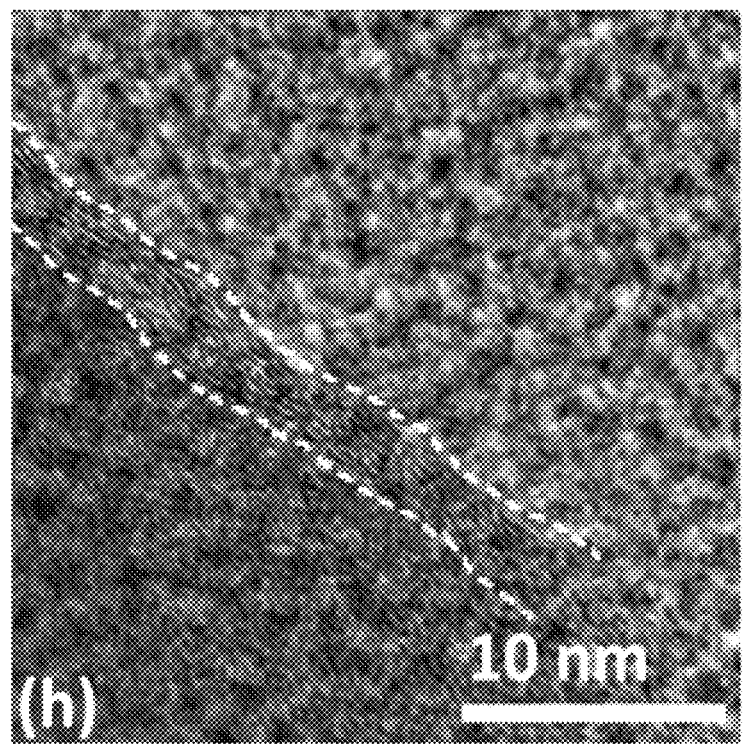

In the scanning electron microscopy (SEM) image of the as-prepared P@RGO as shown in FIG. 6A most RGO sheets have planar loo surface area larger than 100 $\mu m^2$, and phosphorus particles were deposited onto RGO sheets densely and uniformly. In FIG. 6B, the enlarged SEM image of the area marked by red rectangle in FIG. 6A with the corresponding energy-dispersive X-ray spectroscopy (EDS) element mapping profile of phosphorus elements shown in FIG. 6C, the particles on RGO sheets can be confirmed as phosphorus nanodots, and the diameter of the nanodots varies from hundreds to tens of nanometers. In the transmission electron microscopy (TEM) image (FIG. 6D) and the corresponding scanning transmission electron microscopy (STEM) dark-field image (FIG. 6E), phosphorus nanodots can be easily identified from the brightness contrast. In FIG. 6F, the EDS line-scan profiles of three typical particles with different diameters (numbered in FIG. 6E), diameters of different phosphorus nanodots were measured as 79, 161, and 223 nm, which reached a good agreement with the particle sizes observed under SEM. In the enlarged TEM image of a single phosphorus particle, as shown in FIG. 6F, the amorphous nature of the particle can be observed. In the high-resolution TEM image of the edge of the particle, as shown in FIG. 6H, a few graphene layers (marked with a dashed line) can be dearly observed wrinkling around the red phosphorus nanodot with good contact.

Figure 6I:
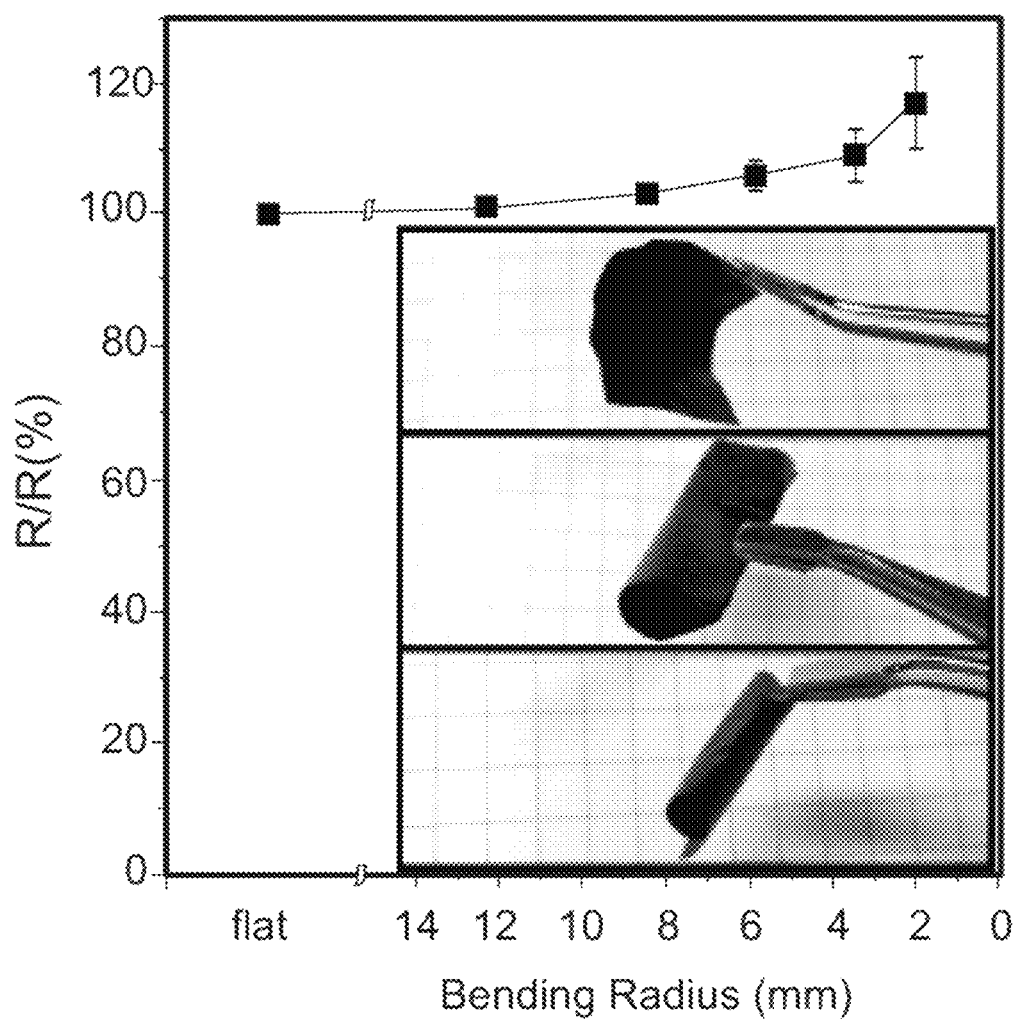

The synthesized P@RGO composite can be easily fabricated into a highly flexible and free-standing film by filtration method, as shown in the optical image inserted in FIG. 6I. In order to investigate the mechanical properties of the P@RGO flexible film, the relative resistance (R/R0) of the film was measured at different bending radius from flat to 12.3, 8.4. 5.8, 3.4, and 2 mm. No obvious resistance change (<10%) was observed at the bending radius larger than 3.4 mm; a 17% resistance increase was observed at the bending radius as small as 2 mm. The film was free of breaking during the entire bending tests, indicating that the RGO film can provide great mechanical support to the red phosphorus nanodots against the stresses from the sodiation and desodiation processes.

The P@RGO film was also analyzed by X-ray photoelectron spectroscopy (XPS) to further study the chemical bonding between phosphorus and RGO sheets. Both P 2p and P 2s peaks can be identified in the XPS spectrum together with the carbon and oxygen peaks. The P 2p high-resolution spectrum pocket in the XPS spectrum can be fitted to three Gaussian-Lorentzian peaks at 132.8, 133.5, and 134.7 eV, which can be assigned to P—C, P—P, and P—O bond, respectively. The C is a high-resolution XPS spectrum can be fitted to five peaks: C=C/C—C bond at 284.7 eV, C—O bond at 285.6 eV, C=0 bond at 286.5 eV, O—C=0 bond at 289 eV, and the peak at 283.5 eV can be assigned to sp2 C—P bond as reported in the literature, indicating chemical bond formation between phosphorus and carbon in our samples.

Figure 7A:
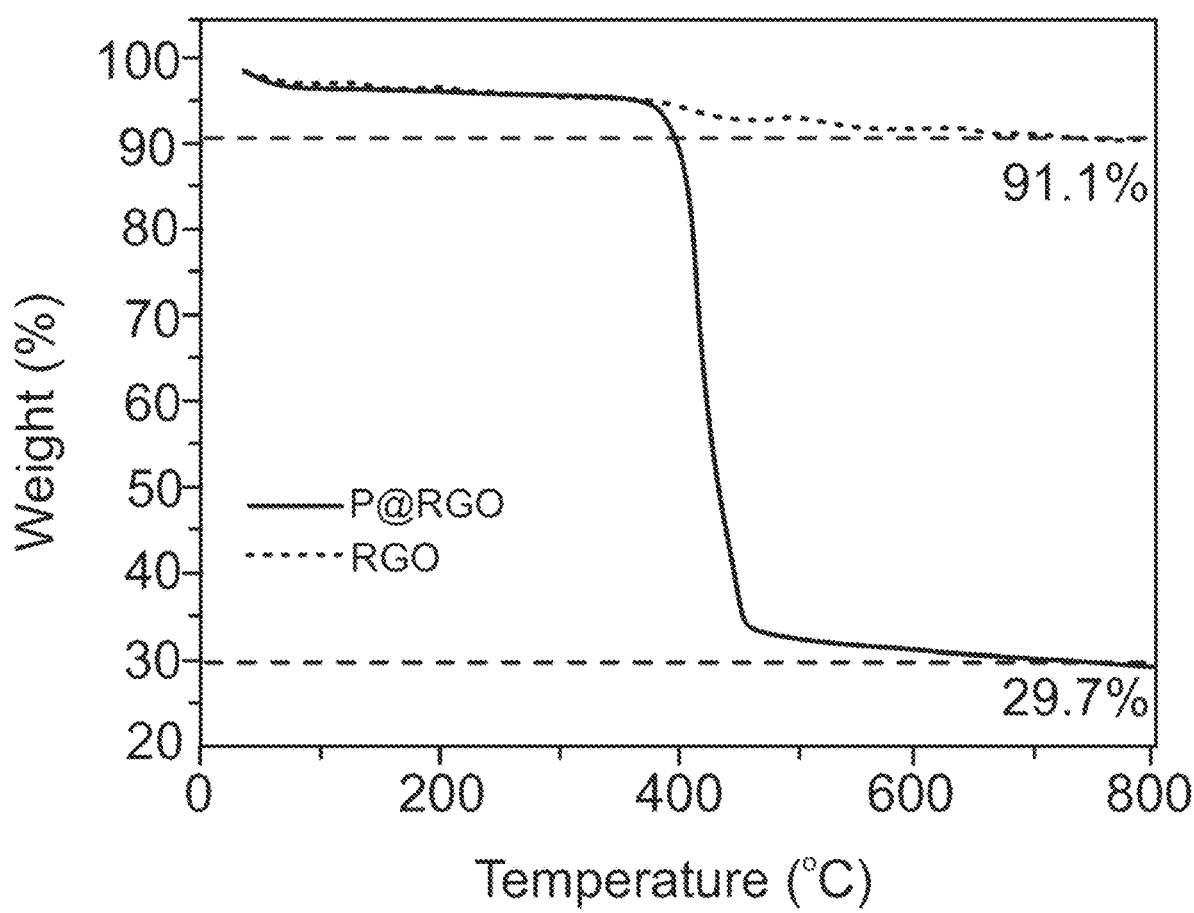
FIGS. 7A, 7B, 7C, 7D, 7E, and 7F. (A) Thermogravimetric analysis of the P@RGO composite. (B) Cyclic voltammetry of the P@RGO anode with a scan rate of 0.1 mV/s between 0 and 3.0 V vs Na/Na+. (C) Cycling performance of the P@RGO anode at a charge/discharge current density of 1593.9 mA/g with its potential profiles presented in (D). (E) Rate performance of the P@RGO anode with its potential profiles presented in (F).
Figure 7B:
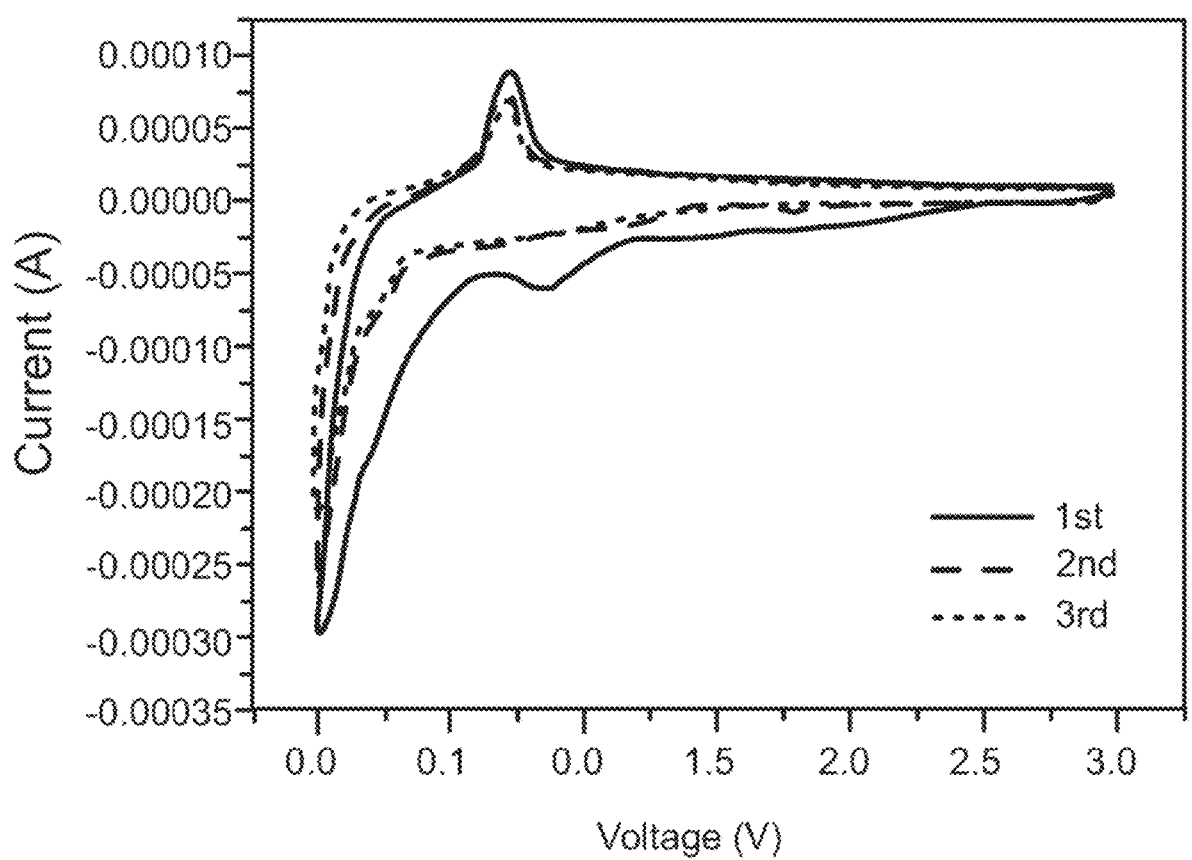

FIG. 7A exhibits the thermogravimetric analysis (TGA) data of the RGO film and P@RGO composite in nitrogen atmosphere. The P@RGO sample has a sharp weight loss between 400 and 430° C. due to the red phosphorus vaporization, and the weight percentage of phosphorus in P@RGO composite can be calculated as 61.4%. The electrochemical performance of the P@RGO anode was first tested in cyclic voltammetry (CV) for the initial three cycles with a voltage window from 0 to 3.0 V vs Na/Nat as shown in FIG. 7B. Two peaks at 0.8 and 0 V were observed from the first sodiation process. The peak located at 0.8 V disappeared in the following cycles indicating a stable solid electrolyte interphase (SEI) film formation caused by the decomposition of electrolyte, which contributes to the irreversible capacity at the first cycle. The major peak at 0 V can be assigned to the sodium intercalation and observed in the subsequent sodiation process consistently. Only one peak at 0.7 V was observed during the desodiation process for three cycles consistently, which are in good agreement with the previous reports. A minor decay was observed at the 0.7 V peak from the first to the second desodiation process without peak position shifting, and the unchanged peak current intensity in the following cycles implies excellent reversibility of the P@RGO anode.

In order to investigate the electrochemical and electrical properties of the heteroatom-doped RGO, pristine RGO and phosphorus-doped RGO samples were made as control samples. The results of the current-voltage (I-V) measurements show that the phosphorus-doped RGO offers higher conductance than the pristine RGO samples, which is consistent with the reported literature. The electrochemical test results of the two control samples show that the pristine RGO film is almost electrochemically inactive for sodium intercalation; while the phosphorus-doped RGO film has an average sodium charge capacity of 163.2 mAh/g over 50 cycles, demonstrating a non-negligible contribution to the sodium-ion storage of P@RGO. Herein, the specific capacities and current densities reported in this work were calculated using the total mass of the P@RGO sample.

Figure 7C:
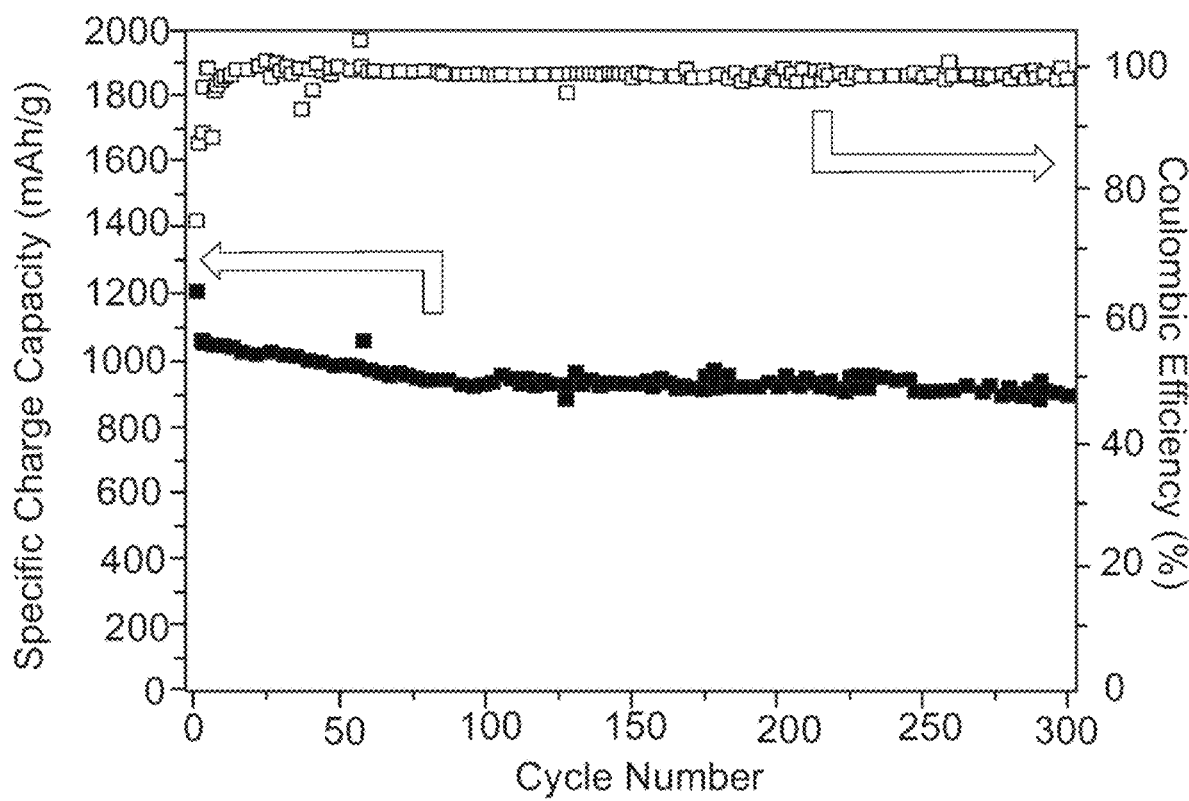

The cycling performance of our P@RGO anode samples were investigated by galvanostatic charge/discharge of the electrodes between 0.01 and 1.75 V at a current density of 1593.9 mA/g, as shown in FIG. 7C. The P@RGO electrode presents a 75.2% initial efficiency that quickly rises to ~99% after 5 cycles, and a high initial specific discharge capacity of 1611 mAh/g at the first sodiation process indicating a fully sodiated status. After that, the specific charge capacity decayed from 1074.5 to 930.3 mAh/g from the second to the 100th cycle with an 86.6% retention, and then was stabilized ~940 mAh/g after 100 cycles with a 914 mAh/g capacity at the 300th cycle finally. The corresponding volumetric capacity of the P@RGO film electrode can be calculated to be around 111 mAh/cm$^3$ over 300 cycles, based on the fact that each electrode has a mass of ~2.6 mg, 16 mm in diameter, and ~110 μm in thickness. The superior cycling performance of P@RGO is comparable to and exhibits an advantage over most silicon anodes in lithium-ion batteries with a 15-20% weight ratio of conductive carbon and binder as additives, and also with copper foil as current collector. In contrast, the commercial red phosphorus anode suffered from a rapidly fading capacity, retaining only 27.7% of the initial capacity at the 50th cycles. This poor cycling performance was consistent with previous reports of red phosphorus anodes. Thus, the cycling stability of P@RGO anode was significantly extended by the precisely controlled nanosized red phosphorus particles and the architectural RGO enabled conductive supporting network with superior mechanical properties.

Figure 7D:
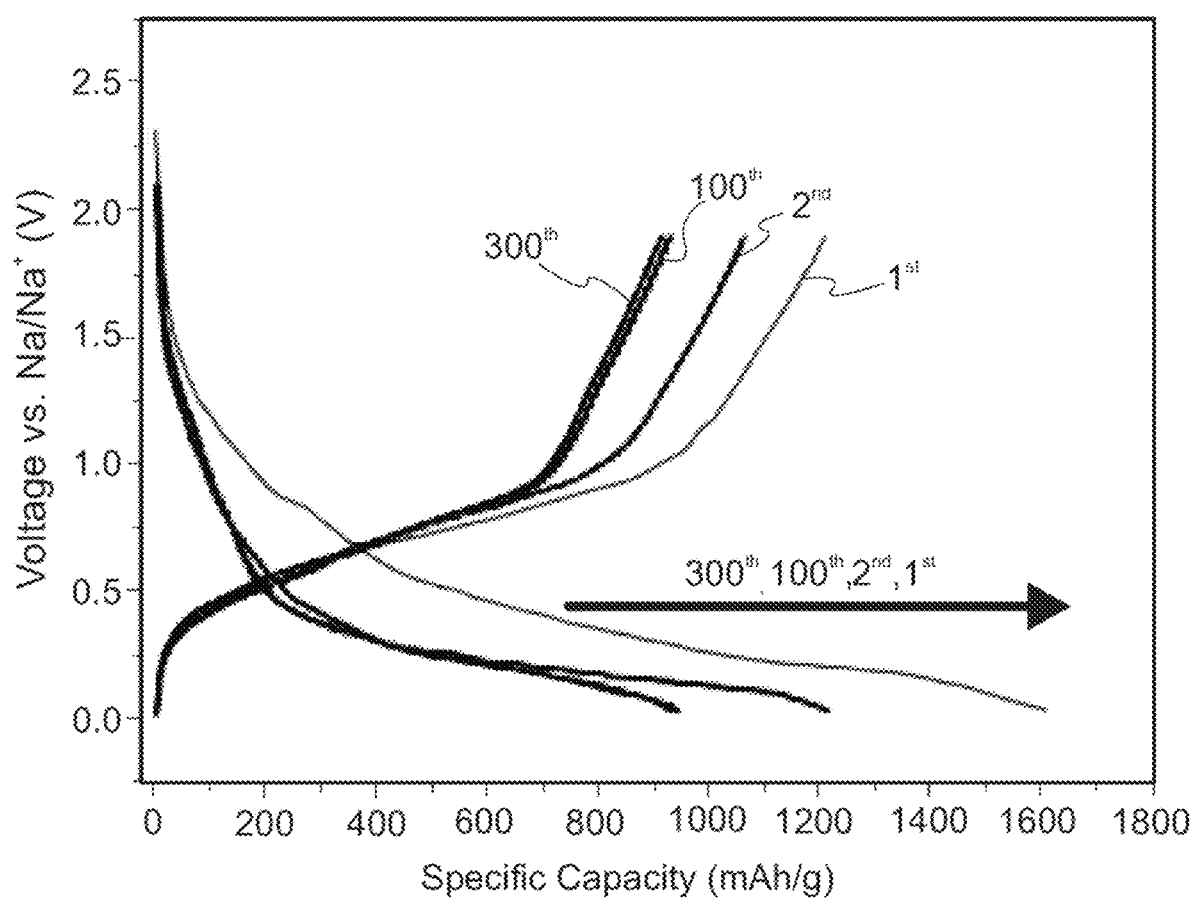

Aside from capacity, voltage profiles actually reveal additional details about the electrochemical sodiation/desodiation process in this anode. The voltage profiles of the cycling performance test of the P@RGO anode are depicted in FIG. 7D with cycle numbers labeled on individual curves. In the first sodiation process, one small potential plateaus at 0.8 V and the major sodiation potential plateaus at 0.5-0.1 V are observed. The small plateau is due to the SEI formation in dimethyl carbonate (DMC) electrolyte with fluoroethylene carbonate (FEC) additive, which reached a good agreement with the CV curve in FIG. 7B. The discharge curves present a major plateau at 0.2-0.1 V at the second, 50th, 100th, and 300th cycle consistently. On the other hand, all charge curves of the first, second, 10th, 50th, and 300th cycle exhibit a major desodiation plateau at 0.7-0.8 V.

Figure 7E:
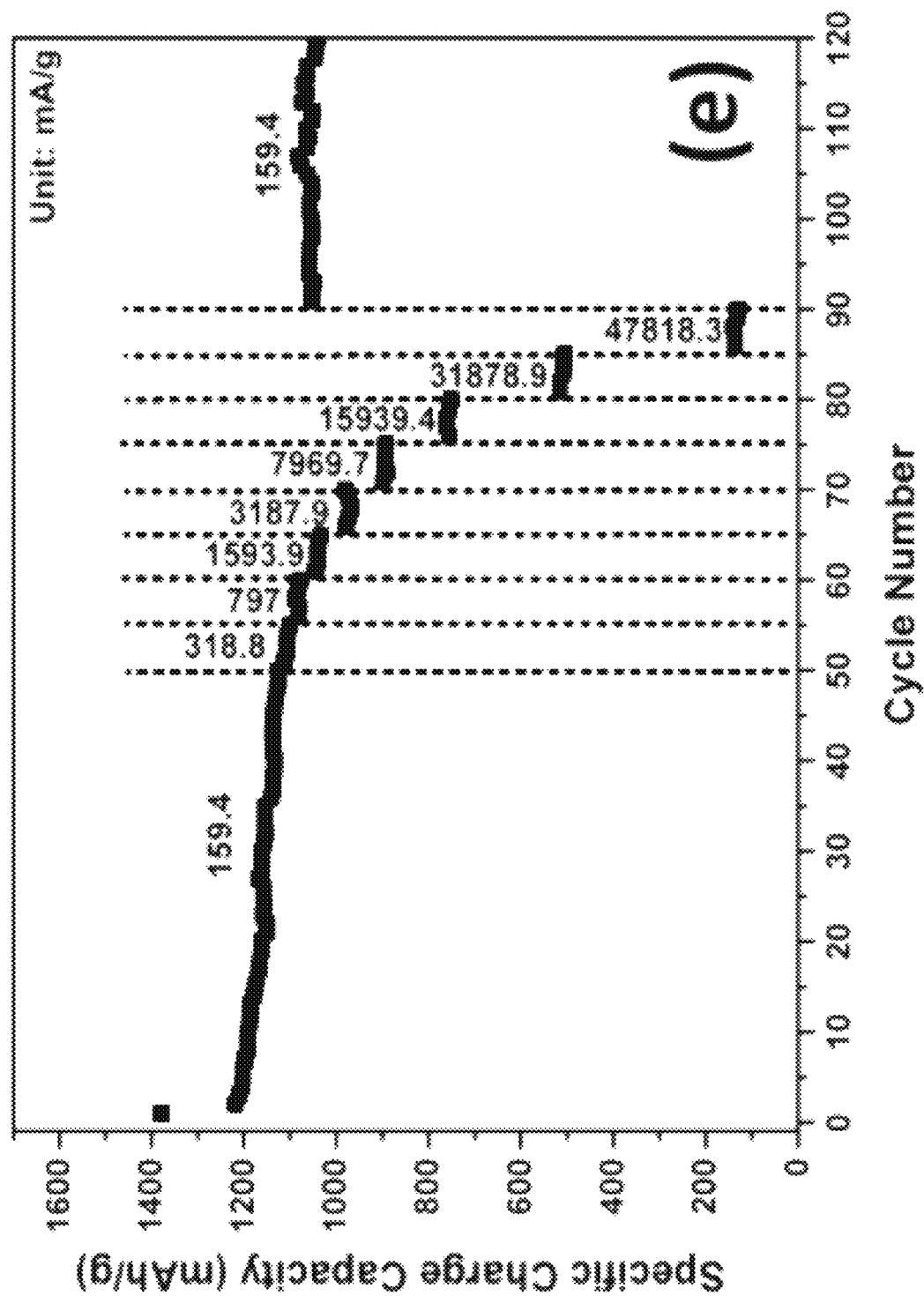
Figure 7F:
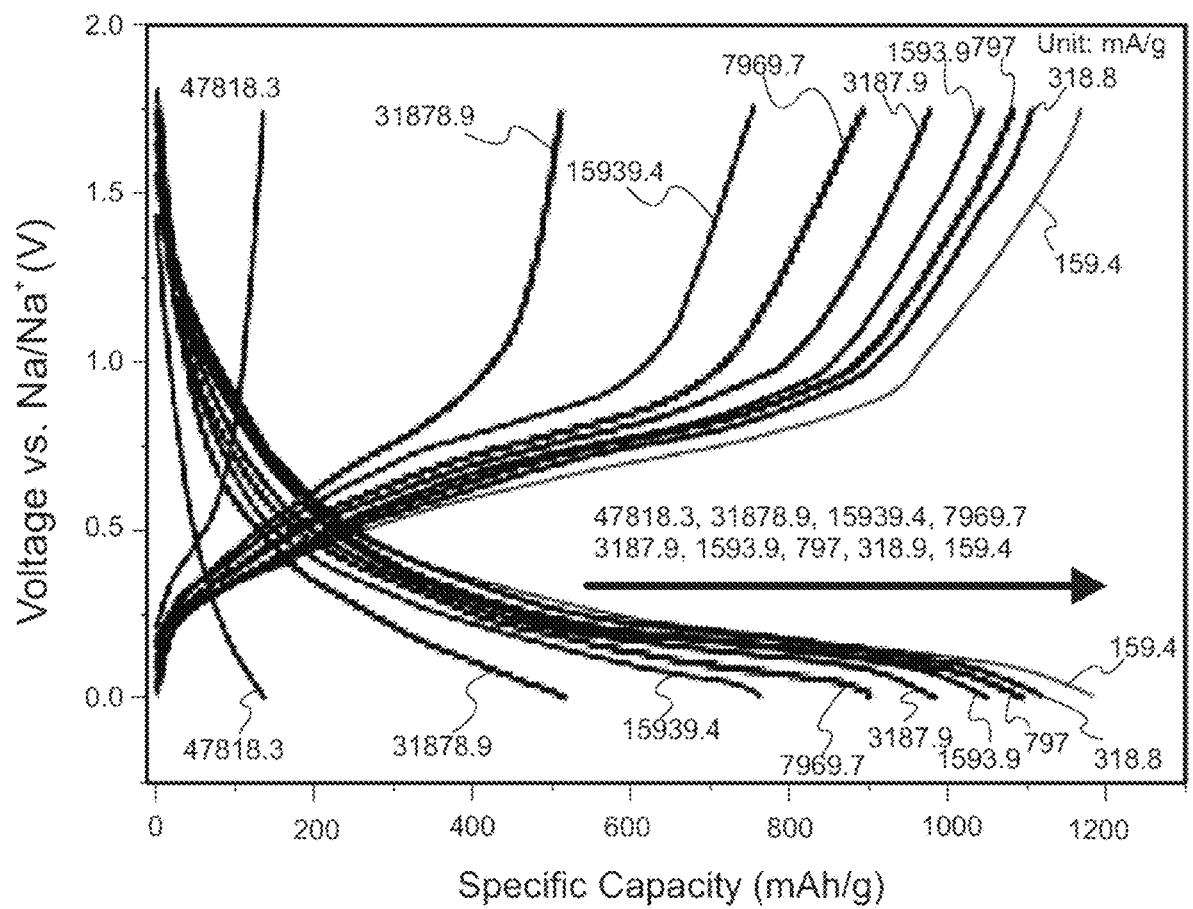
Figure 8A:
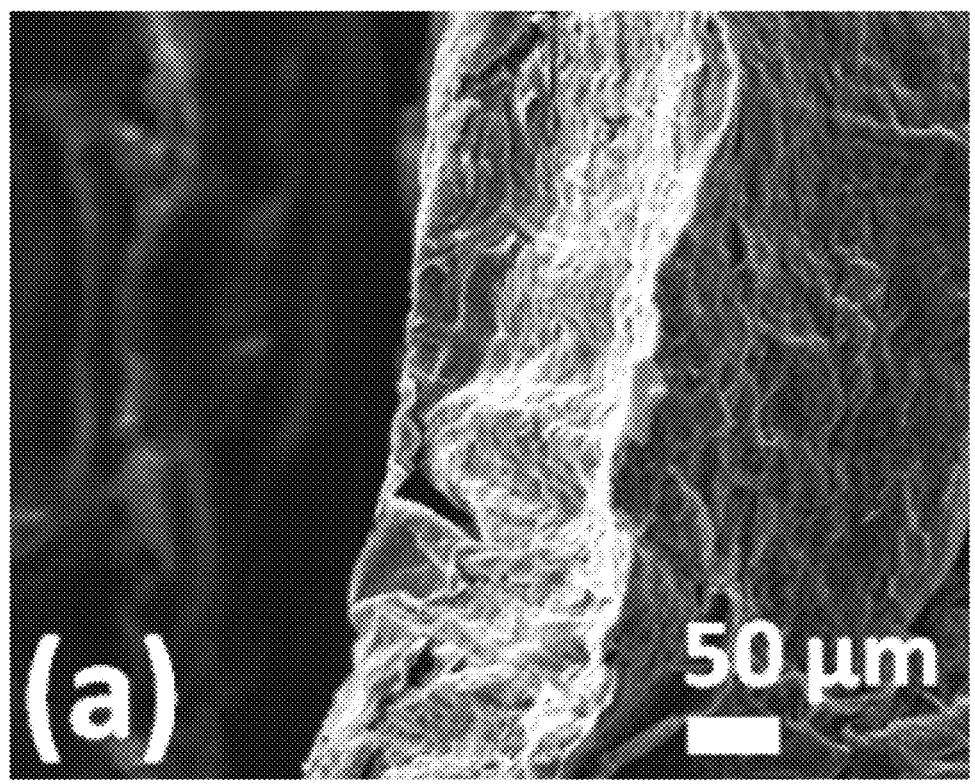
FIGS. 8A, 8B, 8C, 8D, 8E, and 8F. Cross-sectional (A) and planar (D) SEM images of the flexible P@RGO electrode after 300 cycles with the corresponding EDS element mapping profile of phosphorus in (B) and (E) and carbon in (C) and (F), respectively.
Figure 8B:
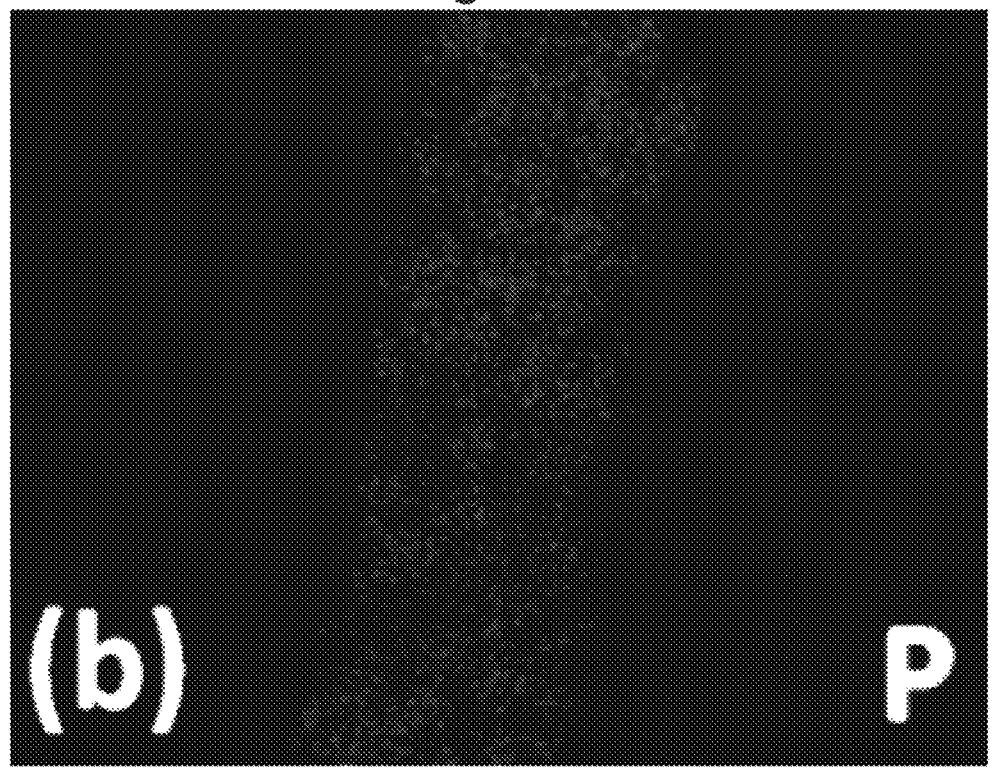
Figure 8C:
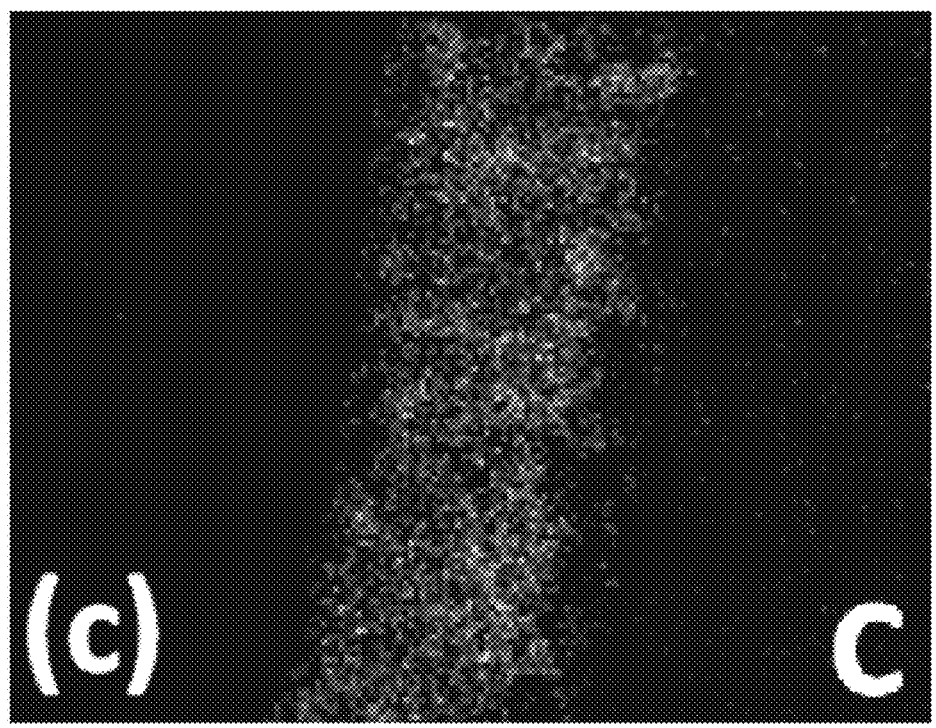
Figure 8D:
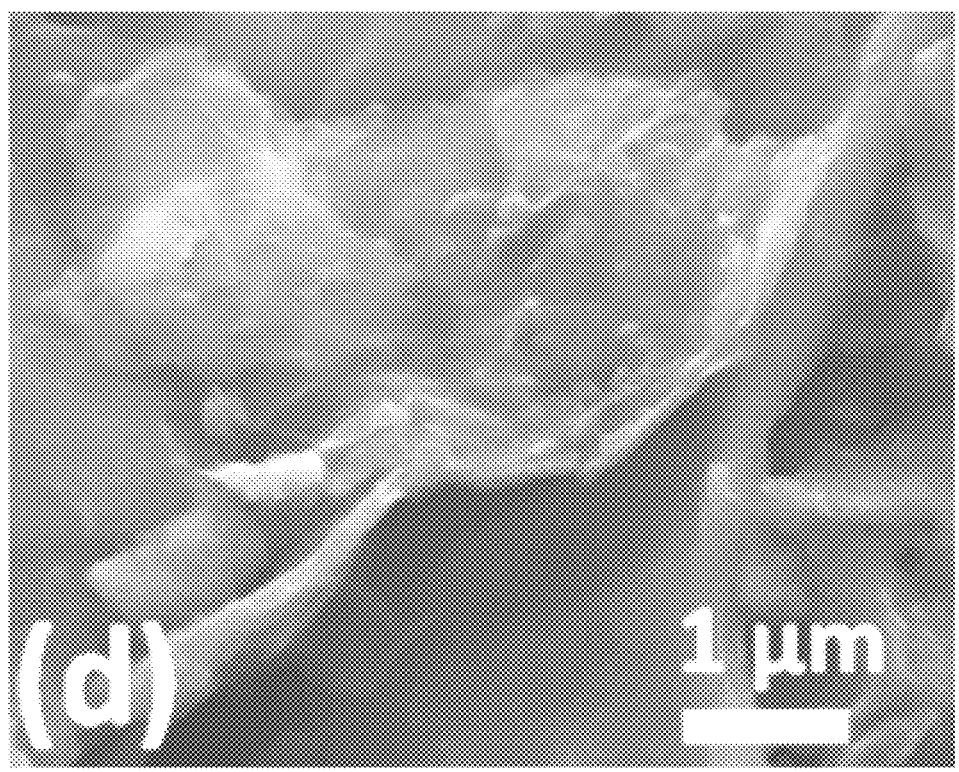
Figure 8E:
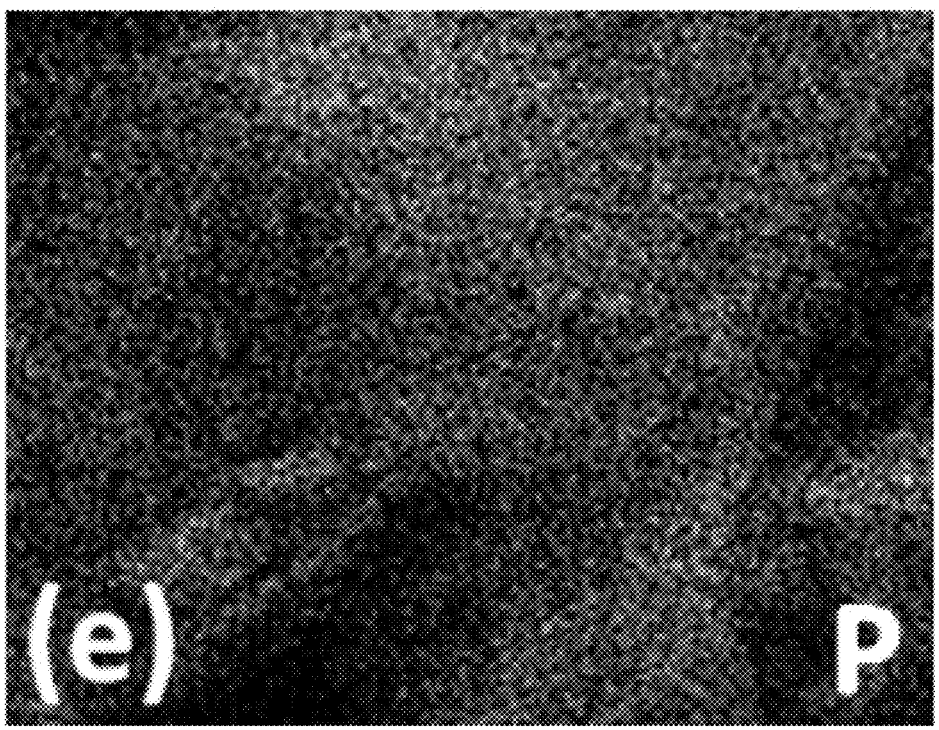
Figure 8F:
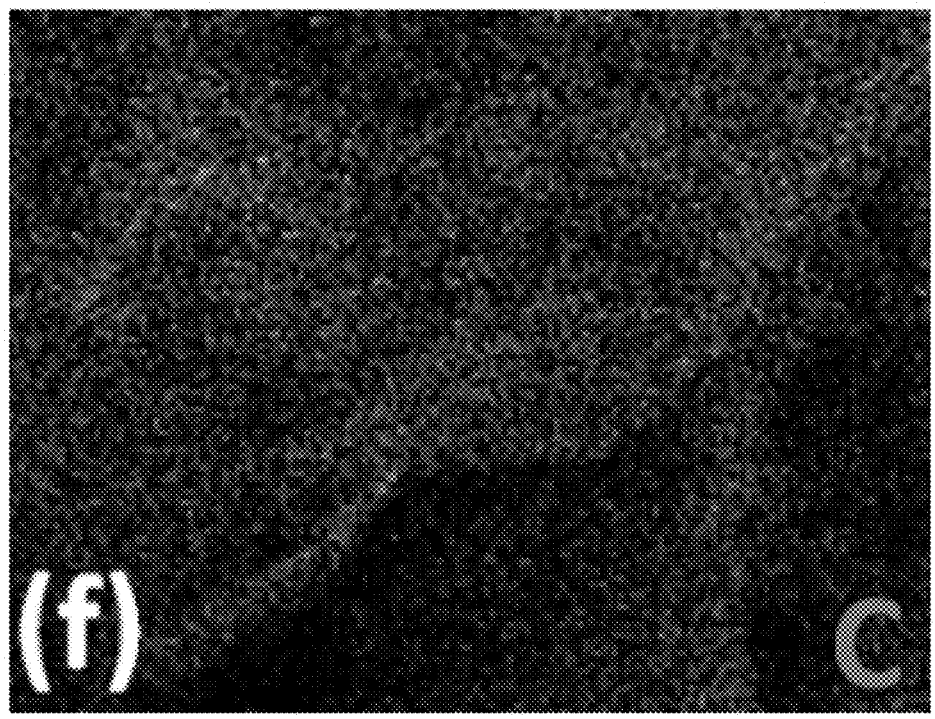

In FIG. 7E, the rate capability test with charge/discharge current densities ranging from 159.4 to 47818.3 mA/g, the capacities of the P@)RGO anode decays slowly at the first 20 cycles, which reaches a good agreement with the cycling zoo performance presented in FIG. 7D. The anode can deliver average capacities of 1165.4, 1105.4, 1081.8, 1039.2, 973.7, 892.9, 755.9, 510.6, and 135.3 mAh/g at the charge/discharge current density of 159.4, 318.8, 797, 1593.9, 3187.9, 7969.7, 15939.4, 31878.9, and 47818.3 mA/g, and then the capacity was stabilized at ~4100 mAh/g after switching back to 159.4 mA/g after 90 cycles. The representative charge/discharge curves at different current densities are presented in FIG. 7F, while the hysteresis was enlarged attributing to the increasing of current densities. At lower current density below 10 A/g, the major sodiation and desodiation plateaus at 0.2-0.1 V and 0.6-0.7 V can be located. At high current density ~47 A/g, the plateaus almost disappeared and the anode was showing a capacitor-like potential profiles. However, the typical phosphorus potential plateaus are visible at 31878.9 mA/g current density with an average specific charge capacity of 510.6 mAh/g, which is a visible improvement over the red phosphorus anodes reported recently. The superior rate performance presented above proved that the sodium ion transport kinetics was significantly improved by the nanosized phosphorus particles and the rate capability of the whole electrode was greatly boosted by the excellent electronic conductance of the architectural RGO network which serves as electron pathway.

To gain insight into the accompanying structural change of P@RGO anode during long cycling, both cross-section and planar SEM images at different magnifications with corresponding EDS element mapping profiles were collected from the electrode after 300 deep cycles, as shown in FIG. 8. Since NaClO$_4$ was employed as the sodium ion conducting salt in this report, the EDS phosphorus signal from the electrolyte salt, such as NaPF$_6$, can be excluded. In the after-cycling cross-section SEM as shown in FIG. 8A, the multilayer electrode structure was well maintained. And in FIGS. 8B and C, both phosphorus and carbon EDS signals can be detected from the cross-sectional area, indicating that most of the phosphorus was confined in the designed structure with a negligible mass loss from peeling off from the RGO sheets during cycling because of the minimized sodiation/desodiation stresses from the amorphous phosphorus nanodots and excellent mechanical support from the architectural RGO structure. In the after-cycling planar SEM image of the electrode as shown in FIG. 8D, the P@RGO network can be dearly observed with the EDS profiles specifying the distribution of phosphorus and carbon elements. Although we observed several phosphorus particles in submicrometer size, which were probably formed by the agglomeration between the phosphorus nanodots during cycling, the EDS profiles of the two elements reached a good coincidence, which implies that most of the phosphorus 287 nanodots survived during the 300 deep cycles and the architectural P@RGO electrode is favorable for long cycling usage.

In summary, red phosphorus nanodots were deposited on highly conductive RGO sheets densely and uniformly, the phosphorus particle size was controlled precisely in the range from hundreds to tens of nanometers. In particular, the phosphorus nanodots not only minimized the stresses during sodiation/desodiation for long cycle life, but also decreased the sodium ion diffusion length for fast charging/discharging; the electrochemical performance of the phosphorus anode was improved by taking the advantage from the RGO network which served as electron pathway and provided excellent mechanical support against the volume variation of phosphorus particles. The fabricated highly flexible P@RGO electrode can provide a 1211 mAh/g charge capacity toward sodium-ion at the initial cycles and retain 914 mAh/g after 300 cycles with a 1593.9 mA/g charge/discharge current density; the anode also achieved a 510.6 mAh/g capacity at ~31.8 A/g current density with typical phosphorus potential plateaus and a 135.3 mAh/g capacity at ~47.8 A/g current density, demonstrating the best rate performance of flexible red phosphorus anodes for Na-ion batteries reported in the literature to date. The superior cycling and rate performance, combined with the excellent mechanical properties of the P@RGO electrode, represents a suitable strategy for the development of inexpensive and versatile techniques for flexible and wearable sodium-based energy storage applications.

Methods and Experimental

Materials Preparation.

Graphene Precursor and Red Phosphorus Precursor Preparation:

Graphene oxide water suspension (Graphene Laboratories Inc.) was further chemically exfoliated by a modified method described in the Supporting Information with reduction details. Red phosphorus fine powder with 99% purity (Spectrum Chemical Mfg. Corp.) was used as precursor. The red phosphorus precursor was dried at 90° C. to remove the moisture and meshed with a 30 μm mesh after drying. Then the precursor and RGO powder were placed at two ends of a quartz tube with 10 cm in length with phosphorus to RGO mass ratio of 3:1, and then the quartz tube was sealed into an ampule under vacuum. The ampule was annealed in a tube furnace at 600° C. for 15 min and maintained at 280° C. for 10 h to covert white phosphorus to red phosphorus. After the heat treatment process, the ampule was transferred into glovebox and opened to take the composite out. The final product was washed in ethanol and then dried at 90° C. in glovebox. Additional preparation details are set forth below.

Reduced Graphene Oxide Preparation:

Graphene oxide water suspension was purchased from Graphene Supermarket (Graphene Laboratories Inc.), then was further treated according to modified Hummers method.[1] $H_2SO_4$ and $H_3PO_4$ were mixed with a volume ratio of 9:1, then 1% wt. graphite flakes (Sigma Aldrich) was added into the mixed acid solution. The mixture was heated to 50° C. and stirred for 10 hours, and then cooled with ice with appropriate amount of $H_2O_2$ added. After a one-hour standing, the supernatant liquid was removed and the rest of the mixture was diluted with water, repeating the procedure several times. The remaining solid material was then washed with water, HCl and ethanol several times, and then filtered and dried at 60° C. in air overnight. 100 mg of graphene oxide was loaded in a ceramic boat in a tube furnace followed by a heat treatment at 600° C. for 15 minutes in a gas mixture of $H_2$ and Ar (5:95 in vol.) under a total flow rate of 300 ml/min for reduction.

Free-Standing P@RGO Film Preparation:

the free-standing electrodes were prepared through vacuum filtration. A small amount of P@RGO powder was first added to the filtration system to obtain a thin layer of RGO network at the bottom. Then the P@RGO composite was mixed with ethanol, and the mixture was added to form the main part of the film. In order to obtain a smooth film with excellent mechanical properties, the power of the vacuum pump and the material loading rate during the filtration process were carefully adjusted. The obtained film was pressed to increase the mechanical stability finally. The mass of the film electrodes for the CR 2032 coin cells is around 2.6 mg.

Phosphorus-Doped RGO Preparation:

Phosphorus-doped RGO was obtained by a 30-minute post heat-treatment of the P@RGO composite at 600° C. in argon gas flow to remove the phosphorus nano-dots on the RGO sheets. The free-standing phosphorus-doped RGO film preparation is the same as the P@RGO film described above.

Material Characterization.

The surface morphology and energy-dispersive X-ray spectrum of the samples was characterized by a JOE: JSM-7001 microscope operating at 15 kV. A field emission transmission electron microscopy (JEOL JEM 2100F) was employed to obtain the TEM images and scanning transmission electron microscopy (STEM) images with EDS profiles. Samples were first dispersed in ethanol and then collected using carbon-film-covered copper grids for analysis. Thermogravimetric analysis was carried out using a Netzsch STA at a heating rate of 1° C. min$^{-1}$ under $N_2$ atmosphere.

Electrochemical Measurements.

Electrochemical tests were conducted in CR2032 coin cells with Na metal as counter electrodes and 1 M NaClO$_4$ in dimethyl carbonate (DMC) electrolyte with 10% fluoroethylene carbonate (FEC) by volume as additive in order to form a strong and stable solid electrolyte interface (SEI) film. The P@RGO film with a thickness of ~110 μm was cut into electrodes with a diameter of 16 mm for the electrochemical tests, and the mass of each electrode is ~2.6 mg. All batteries are assembled inside an argon-filled glovebox with both water and oxygen <0.1 ppm. For the commercial red phosphorus control sample, phosphorus powder is manually mixed with polyvinylidene fluoride (PVDF) in 1-methyl-2-pyrrolidinone (NMP) and carbon black in a weight ratio of 60:10:30. In both cycling stability and rate capability tests, batteries were cycled in the voltage range of 0.01 to 1.75 V vs Na/Na+ at room temperature. All capacities were calculated based on the total mass of P@RGO composite. Cyclic voltammetry was collected using a GAMRY Reference 600 test station with a scan rate of 0.1 mV/s and a scan range from 0 to 3.0 V vs Na/Na+.

Figure 3A:
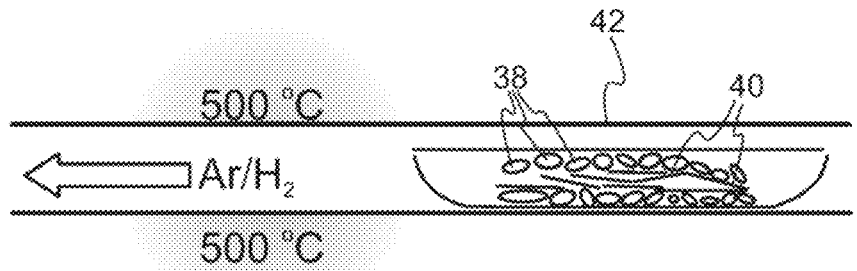
FIGS. 3A, 3B, 3C, and 3D. Schematic diagrams of the synthesis process of the RP/rGO composite: (A) pre-heat treatment; (B) flash-heat treatment; (C) cooling-down stage. (D) Schematic illustration of the nanostructure of the resulting RP/rGO composite.
Figure 3B:
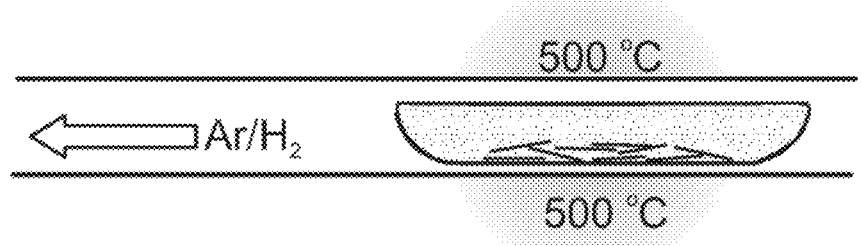
Figure 3C:
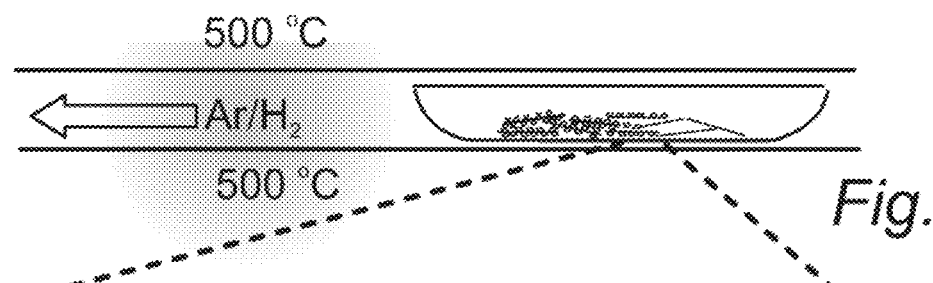
Figure 3D:
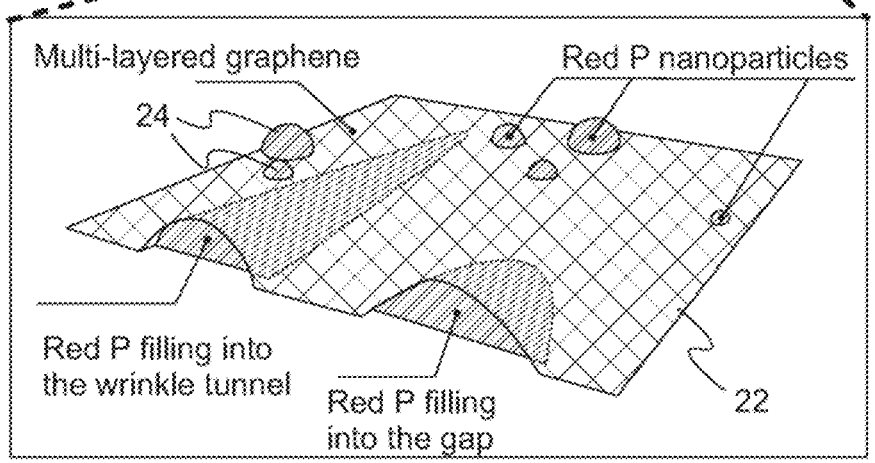

II. Single-Step Flash-Heat Synthesis of Red Phosphorus/Graphene Flame-Retardant Composite as Flexible Anodes for Sodium-Ion Batteries A facile flash-heat treatment to grow nanosized RP on the surface of reduced graphene oxide (rGO) sheets and in the void spaces between rGO layers is provided. In particular, the RP deposition and GO reduction were completed simultaneously in a single-step heat treatment. The synthesis method of the RP/rGO composite is described schematically in FIG. 3. As shown in FIG. 3(A), the RP and GO precursors were arranged in a RP/GO/RP three-layer structure inside a ceramic boat with a ceramic cover, and then loaded in a tube furnace under Ar/H$_2$ atmosphere. The boat was initially placed on the side of the heating zone; after heating the furnace to 500° C., the boat was moved into the heating zone, as shown in FIG. 3(B). As soon as P condensation was observed on a quartz tube placed downstream of the gas flow, the boat was immediately moved back to the original position, as illustrated in FIG. 3(C). Then, the boat was maintained at 300° C. for 6 h to convert white P to red P through a cooling-down process. The structure of the resulting RP/rGO composite, schematically shown in FIG. 3(D), combines several advantages: 1) Nanosized RP can shorten the ion diffusion length and thus enhance both ionic and electronic kinetics in the anode; 2) the RP particles occupy the gaps between the rGO sheets conformally, which protect them against volume variations during intercalation and extraction of Na ions; 3) the rGO network can provide an electron pathway and thus increase the electronic conductivity of the RP anode. Furthermore, the flash-heat treatment process reported here is simpler and more cost-effective than the traditional ball-milling and vaporization condensation methods, and thus enables the large-throughput manufacturing of RP anodes.

1. Experimental

1.1 Materials Preparation

To synthesize the RP/rGO composite, the RP precursor was initially dried at 90° C. to remove moisture and then filtered with a 30 μm mesh. The RP and GO powder precursors were arranged in a RP/GO/RP three-layer structure inside a ceramic boat with a ceramic cover. The boat was loaded into a tube furnace under $Ar/H_2$ flow (5% $H_2$), and initially placed on the side of the heating zone. After heating the furnace to 500° C., the boat was moved into the heating zone; as soon as P condensation was observed on the inner surface of a quartz tube located downstream of the gas flow (~1 min), the boat was immediately moved back to the original position. Then, the temperature of the boat was maintained at 300° C. for 6 h, to convert white P to red P. After a cooling-down process, the resulting RP/rGO composite was transferred into an Ar-filled glovebox, washed with methanol, and dried.

1.2 Materials Characterization

Surface morphology and energy-dispersive X-ray spectroscopy (EDS) measurements were performed with a JEOL JSM-7001 microscope operating at 15 kV, the samples were assembled onto the specimen by carbon tapes. Field-emission transmission electron microscopy (TEM, JEOL JEM 2100F, 200 kV) was employed to obtain TEM and scanning transmission electron microscopy (STEM) images, along with EDS profiles. The samples were first dispersed in ethanol through ultrasonication and then collected using carbon film-covered copper grids for the analysis. Thermogravimetric analysis (TGA) measurements were carried out using a Netzsch STA instrument at a heating rate of 1° C./min under $N_2$ atmosphere, in a temperature range from room temperature to 800° C. Raman spectra were recorded using a Renishaw InVia spectrometer with a 532 nm laser (10 μW) focused through a 100× objective lens. Raman spectra were collected at room temperature under ambient conditions, using glass slides as substrates to carry the powder samples.

1.3 Electrochemical Measurements

Electrochemical tests were conducted in CR2032 coin cells, with Na metal as counter electrode and 1 M $NaClO_4$ in dimethyl carbonate (DMC) electrolyte with 10% (v/v) fluoroethylene carbonate (FEC) as additive, to form a strong and stable solid electrolyte interface (SEI) film in the first cycle. A RP/rGO film with a thickness of ~110 μm was cut into electrodes with a diameter of 16 mm for the electrochemical tests, and the mass of each electrode was ~1.2 mg. All batteries were assembled inside an argon-filled glovebox with water and oxygen contents below 0.1 ppm. To prepare commercial RP control anodes mixed with rGO and carbon black (CB), RP powder was mixed with polyvinylidene fluoride (PVDF) in 1-methyl-2-pyrrolidinone (NMP) and rGO or CB in a weight ratio of 50:10:40, using high energy ball milling for 1 h in an argon-filled ball-mill jar. The resulting slurry was cast onto an Al foil, dried at 90° C. in air overnight, and then punched into electrodes with the size of CR2032-type cells. The mass loading of active material on the Al foil current collector was ~1.5 mg/cm². In the cycling stability and rate capability tests, batteries were cycled in the voltage range from 0.01 to 1.75 V vs. $Na/Na^+$ at room temperature. All capacities and current densities were calculated based on the mass of RP only, unless noted otherwise.

2. Results and Discussion

Figure 9A:
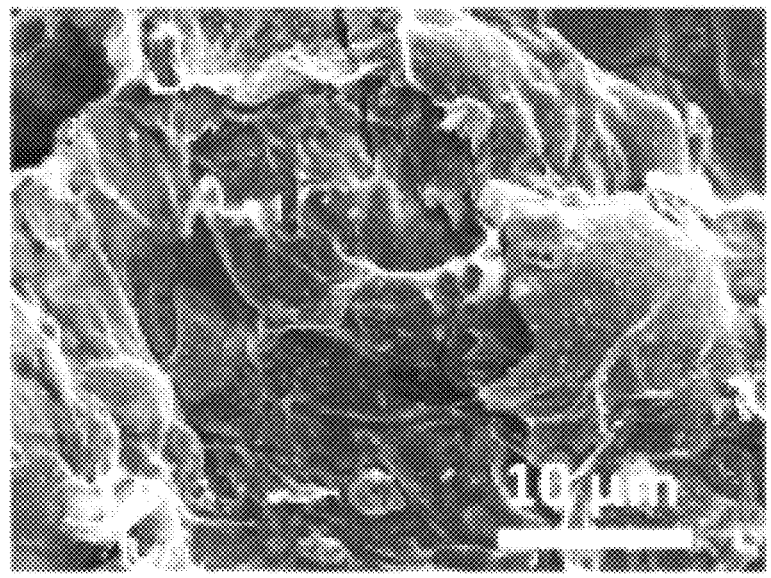
FIGS. 9A, 9B, 9C, 9D, 9E, and 9F. (A) and (B) SEM images of the RP/rGO composite at (A) 1,500× and (B) 4,000× magnification. (C) and (D) TEM and STEM images of a single piece of RP/rGO flake. (E) Enlarged STEM image of the RP/rGO composite, with corresponding EDS mapping profile of P element shown in (F). The RP particles occupying the void spaces between the rGO layers are marked by blue lines in (E).
Figure 9B:
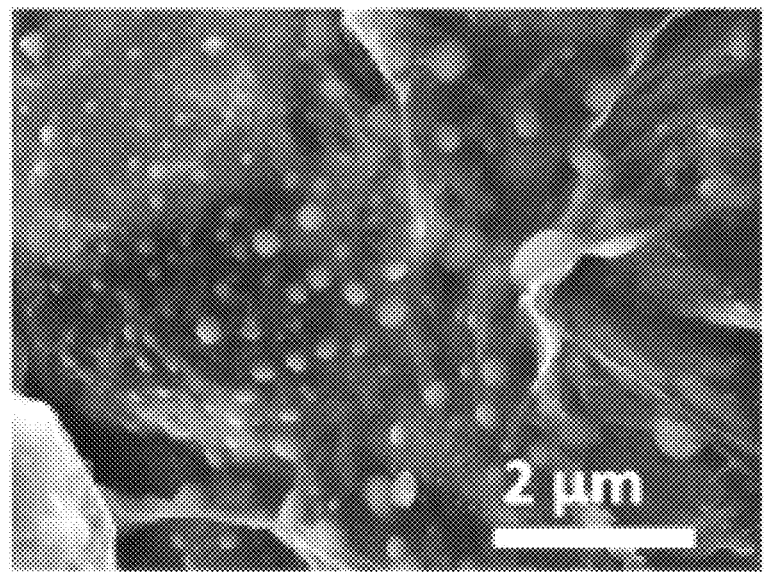
Figure 9C:
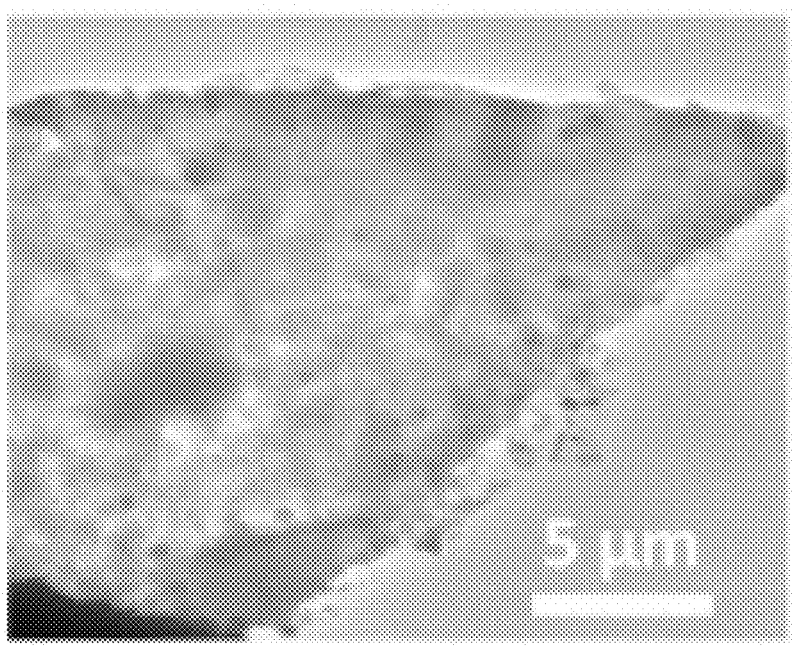
Figure 9D:
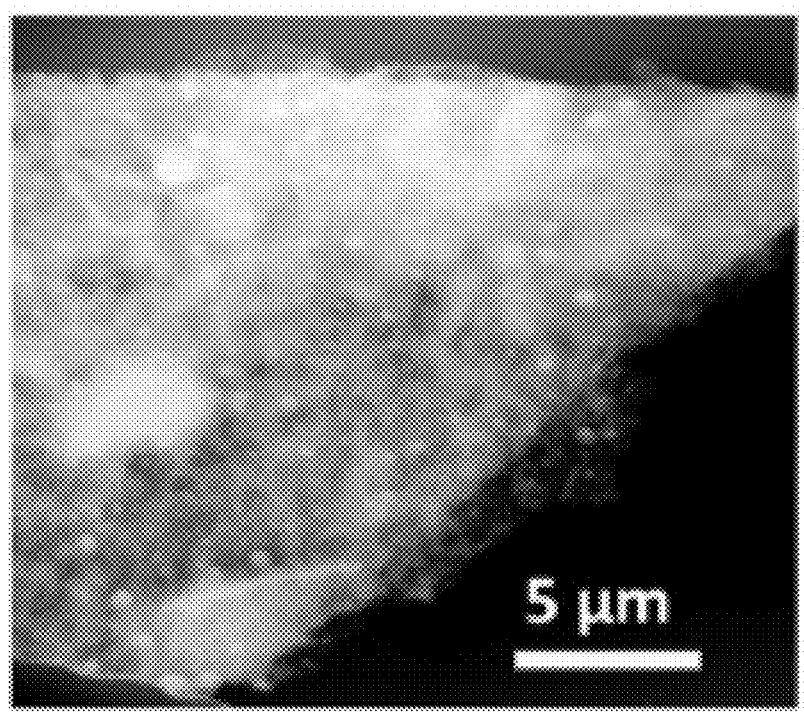
Figure 9E:
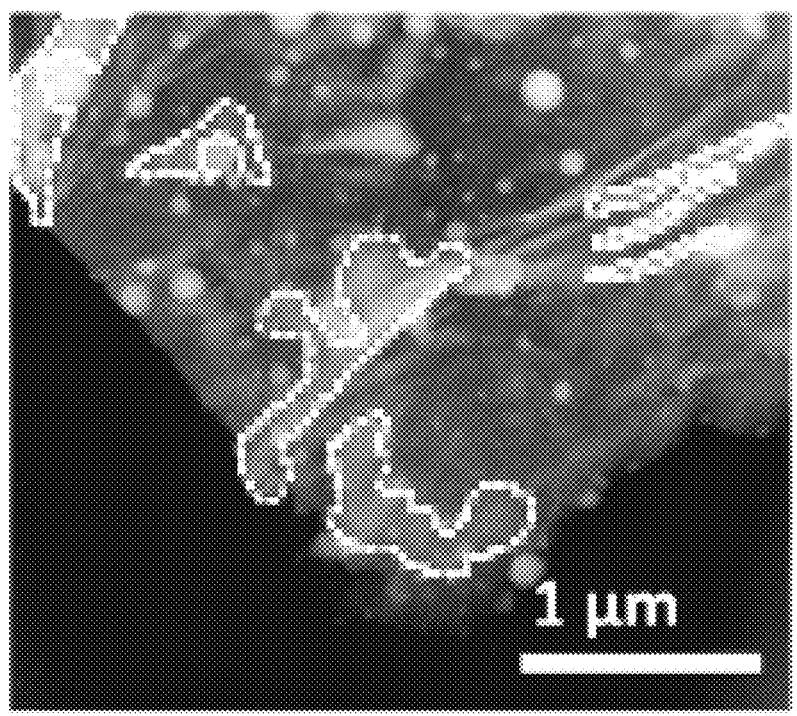
Figure 9F:
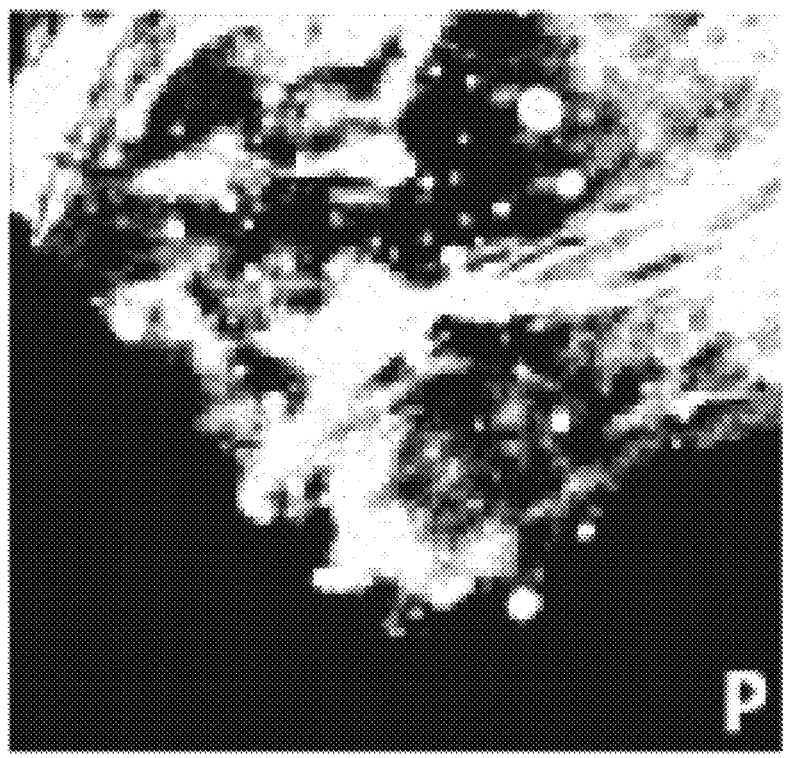

The scanning electron microscopy (SEM), TEM, and STEM images of the as-produced RP/rGO composite, discussed below, show the presence of RP nanodots deposited on the rGO surface and of aggregates of nanosized RP in the void spaces between rGO layers. The SEM images of the RP/rGO composite at different magnifications, shown in FIGS. 9(A) and 7(B), highlight the dense and uniform distribution of the nanosized P particles grown on the rGO sheets. FIGS. 9(C) and 9(D) show the TEM and STEM images, respectively, of a portion of RP/rGO flake, confirming the presence of P nanoparticles of morphology consistent with the SEM images. Dense growth of RP particles can be easily observed in the dark-field STEM image shown in FIG. 9(D), based on the sharp contrast difference between P and rGO. To further confirm the uniformity of the present samples, additional SEM and TEM images taken at the edge of a single piece of RP/rGO sheet were obtained. Further details of the architectural structure of the RP/rGO composite can be obtained from the enlarged STEM image shown in FIG. 9(E), whereas the corresponding EDS mapping of P element is displayed in FIG. 9(F): Besides the nanosized P particles deposited on the surface, considerable amounts of P occupy the void spaces between rGO layers through gaps and wrinkle tunnels (marked by blue dashed lines in FIG. 9(E)), indicating conformal protection of the P particles by the strong rGO layers. The TGA profiles of the RP/rGO composite and of an rGO control sample in nitrogen atmosphere were also obtained. The synthesized RP/rGO composite exhibits a sharp weight loss between 400 and 450° C. due to the vaporization of RP, and the weight percentage of RP in the composite was calculated as 57.9%.

Figure 10A:
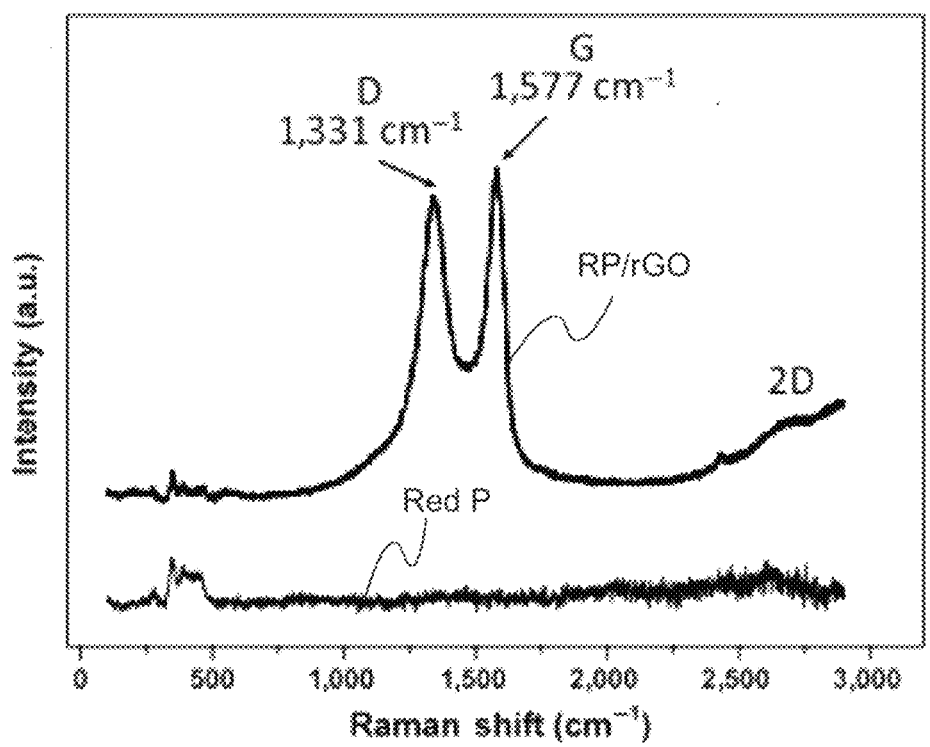
FIGS. 10A, 10B, 10C, and 10D. Raman spectra of RP/rGO composite and commercial RP powder. (B) XPS spectrum of synthesized RP/rGO composite and pristine GO powder. (C) High-resolution C is XPS spectrum of synthesized RP/rGO composite and pristine GO powder. (D) Optical images of a flexible RP/rGO film wrapped on a glass rod with a diameter of 5 mm, and of a punched electrode bent with a pair of tweezers.
Figure 10B:
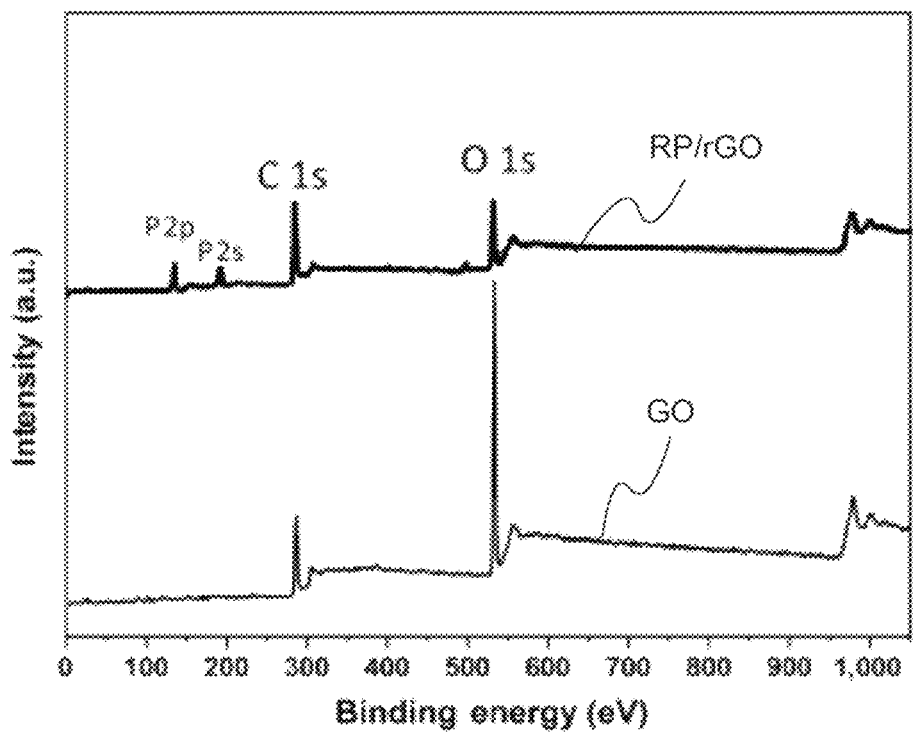
Figure 10C:
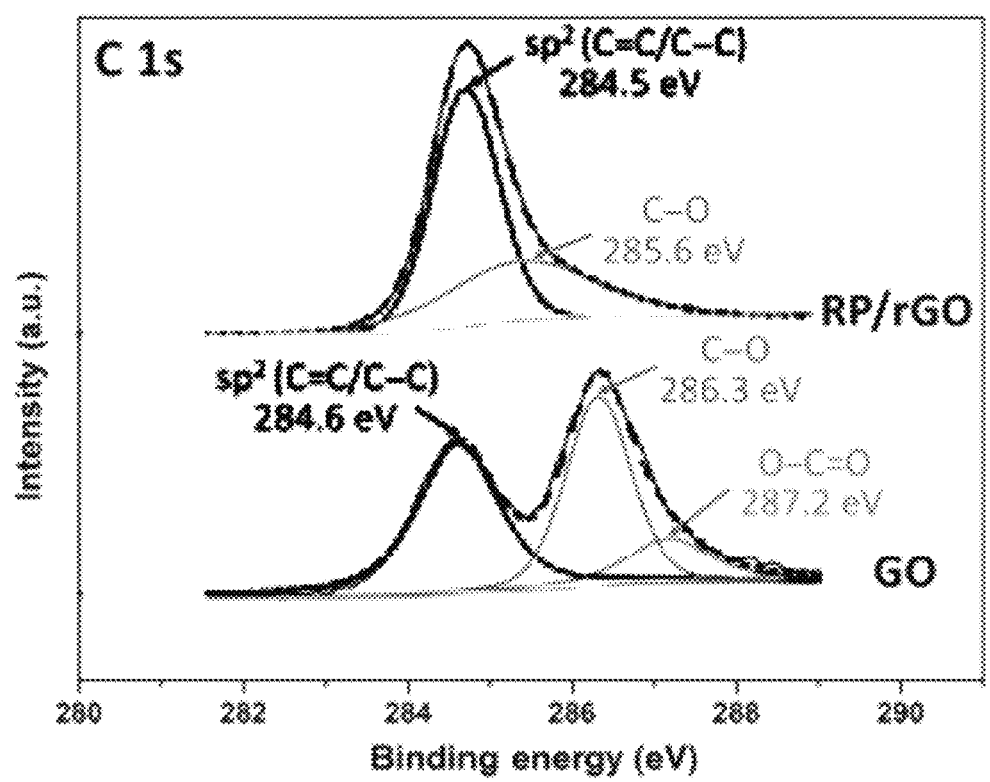
Figure 10D:
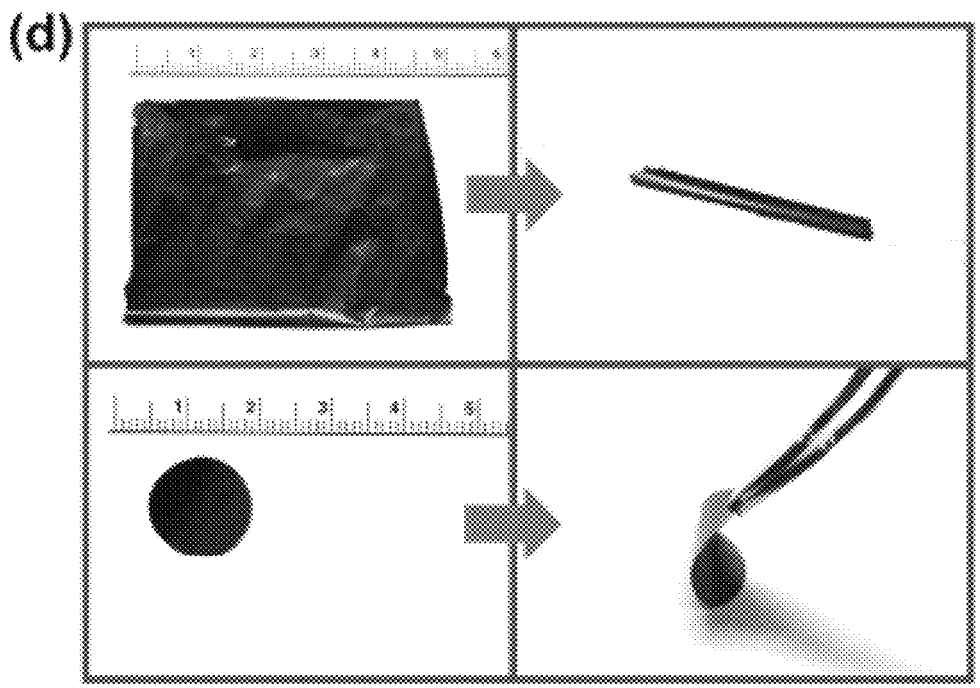

The Raman spectra of the RP/rGO composite and of commercial RP powder are displayed in FIG. 10(A). Besides the D and G bands peaking at 1,331 and 1,577 $cm^{-1}$, the spectrum of the RP/rGO composite contains a small broad 2D band, indicating the multilayered nature of the rGO sheets. Compared to the commercial RP sample, the RP signal was also detected between 300 and 500 $cm^{-1}$ in the Raman spectrum of the synthesized RP/rGO composite, indicating that the P domains observed in FIG. 9 correspond to the RP form. The XRD patterns of the GO, RP, and RP/rGO samples were also obtained. The GO precursor shows a major (002) peak at ~10°, which disappears after the flash-heat treatment, indicating the successful reduction of GO. FIG. 10(B) displays the X-ray photoelectron spectroscopy (XPS) spectrum of the RP/rGO composite and of the pristine GO used as precursor in the RP/rGO synthesis. Both 2p and 2s peaks of phosphorus are detected in the spectrum of the RP/rGO composite, while the intensity of the 0 1s peak is considerable reduced compared to the GO sample, indicating that most of the oxygen-containing functional groups were eliminated during the heat-treatment process. Further details on the reduction of GO can be obtained from FIG. 10(C), which shows the C is high-resolution XPS spectrum of the two samples. The spectrum of the pristine GO sample can be fitted with three Gaussian-Lorentzian peaks at 284.6, 286.3, and 287.2 eV, corresponding to C=C/C—C, C—O, and 0-C=0 bonds, respectively. The spectrum of the RP/rGO composite shows peaks at 284.5 and 285.6 eV, corresponding to C=C/C—C and C—O bonds, respectively. Compared with the GO sample, the intensity of the C—O peak of the RP/rGO composite is markedly reduced and the 0-C=0 peak almost vanishes, indicating that GO was thermally reduced during the heat treatment used to synthesize the RP/rGO composite in Ar/H$_2$ atmosphere. No obvious C—P bond signal was detected in the Raman and XPS spectra of the RP/rGO composite, implying that the heating temperature might be too low and/or the heating time might be too short to achieve a relatively high P-doping concentration in graphene during the synthesis process. The O 1s high-resolution spectra of the two samples confirm the thermal reduction of GO, as the 531.7 eV signal corresponding to the O=C bond of the GO sample disappeared after the heat treatment, and only the peak of the O—C bond at 533.1 eV was observed for the RP/rGO composite. The synthesized RP/rGO composite can be easily fabricated into highly flexible free-standing films through a filtration method, as shown in the optical images of FIG. 10(D). No visible fractures were detected in the film during bending on a glass rod with a diameter of 5 mm. The film was then punched into electrodes with a diameter of 17 mm for the electrochemical performance tests described below.

Figure 11A:
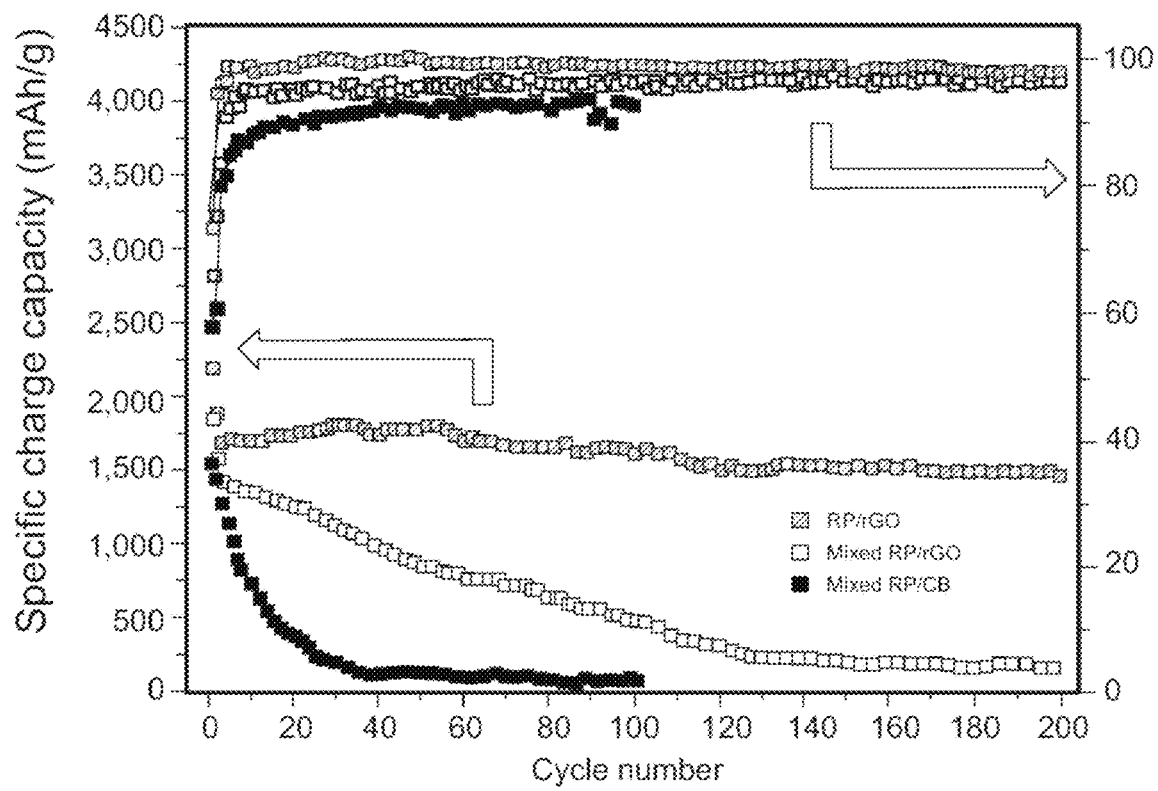
FIGS. 11A, 11B, 11C, and 11D. (A) Cycling performance of fabricated RP/rGO flexible film anode, commercial RP mixed with rGO, and commercial RP mixed with CB at a charge/discharge current density of 1 A/g, with corresponding potential profiles shown in (B). Rate performance of the RP/rGO anode, with potential profiles shown in (D).

The electrochemical performances of the RP/rGO composite and the commercial RP control sample were first investigated by galvanostatic charge/discharge cycling experiments between 0.01 and 1.75 V at a current density of 1 A/g and with Na metal as counter electrode, as shown in FIG. 11(A). As no obvious doping by P heteroatoms was detected in rGO, and the rGO network worked as current collector in the RP/rGO free-standing electrode, all current densities and capacities were calculated based on the mass of RP only, unless noted otherwise. Specific charge capacities of 2,197 and 1,883 mAh/g were observed in the first and second cycle, respectively. Afterward, the capacity showed a slight increase from 1,705 to 1,823 mAh/g from the 3rd to the 50th cycle, and then became stabilized at ~1,550 mAh/g between the 50th and the 200th cycle. In contrast, commercial RP mixed with rGO and CB delivered similar initial capacities, but suffered from a rapid capacity fading during the first 30 and 120 cycles. Thus, the cycling stability of the RP/rGO anode was significantly enhanced by the deposition of nanosized RP particles on the surface of rGO sheets and within the void spaces between rGO layers; in addition, the architectural rGO structure provided a conductive supporting network with superior mechanical properties.

The RP/rGO film electrode exhibited a 73.2% efficiency at the first cycle, which rapidly increased to ~98% after five cycles. Similar to silicon anodes for lithium-ion batteries, the relatively low initial efficiency may derive from Na consumption during SEI formation on the surface of RP particles deposited on graphene sheets without the conformal coating protection from graphene. The low initial Coulombic efficiency can represent a problem for practical applications of the RP anodes. However, methods such as pre-sodiation and artificial SEI film coating can be adopted to overcome this issue.

In order to determine the capacity contribution from the rGO with P heteroatom-doping, the cycling performance of the untreated rGO and P-treated rGO control was evaluated. The untreated and P-treated rGO samples deliver average specific charge capacities of 47 and 67 mAh/g, respectively, during 50 cycles at a 100 mA/g current density. The limited capacity increase of the P-treated rGO sample relative to the untreated rGO sample indicates that the P dopant concentration in graphene is relatively low, in good agreement with the XPS data presented in FIG. 10(D). This finding also implies that the P-doped rGO gives only a minor contribution to the capacity of the synthesized RP/rGO composite. FIG. 11(A) shows that the RP/rGO flexible film anode achieved an average capacity of 1,625 mAh/g during 200 cycles at 1 A/g charge/discharge current density, which would decrease to 941 mAh/g if calculated based on the total mass of the free-standing electrode. The capacity of the present free-standing RP/rGO film electrode during long cycling tests is comparable to that of silicon anodes employed in lithium-ion batteries containing conductive carbon and binder additives in 15%-20% weight ratio, and becomes actually higher if we take into account the weight of the copper foil used as anode current collector in traditional battery cells.

Figure 11B:
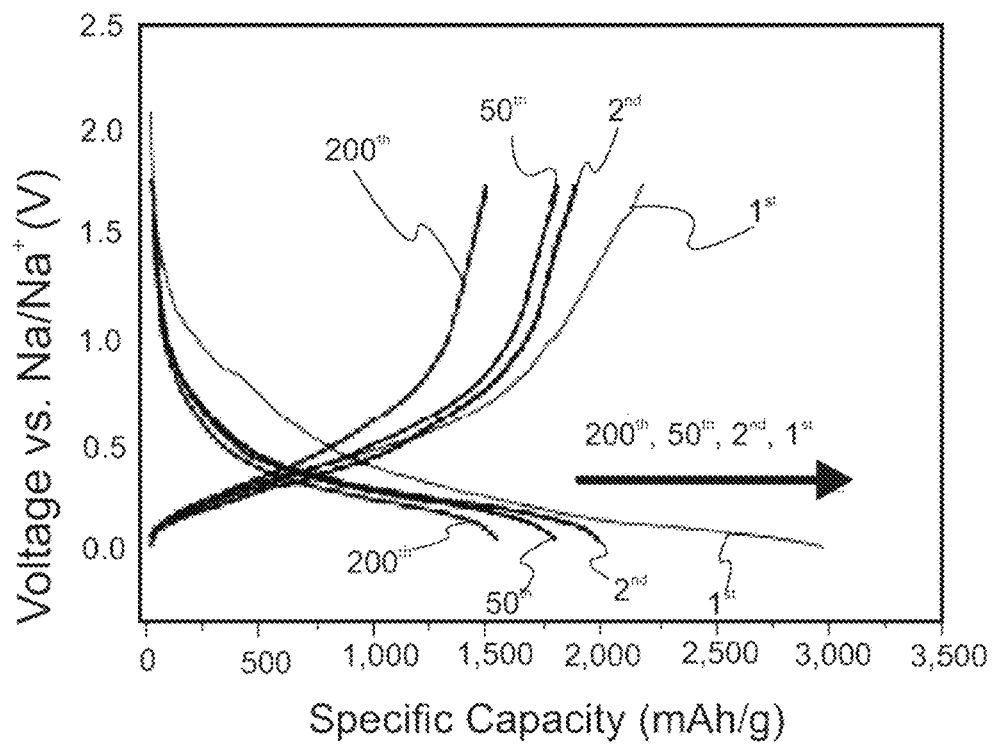

In addition to the capacity, the voltage profiles provide further details about the electrochemical sodiation/de-sodiation process in the present anodes. The voltage profiles corresponding to the cycling performance test of the RP/rGO anode are shown in FIG. 11(B), with cycle numbers labeled on the side. A small potential plateau at 0.7 V and the main sodiation plateau between 0.5 and 0.1 V were observed during the first sodiation process. The minor plateau at 0.7 V is due to the formation of the SEI film caused by the decomposition of the electrolyte, which contributes to the irreversible capacity in the first cycle. The disappearance of this plateau in the following cycles indicates that a stable SEI film was formed. The discharge curves at the 2nd, 50th, and 200th cycle consistently present a main plateau at 0.4-0.1 V. All charge curves exhibit a main de-sodiation plateau at 0.2-0.7 V.

Figure 11C:
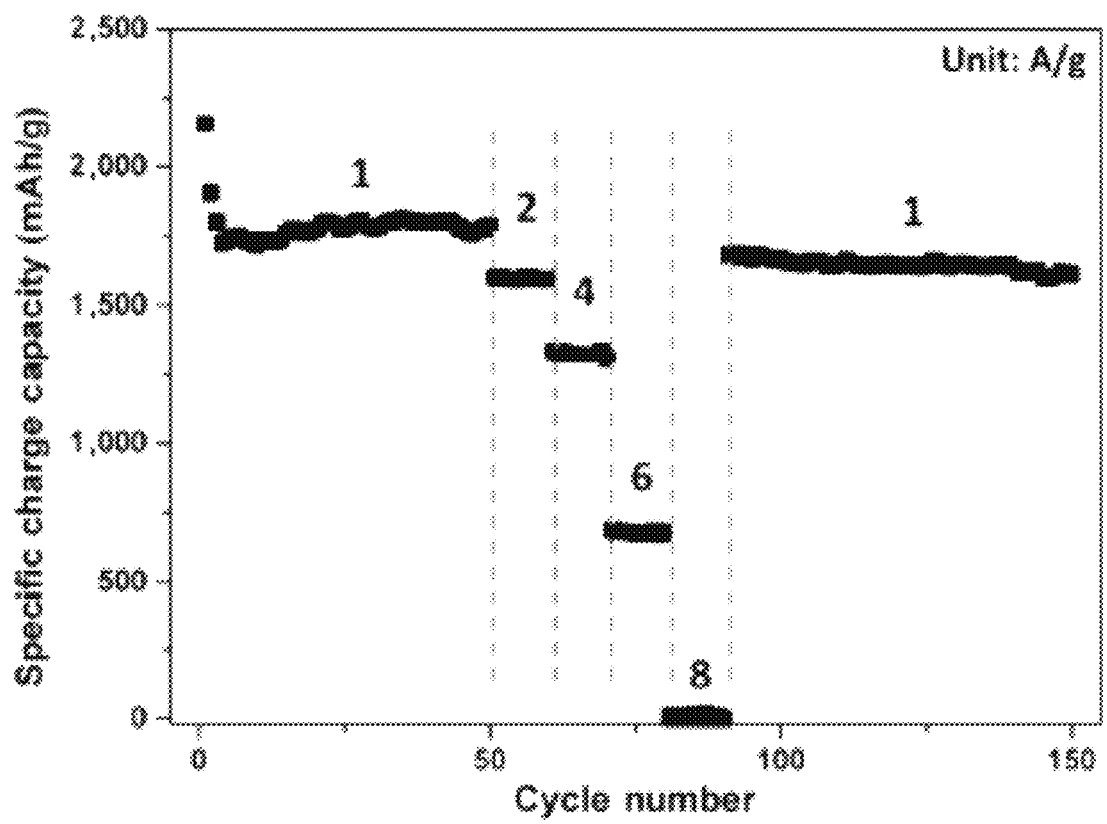
Figure 11D:
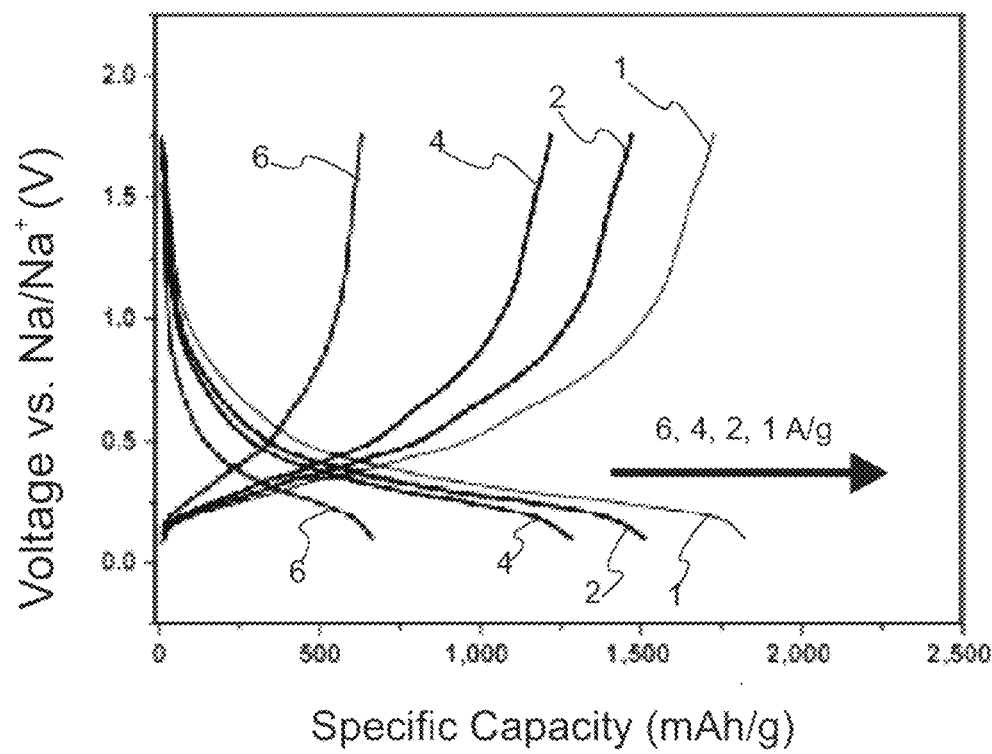
Figure 12A:
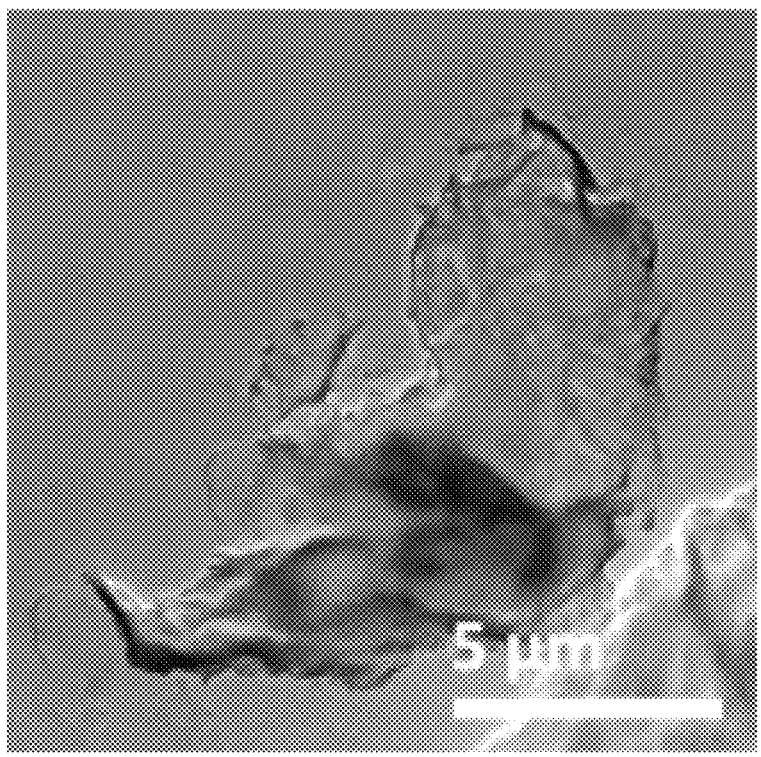
FIGS. 12A, 12B, 12C, 12D, 12E, and 12F (A) and (B) TEM and STEM images of the flexible RP/rGO anode after 200 cycles, with corresponding EDS spectrum (C) and elemental mapping profiles of phosphorus (D), sodium (E), and carbon (F).
Figure 12B:
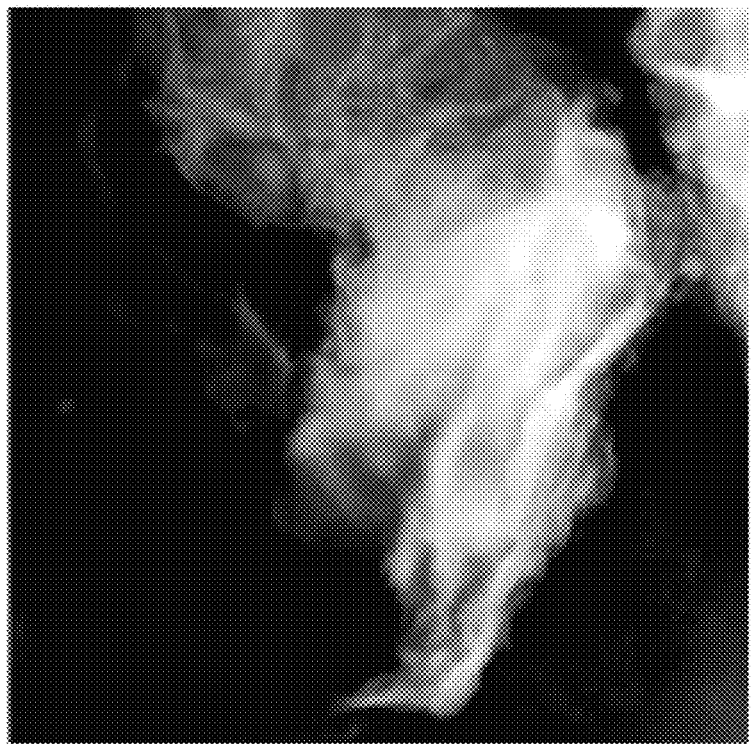
Figure 12C:
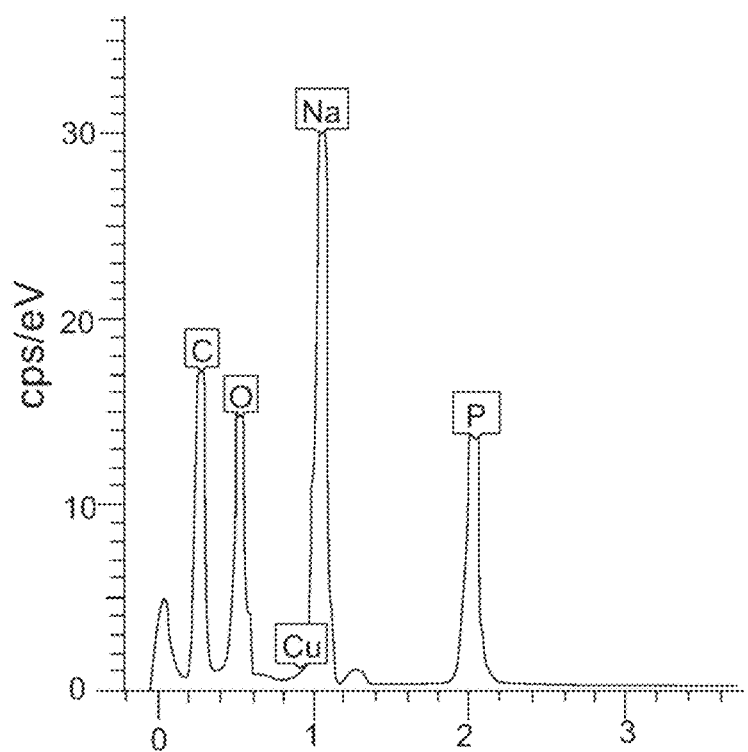
Figure 12D:
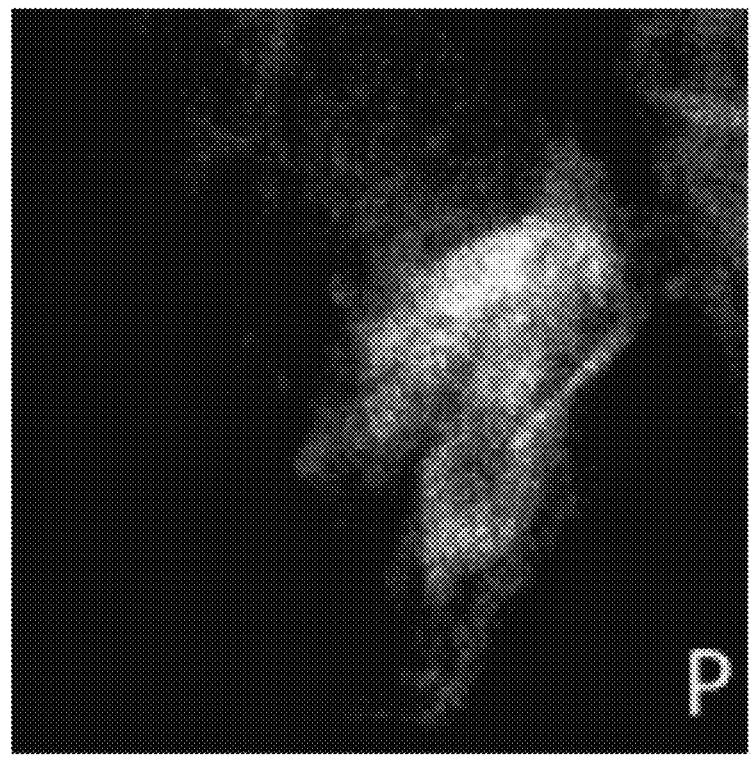
Figure 12E:
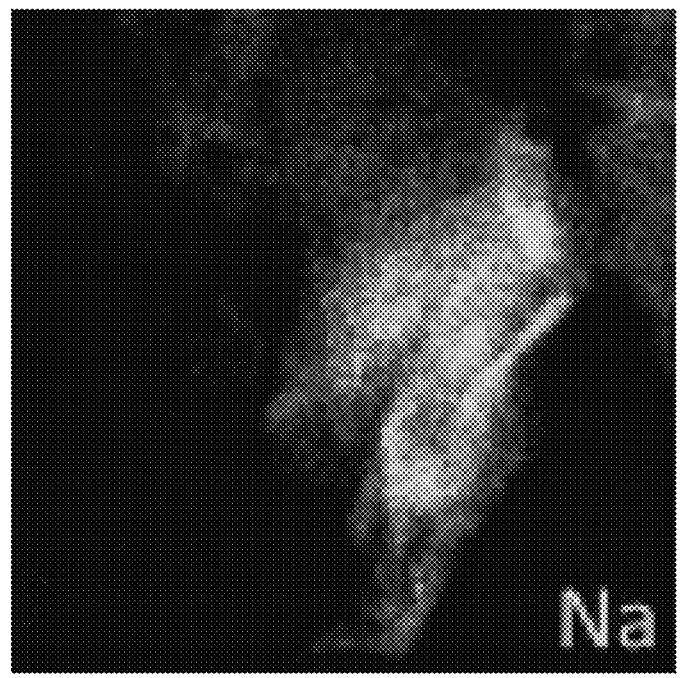
Figure 12F:
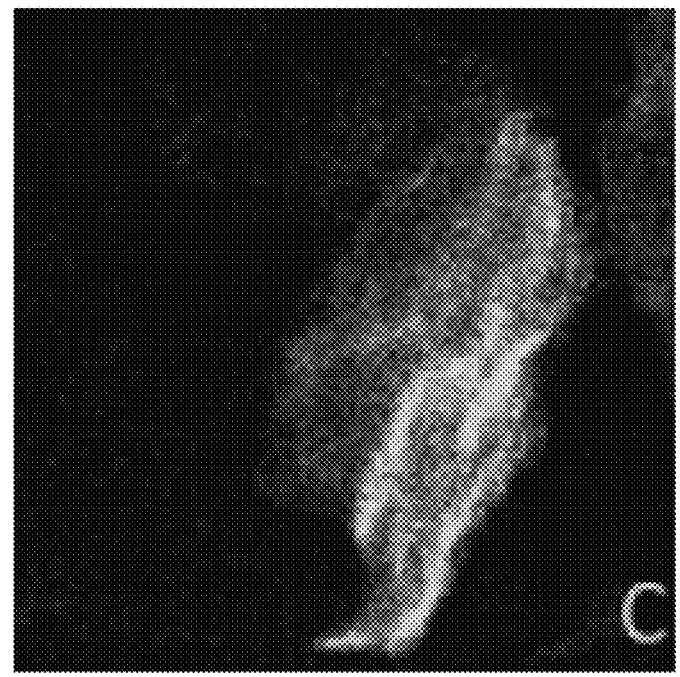

FIG. 11(C) shows the results of the rate capability tests performed with charge/discharge current densities ranging from 1 to 8 A/g. The anode delivered average capacities of 1,786, 1,597, 1,324, and 679 mAh/g at current densities of 1, 2, 4, and 6 A/g, respectively, while a capacity of ~10 mAh/g was observed at the current density of 8 A/g. The anode retained a capacity of ~1,640 mAh/g upon switching the current density back to 1 A/g after 90 cycles. Representative charge/discharge curves at different current densities are shown in FIG. 11(D). The enlarged hysteresis between the charge and discharge curves was attributed to the higher current densities, and the main sodiation and de-sodiation plateaus were located at 0.1-0.4 and 0.2-0.7 V for all curves. The superior rate performance discussed above can be attributed to the significant enhancement in the sodium ion transport kinetics due to the nanosized RP, and to the improved rate capability of the whole electrode associated with the excellent electronic conductance of the architectural rGO network serving as electron pathway.

To gain insight into the structural changes in the RP/rGO anode during long-term cycling, TEM images and the corresponding EDS elemental mappings of the electrode were collected after 200 cycles in a fully sodiated status, as shown in FIG. 12. Before the analysis, the post-cycling electrode was immersed in electrolyte solvent overnight to remove the Na salt. The use of NaClO$_4$ as the sodium conducting salt in this study rules out P signals originating from the electrolyte salt, as in the case of NaPF$_6$. The post-cycling TEM and STEM images of a single piece of the RP/rGO composite are shown in FIGS. 12(A) and 10(B). The corresponding EDS spectrum is presented in FIG. 8(C), while the elemental mappings are presented in FIGS. 12(D)-12(F) for carbon, sodium, and phosphorus, respectively. The elemental mapping profile of phosphorus shows the presence of an RP flake of micrometer size attached to the graphene sheet, indicating that agglomeration of RP nanosized particles took place on the surface of rGO sheets during cycling. The mapping profiles of three elements reached a good coincidence, which implies that most of the active RP material survived during the 200 cycles performed, and that the architectural structure of RP/rGO is suitable for long-term cycling.

Figure 13A:
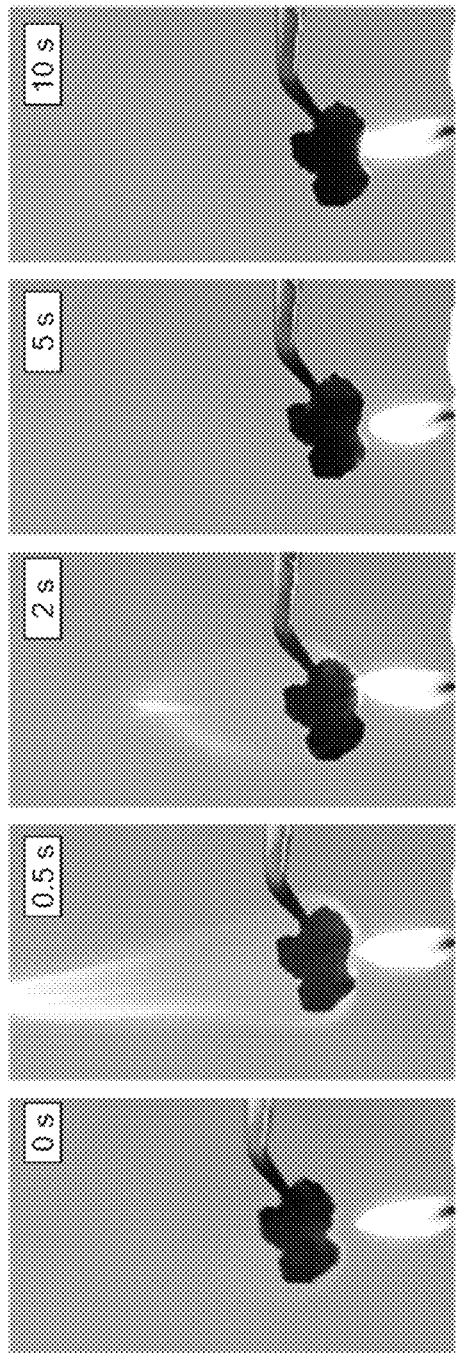
FIGS. 13A and 13B. Combustion tests of RP/rGO flexible film (A) and rGO film (B) at t=0, 0.5, 2, 5, and 10 s; t=0 s is defined as the time when the flame can be clearly observed on the films.
Figure 13B:
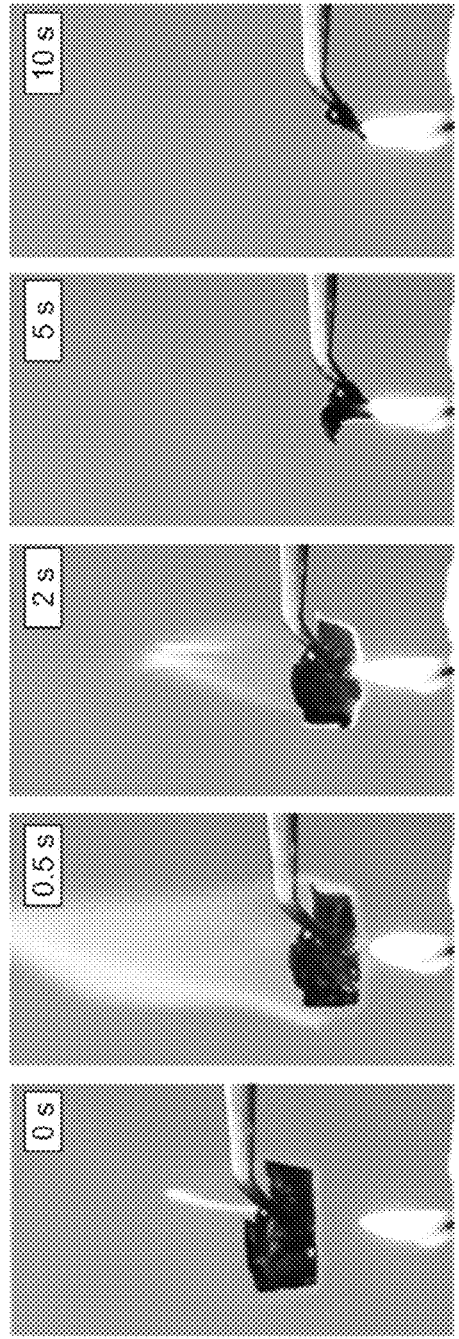

Although the batteries have achieved considerable success in both academic and industrial fields, safety risks associated with the use of highly flammable liquid organic electrolytes remain a critical issue. Many strategies have been explored to overcome this problem, such as the development of non-flammable electrolytes, the addition of flame-retardant additives to the electrolyte, and separator engineering approaches. The flame retardancy of the electrodes is one of the key factors for the design of safer batteries, as it may prevent flame spreading after ignition of the electrolyte. Since RP has been one of the most widely used fire retardants over the past several decades, the flame retardancy of the RP/rGO composite was investigated by combustion tests comparing the performance of the RP/rGO film and a control rGO film. Both films were immersed in the electrolyte solvent for 3 h before the tests. The optical images corresponding to the tests at t=0, 0.5, 2, 5, and 10 s are presented in FIGS. 13(A) and 13(B) for the RP/rGO and rGO films, respectively; t=0 s is defined as the time when the flame can be clearly observed on the films. The flame was fully developed at 0.5 s, with red-hot edges formed on both films due to the combustion of the electrolyte. Afterward, the flame was attenuated due to exhaustion of the electrolyte on the surface of (and absorbed by) the films. Most of the rGO film was burned out from 5 to 10 s, with the red-hot edge moving inward. On the other hand, the red-hot edge of the RP/rGO film vanished at ~5 s, and only a small portion of the film was burned out between 5 and 10 s. The RP/rGO film achieved excellent flame retardancy because of the formation of a phosphoric acid derivative, which can isolate the burning material from oxygen and catalyze char layer formation on the material surface, further preventing flame formation.

3. CONCLUSIONS

In summary, we have developed a single-step flash-heat treatment to deposit nanosized RP on the surface of rGO sheets and in the void spaces between rGO layers. Both the RP growth and GO reduction were completed within the single-step flash-heat treatment. The nanosized RP not only reduced the internal stress during sodiation/de-sodiation, leading to long cycle life, but also decreased the sodium ion diffusion length, enhancing the transport kinetics. The RP anode exhibited improved electrochemical performance, owing to the rGO network that served as electron pathway and provided excellent mechanical support to the RP particles in the void spaces between rGO layers against volume variations during cycling. The resulting RP/rGO flexible anode delivered specific charge capacities of 1,786, 1,597, 1,324, and 679 mAh/g at charge/discharge current densities of 1, 2, 4, and 6 A/g, and an average capacity of 1,625 mAh/g during 200 deep cycles at 1 A/g, which would convert to 941 mAh/g if it was calculated based on the total mass of the free-standing RP/rGO film electrode. Moreover, the RP/rGO film also obtained excellent flame retardancy by taking advantage of the RP ingredient. The superior electrochemical performances of the RP/rGO flexible film electrode, combined with its improved flame retardancy, highlight the considerable potential of these systems for the development of inexpensive, safe, and wearable Na-based energy storage devices.

Figure 14A:
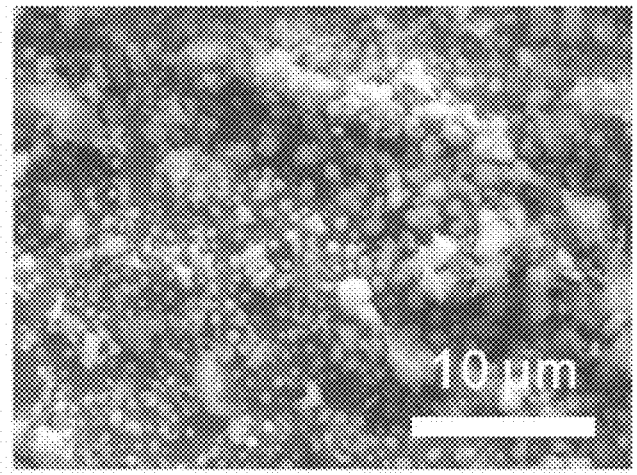
FIGS. 14A, 14B, 14C, 14D, 14E, 14F, 14G, and 14H. (A) Planar and (C) cross-section SEM images of the precursor RP/rGO film; the same fields of view are shown EDS elemental maps of phosphorus concentration in (B) and (D). (E) Planar and (F) cross-sectional SEM images of the pressure-synthesized BP/rGO film. (G) XRD patterns of the GO, RP/rGO precursor, as-prepared and post-cycling BP/rGO samples. (H) The Raman spectra of RP/rGO, as-prepared and post-cycling BP/rGO samples.
Figure 14B:
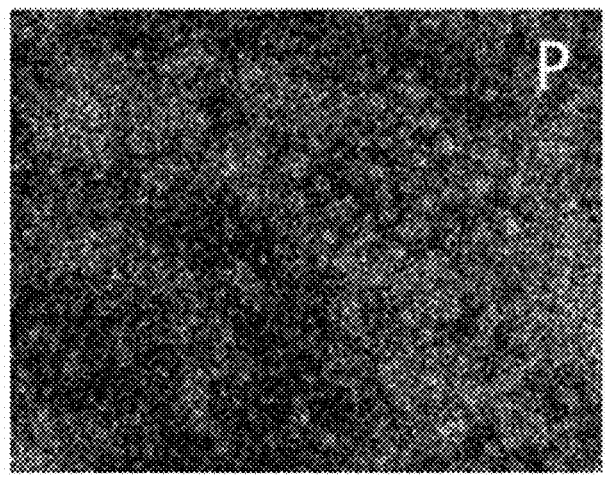
Figure 14C:
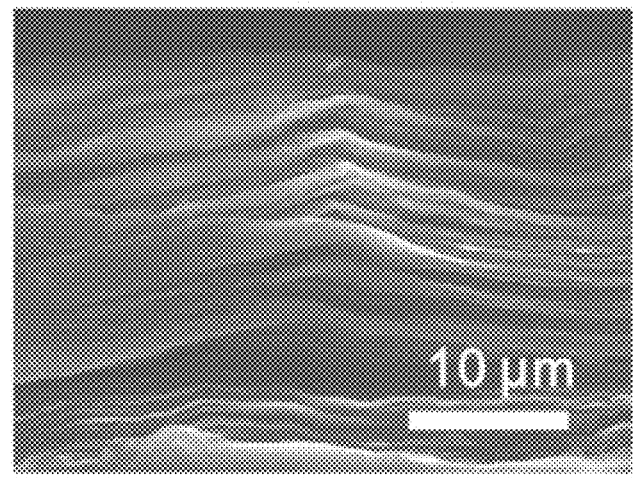
Figure 14D:
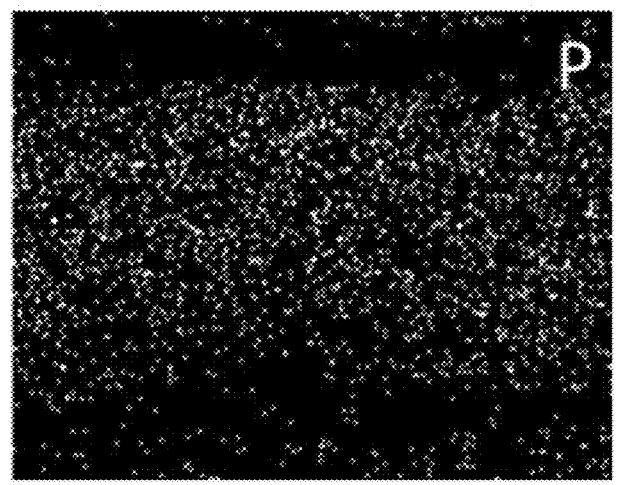
Figure 14E:
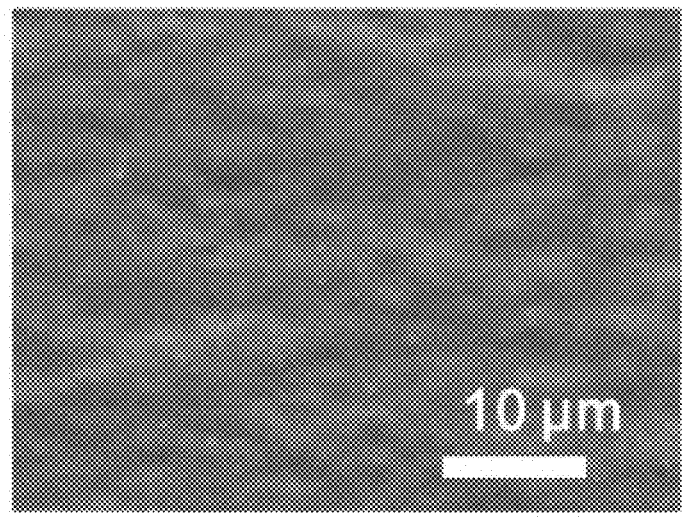
Figure 14F:
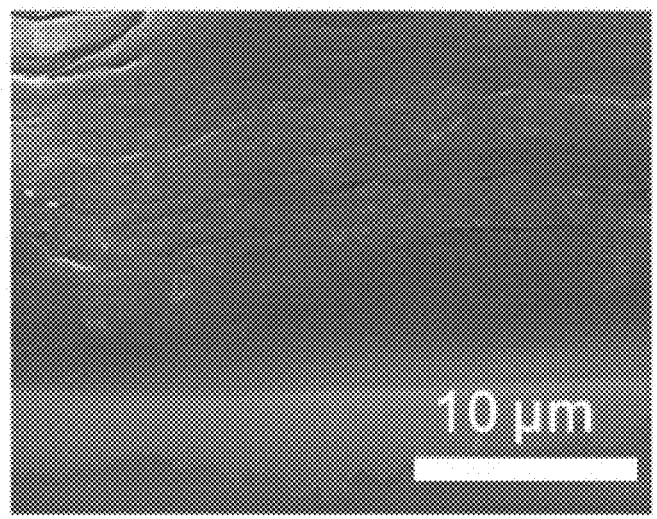
Figure 14G:
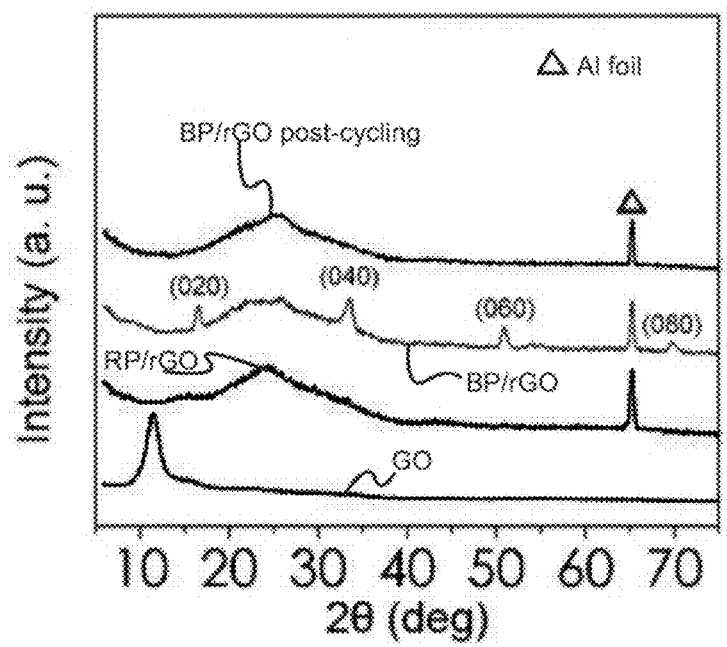
Figure 14H:
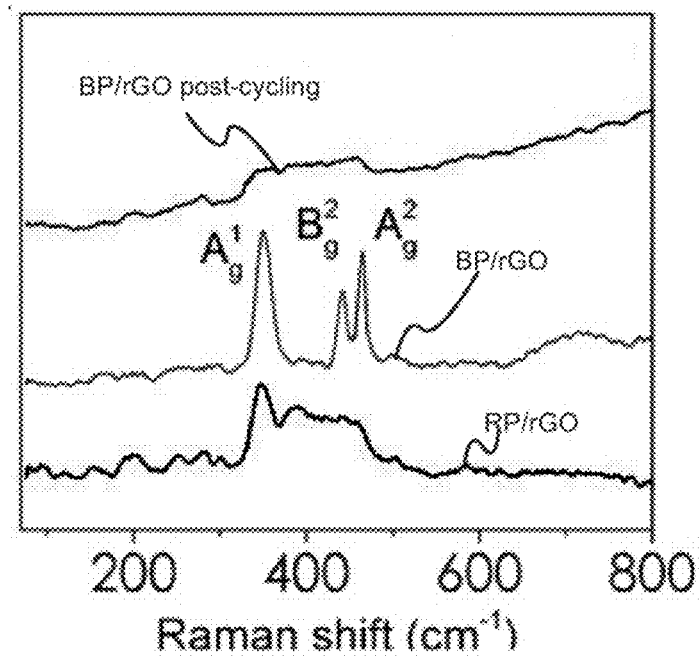

III. Room-Temperature Pressure Synthesis of Layered Black Phosphorus-Graphene Composite for Sodium-Ion Battery Anodes As depicted in FIG. 5, the formation of the BP/rGO layered structure electrodes were economically and scalably synthesized under a pressure of about 8 GPa at room temperature. The RP/rGO precursor was first synthesized using a flash-heat-treatment method described above. Briefly, the commercial RP and GO powder were arranged in a three-layer structure inside a ceramic boat with cover in a tube furnace under Ar/H$_2$ flow. The 2-minute flash-heat-treatment was control by moving the boat into and out of the hot zone. The RP/rGO precursor was assembled into a film through filtration to form the layered structure. Thermogravimetric analysis (TGA) of the RP/rGO precursor in a nitrogen atmosphere show that the composite yields a sharp weight loss between 400° C. and 430° C. due to evaporation of red phosphorus. The indicated weight percentage of phosphorus in the composite is 78.3%. Samples of RP/rGO film were transferred onto alumina foil current collectors and 10 to 20 discs of RP/rGO/Al were stacked together for the RP to BP conversion in a multi-anvil cell, as illustrated in FIG. 5B. The assembly was held at 8 GPa for 4 hours and then slowly decompressed over 10 hours to ensure complete RP to BP conversion and minimal cracking during expansion. The synthesized BP/rGO/Al discs were directly employed as electrodes in the electrochemical tests, without any carbon black or polymer binder additives. In the BP/rGO layered structure, the high conductivity of both BP and graphene facilitates sodium ion transport and thereby accelerates the electrochemical reaction rate of the whole battery system. The excellent mechanical properties of the graphene phase accommodate the volume differences between BP and Na$_3$P, stabilizing the nanostructure. In this study, although most of the BP active materials were amorphized after 500 deep cycles at 40 A/g, the capacity was maintained ~640 mAh/g, indicating that the electrochemical kinetics was not damaged by the amorphization of BP, which might be polyamorphous, and implying that the resulting amorphous BP is different than the amorphous RP discussed in the prior art. The simple two-step synthesis of these layered BP/rGO electrodes, without carbon black or polymer binder, is convenient and reliable method of preparing phosphorus anodes, offering excellent possibility for scalable production of composites for sodium-ion batteries Results and Discussion Initial Characterization:

After the pressure synthesis, the BP/rGO layered composite and its precursor were characterized by scanning electron microscopy (SEM) with energy-dispersive X-ray spectroscopy (EDS), X-ray diffraction (XRD) and Raman spectroscopy. The planar and cross-sectional SEM images of the precursor RP/rGO film and as-prepared BP/rGO film are shown alongside EDS maps of phosphorus Kα X-ray intensity in FIG. 14A to 14F. In FIGS. 14A and 14B, red phosphorus particles with dimensions varying from hundreds of nm to several µm can be clearly visualized on the graphene sheet. The cross-sectional SEM image and phosphorus X-ray map of the RP/rGO film in FIGS. 14C and 14D clearly show the layered structure of the red phosphorus between graphene sheets. In the planar and cross-section SEM images (FIGS. 14E and 14F) of the pressure-synthesized BP/rGO anode, the surface is transformed to a uniform flat plane, no discrete phosphorus particles are visible, and the layered structure is notably denser than in the starting material shown in FIG. 14C. The overall thickness of the film decreased upon pressing and recovery from ~35 µm to 18 µm. The XRD patterns (Cu Kα radiation) of the GO, the RP/rGO precursor, a sample of the as-prepared BP/rGO, and a sample of the tested BP/rGO after a cyclic performance test are all given in FIG. 14G. The GO control sample exhibits a peak at 2θ=12° that disappears and is replaced by a broad peak at ~24° in the RP/rGO precursor, indicating that GO is reduced to graphene during the flash-heat-treatment synthesis process. The peaks of the commercial RP are not visible in the composite, suggesting RP may become amorphous at this stage. On the other hand, the as-prepared BP/rGO sample shows four characteristic peaks of BP, which can be assigned to the lattice plane reflections (020), (040), (060) and (080). The X-ray photoelectron spectroscopy (XPS) data of GO powder and RP/rGO precursor was performed; the XPS results support the conclusion that the GO was reduced in the synthesis process of RP/rGO. The Raman spectra (532 nm laser radiation) of the RP/rGO precursor and of the BP/rGO samples both as-prepared and after cyclic testing are shown in FIG. 14H. After pressure synthesis, the broad RP Raman band from 300 to 500 cm$^{-1}$ disappeared entirely, whereas the as-prepared BP/rGO material clearly shows the characteristic peaks of BP at 364, 440 and 469 cm$^{-1}$, corresponding to $A_g^1$, $B_g^2$ and $A_g^2$ lattice vibrational modes. The disappearance of the broad RP Raman band and the appearance of the BP characteristic peaks suggest most of the RP precursor has been converted to BP.

Figure 15A:
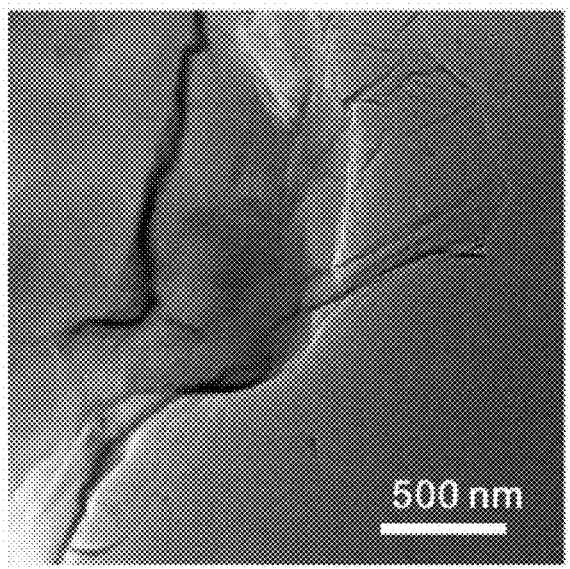
FIGS. 15A, 15B, 15C, 15D, 15E, and 15F. (A) TEM and (B) STEM image of the BP/rGO composite, with the corresponding maps of X-ray intensity by EDS for (C) phosphorus and (D) carbon. (E) Enlarged TEM image and (F) high-resolution TEM image of the area marked with light blue rectangle in (E) with the corresponding FFT images shown in the insets.
Figure 15B:
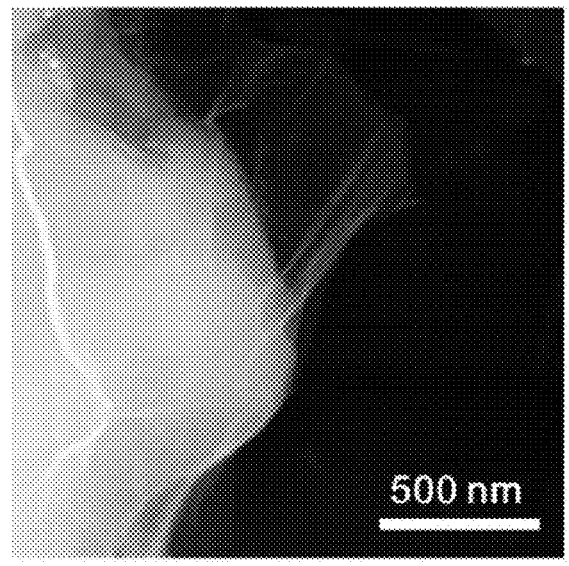
Figure 15C:
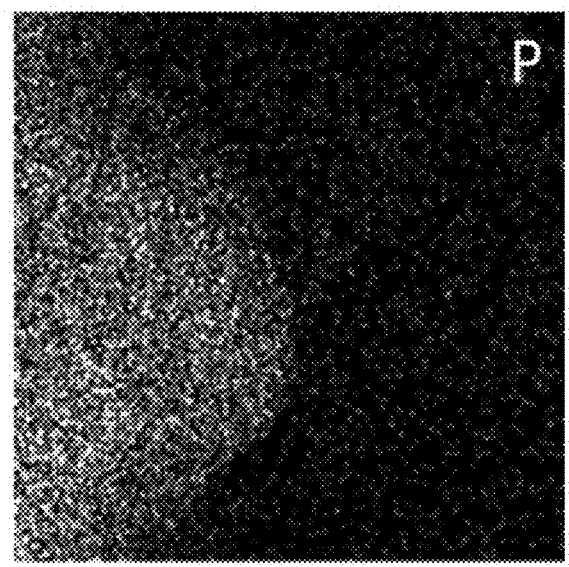
Figure 15D:
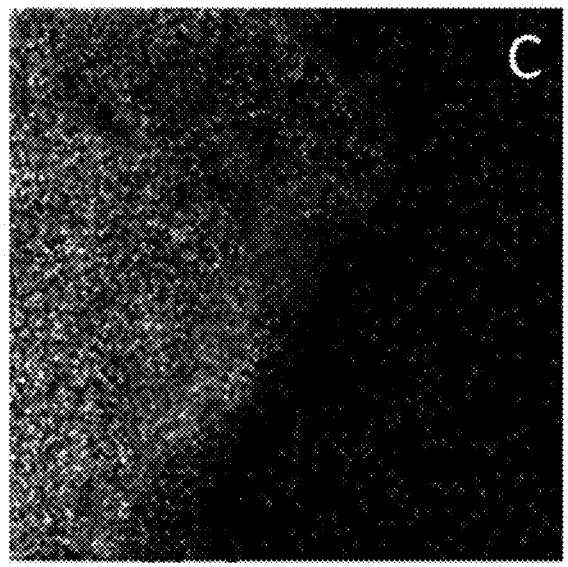
Figure 15E:
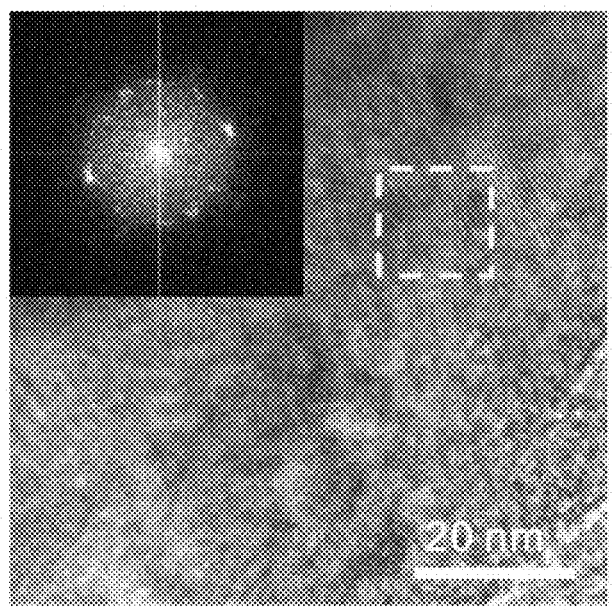
Figure 15F:
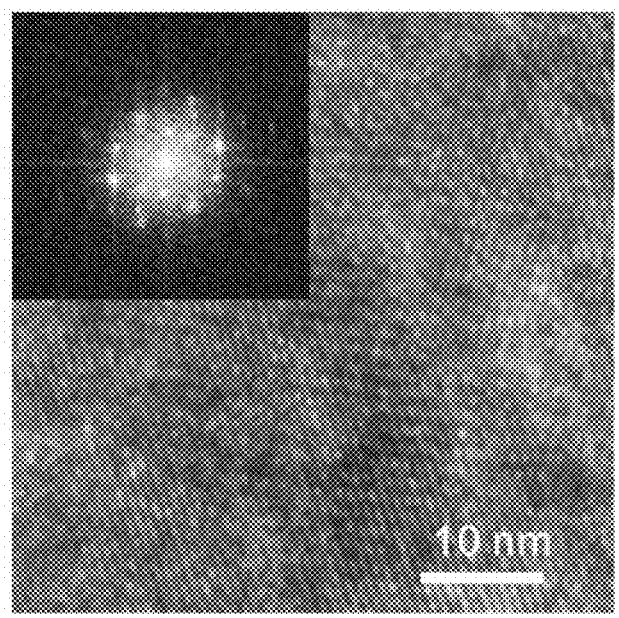

The transmission electron microscopy (TEM) image and the corresponding scanning transmission electron microscopy (STEM) dark-field image are shown alongside maps of the EDS intensity of the phosphorus and carbon X-rays are given in FIG. 15A to 15D. The images show that the graphene layers wrap around the BP, indicating good contact between the active material and supporting network in the designed BP/graphene layered structure. In the enlarged and high-resolution TEM images (FIGS. 15E and 15F), the BP crystal lattice spacing can be clearly observed forming coherent crystallites with dimensions up to ~100 nm, but the poly-crystalline nature of the material at the scale of the whole images is confirmed by reflections from multiple crystallites, approaching Bragg rings, in the fast Fourier transform (FFT) images shown as insets in FIGS. 15E and 15F.

Figure 16A:
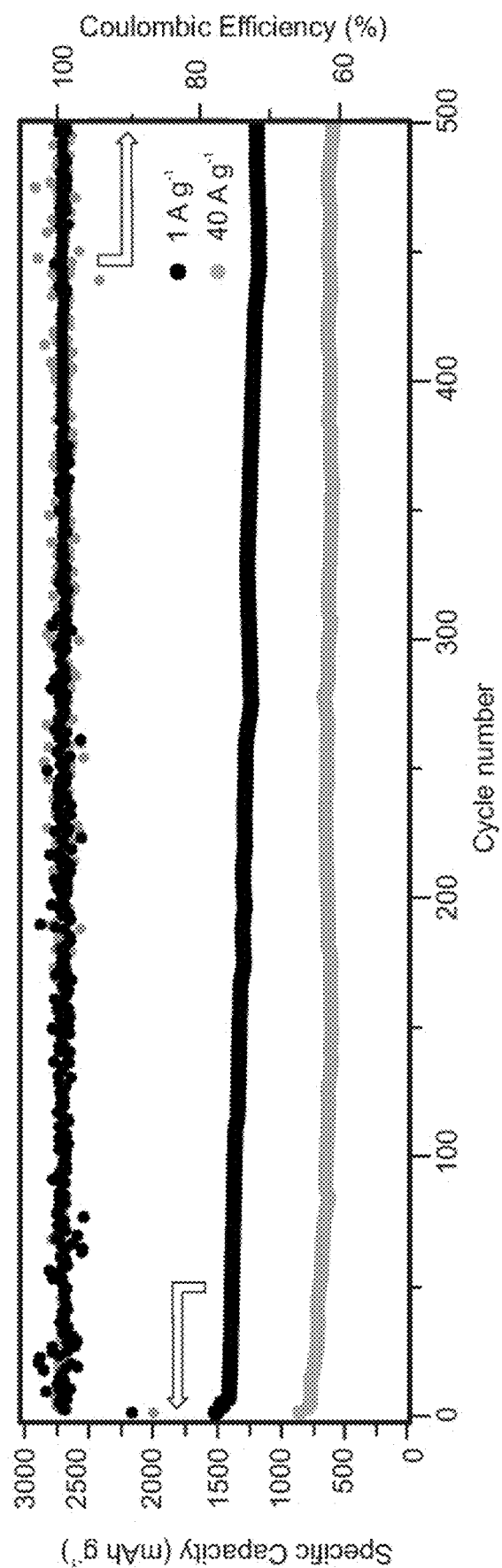
FIGS. 16A, 16B, 16C, 16D, and 16E. (A) Cycling performance of the BP/rGO anodes at charge and discharge current densities of 1 and 40 A/g in black and red color, respectively; specific capacity is plotted as solid curves against the left-hand axis, whereas Coulombic efficiency is plotted as open circles against the right-hand axis. (B) Charging and discharging potential profiles at 1 A/g current density (black curve in (A)), shown for selected cycle numbers. (C) Rate performance of the BP/rGO anode for a series of tests with five cycles at each value of current density. (D) Charging and discharging potential profiles for the rate tests presented in (C), color-coded by current density. (E) Electrochemical impedance spectra for RP/rGO and BP/rGO anodes.

Electrochemical Tests:

The electrochemical performance of layered BP/rGO anodes were tested in coin cells with sodium foils as counter electrodes. Because the synthesized BP/rGO anodes are free of carbon black and polymer binder, all capacities and current densities are calculated based on the total mass of the BP/rGO electrode material in this work, unless specified otherwise. First, the cycling performance of our BP/rGO anodes was investigated by galvanostatic charge and discharge between 0.01 and 1.5 V at current densities of 1 and 40 A/g, as shown in FIG. 16A. At 1 A/g current density, the BP/rGO electrode presented a high initial coulombic efficiency of 89.5% and an initial specific discharge capacity of 1680.3 mAh/g for the first reaction cycle with sodium. After that, a charge capacity of 1503.9 mAh/g was observed for the first cycle and capacity decayed from 1474.8 to 1364.3 mAh/g over the first 100 cycles (92.5% retention). Charge capacity stabilized at 1250 mAh/g after 500 cycles. On the other hand, at 40 A/g current density, the anode presented a slightly lower initial efficiency of 86.6%. Charge capacities of 851.9 and 791.6 mAh/g were observed in the first and second cycles and capacity stabilized at ~640 mAh/g after 500 cycles. However, compare to current density of 1 A/g, cycling performance at 40 A/g shows a larger fluctuation. We believe higher current rate would introduce larger over potential, which results in larger efficiency fluctuation in sequence. In particular, at higher current rate, due to the kinetic limitation and hysteresis, the Na ions can get trapped in the host materials, and the sodiation/de-sodiation reactions may become partially irreversible with new SEI film formation at other locations.

Figure 16B:
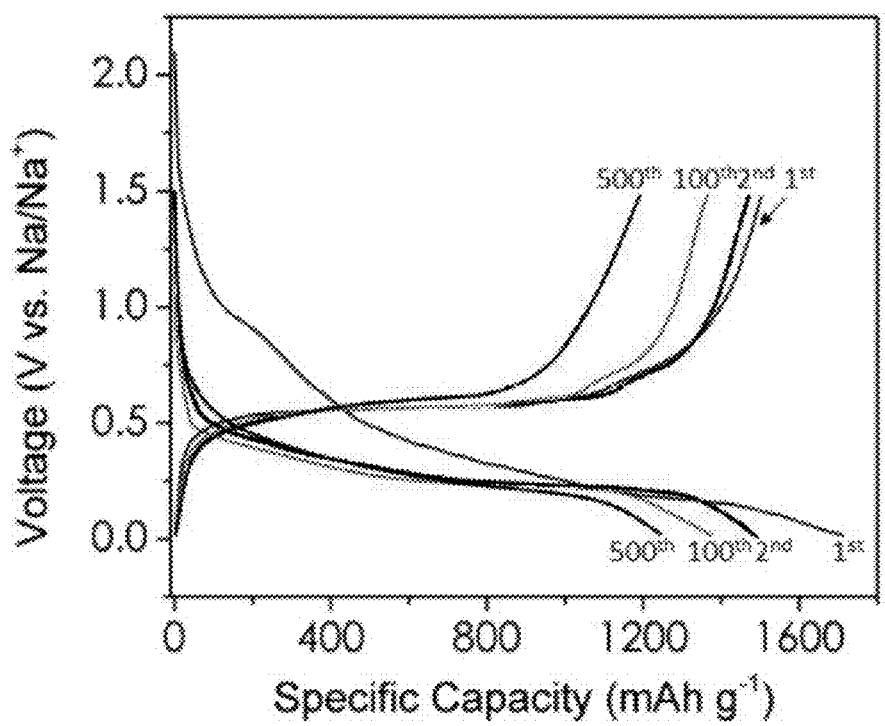

Capacity is a key performance indicator, but voltage profiles reveal additional details about the electrochemical sodiation and de-sodiation reactions in this anode. The voltage profiles of the cycling performance test are depicted in FIG. 16B with cycle numbers labeled on individual curves. The first sodiation process displays a small potential plateau at 0.7-0.9 V and a major sodiation potential plateau at 0.5-0.2 V. The small plateau is due to SEI film formation in the electrolyte, dimethyl carbonate (DMC) with fluoroethylene carbonate (FEC) additive, which is responsible for the irreversible capacity. The discharge curves consistently present major plateau at 0.4-0.2 V for the $2^{nd}$, $100^{th}$ and $500^{th}$ cycle. On the other hand, all the charge curves ($1^{st}$, $2^{nd}$, $100^{th}$, and $500^{th}$ cycle) exhibit major de-sodiation plateau at 0.4-0.6 V.

Figure 16C:
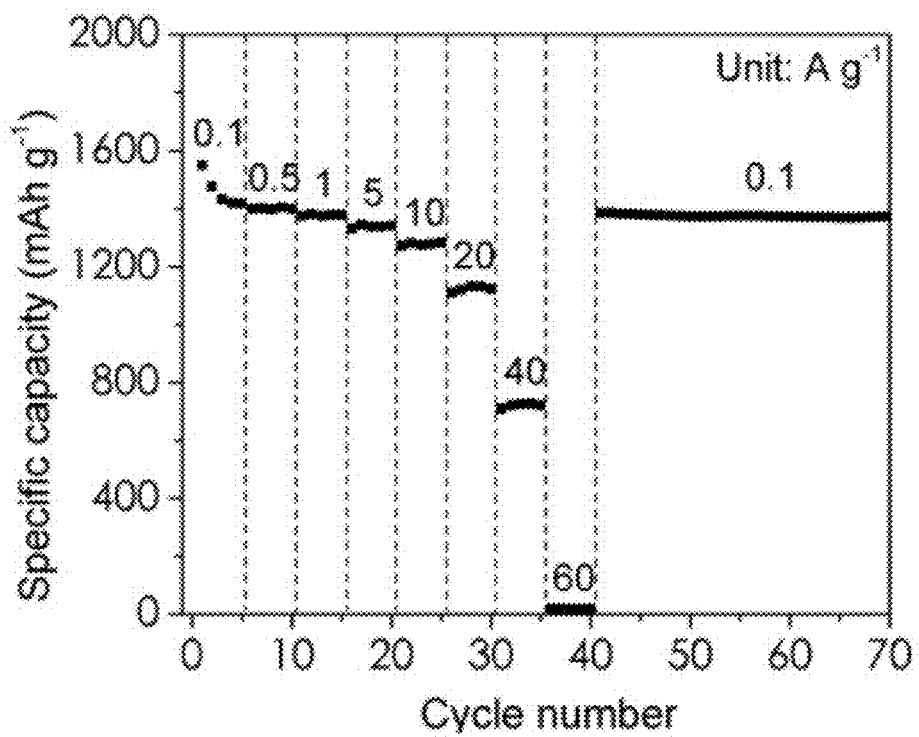
Figure 16D:
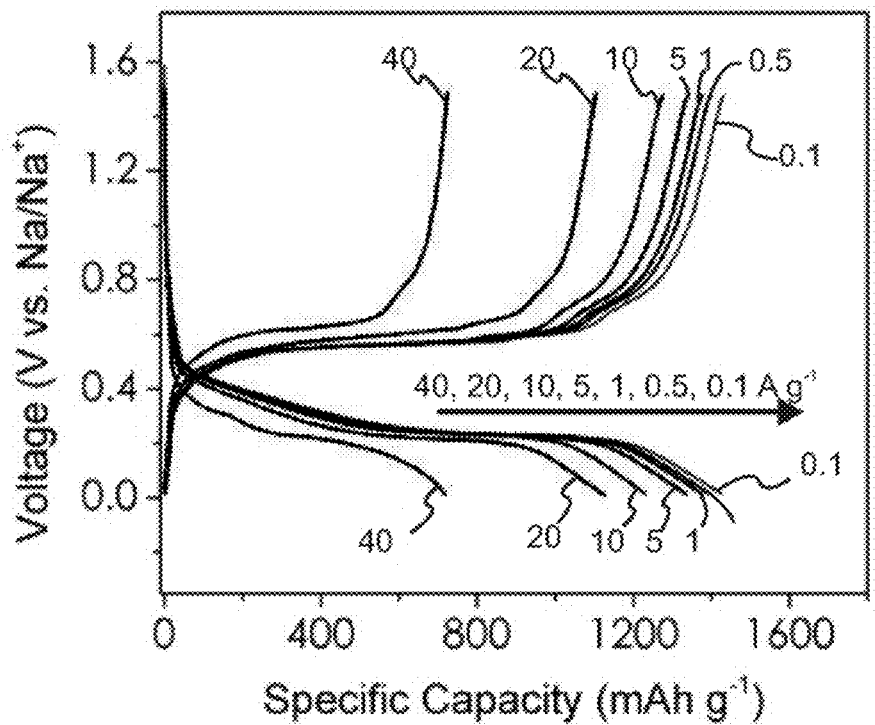
Figure 16E:
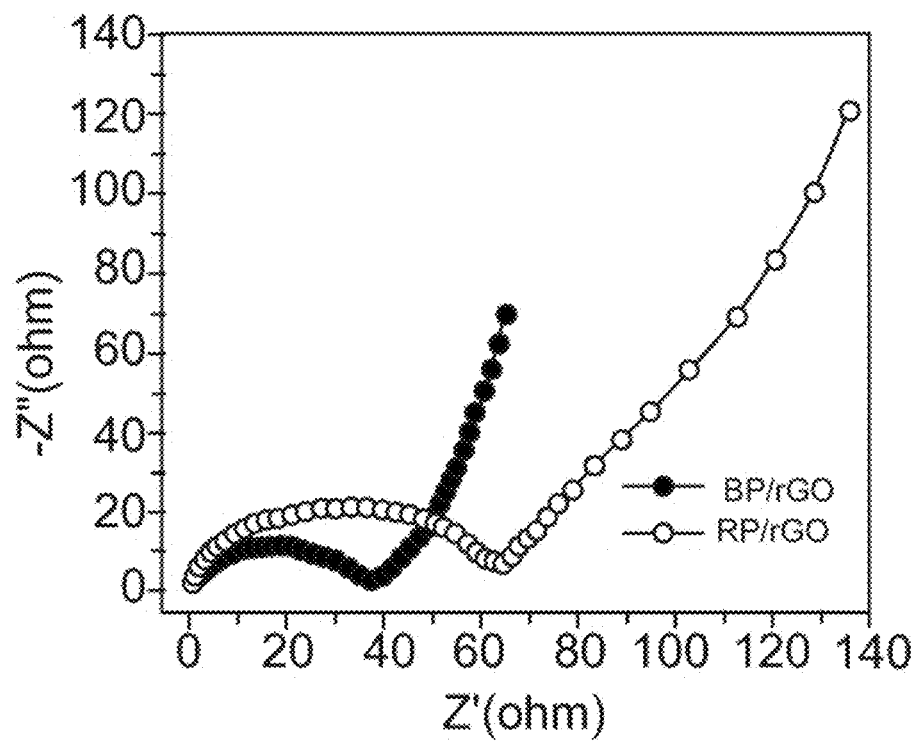

A second anode was tested in a rate capability protocol with five charge/discharge cycles at each current density, ranging from 0.1 to 60 A/g. The data in FIG. 16C show that the anode can deliver average capacities of 1460.1, 1401.2, 1377.6, 1339.7, 1277.8, 1123.78, 720.8 and 17.3 mAh/g at current densities of 0.1, 0.5, 1, 5, 10, 20, 40 and 60 A/g, respectively. Charge capacity stabilized after 40 cycles at ~1400 mAh/g after switching back to 0.1 A/g. Representative voltage profiles for charge and discharge at various current densities are given in FIG. 15E. The major sodiation and de-sodiation plateaus at 0.2-0.1 V and 0.6-0.7 V are evident for current density from 0.1 to 20 A/g. Although hysteresis between charge and discharge curves becomes significant at 40 A/g current density, the typical phosphorus potential plateaus persist and the anode can still deliver an adequate average charge capacity of 720.8 mAh/g, indicating the ultra-fast electronic and ionic transport of our BP/rGO layered composite anode. However, the highest current density tested, 60 A/g, exceeds the transport rates achievable and the anode can only deliver an average capacity of 17.3 mAh/g with a capacitor-like potential profile without any plateau.

In order to investigate the origin of the observed rate capability, we measured electrochemical impedance spectrum (EIS) curves for both RP/rGO and BP/rGO anodes, as seen in FIG. 16F. The Nyquist plots of both anodes yield a depressed semicircle in the high-to-medium frequency range (corresponding to the charge transfer impedance at the electrolyte/electrode interfaces) followed by a straight line at low frequency (corresponding to the bulk diffusion impedance in the composites). Both anodes present very small contact resistance at high frequency; the charge-transfer impedance value is 38Ω for the BP/rGO anode and 62Ω for the RP/rGO anode. The much smaller charge transfer impedance of BP/rGO arises from the higher electrical conductivity of BP. For the pressure-synthesized BP/rGO anode, the slope of the low frequency straight line is much higher than that of the RP/rGO anode, indicating higher sodium ion diffusivity in BP.

Figure 17:
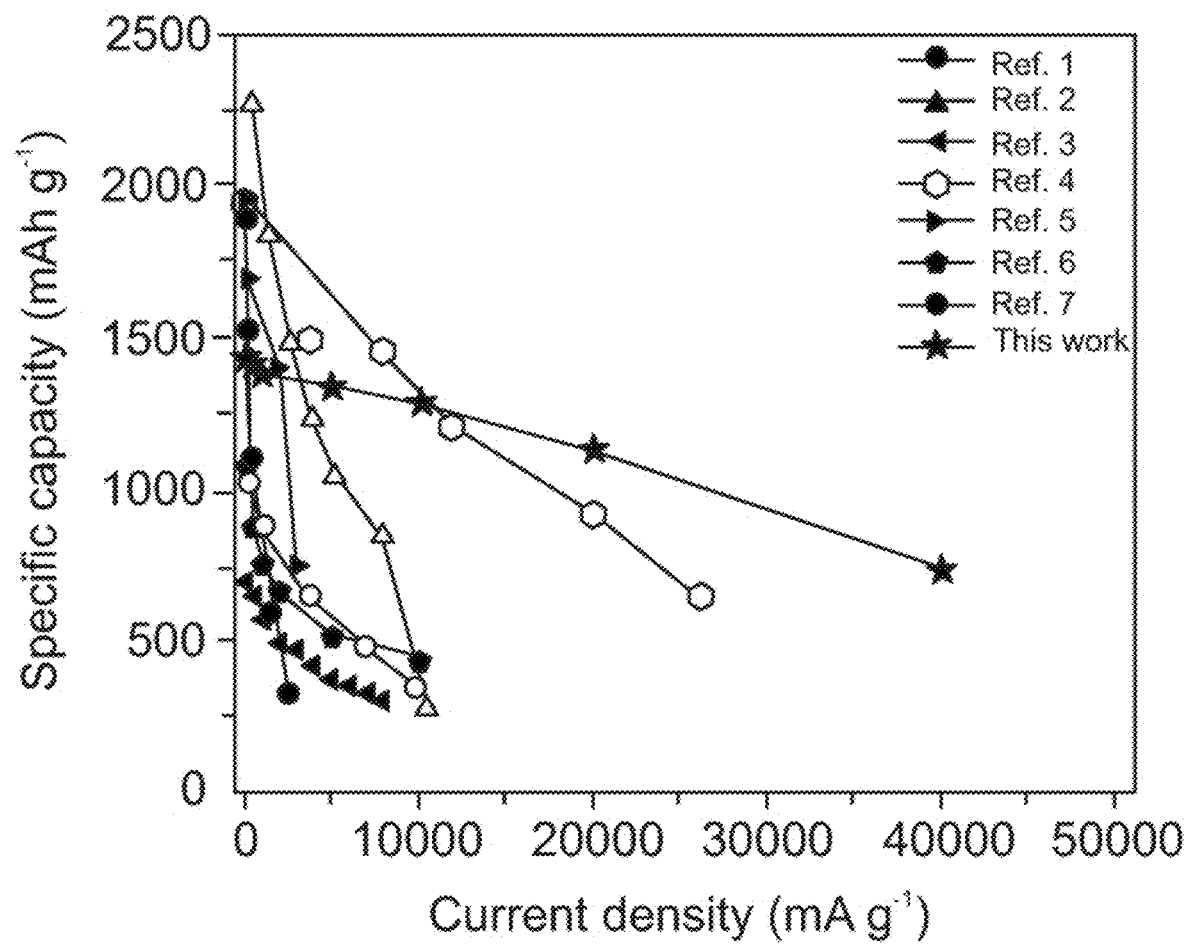
FIG. 17. Comparison of the rate performance between our work and other reported data for phosphorus-based anodes in sodium ion batteries. Note that in several cases the anode includes carbon black or binders that are not counted in the mass during calculation of current densities and specific capacities.

The excellent charge capacity, cyclic stability, electronic conductivity and ion transfer kinetics of our layered BP/rGO anode combine to make it a clear improvement over other phosphorus-based anodes reported recently; the rate performance of our anode is compared to published data from phosphorus anodes for sodium ion batteries in FIG. 17. despite the presence of 20 to 40 wt. % carbon black and binder that added inactive mass to the tested batteries in almost all of the references. Even so, our carbon-black-free and binder-free BP/rGO anode presents outstanding rate capability, especially in the high current-rate range. Most of anodes in the references showed significantly reduced capacity, below 500 mAh/g, at current density above 1 A/g. In comparison, our BP/rGO anode retains a capacity of 1377.6 mAh/g at 1 A/g. In addition, our anode maintains a capacity above 720.8 mAh/g all the way to 40 A/g current density; no comparable electrochemical performance at such high current rates has been reported from any other anode formulation for sodium-ion battery applications.

Post-Cycling Characterization:

To gain insight into phase and structural changes in the BP/rGO anode after repeated charge and discharge cycling, a fully de-sodiated anode that experienced 500 cycles of charge and discharge at 1 A/g current density was prepared for a second round of TEM and X-ray map analysis, as shown in FIG. 18. Since $NaClO_4$ was employed as the ion conducting salt in this work, none of the phosphorus signal in the map is derived from any electrolyte salt such as $NaPF_6$. The graphene sheets are apparent in FIGS. 18A, 18B and 18D, whereas the active phosphorus active is evident in the EDS mapping profile in FIG. 18C. It is clear that the graphene structure was maintained and remained wrapped around the active material after 500 deep cycles. This suggests that, as anticipated in the composite design, most of the phosphorus remained confined in the graphene network with negligible mass loss due to volume variation or peeling off. The BP/graphene layered structure appears sufficiently robust and favorable for usage over long cycles. Interestingly, most active material in the anode developed porosity, as shown in the TEM and STEM images (FIGS. 18A and 18B). The FFT image in the inset to FIG. 18A displays a prominent broad ring due to amorphous scattering, indicating that most of the polycrystalline BP was converted to amorphous phosphorus during the sodiation/de-sodiation cycling. This result agrees well with the XRD and Raman patterns of the post-cycling BP/rGO anode (FIGS. 14F and 14G), from which all the characteristic peaks of BP disappeared after cycling. The amorphization of the BP may result from the high concentration of sodium when the sample if fully sodiated, which results in a transition from intercalation to an alloying reaction and the breaking of P—P bonds in BP. An obvious question arises from these results: if the BP amorphizes during cycling, why does the cyclic performance of anodes prepared from BP continue to exceed that of anodes prepared from RP? We can only speculate at this point that phosphorus (like C, $H_2O$, and silicate glasses), is polyamorphous, and that amorphous P formed from BP retains structural and electronic advantages over RP or amorphous products formed from RP.

CONCLUSIONS

In summary, BP/rGO layered composite were synthesized by the application of pressure at room temperature and the resulting anodes present excellent cycling stability and rate capability. In particular, the high electronic conductivity of the active BP material and the graphene network facilitates ion transfer kinetics of BP/rGO anodes for fast charging/discharging and the graphene network provides robust mechanical support despite volume changes in the phosphorus, leading to stable electrochemical performance. After 500 deep cycles, the synthesized BP/rGO electrodes continue to provide ~1250 mAh/g charge capacity at 1 A/g charge/discharge current density and −640 mAh/g capacity at 40 A/g current density. The anode delivered average capacities of 1460.1, 1401.2, 1377.6, 1339.7, 1277.8, 1123.78 and 720.8 mAh/g at current densities of 0.1, 0.5, 1, 5, 10, 20 and 40 A/g, demonstrating the best high-rate phosphorus anode performance reported in the sodium-ion literature to date. Only at 60 A/g did charging rate exceed the kinetic capability of the anode. The superior cycling and rate performance and straightforward pressure synthesis of this carbon-black-free and binder-free electrode material represents a suitable strategy for practical application of phosphorus-based anodes in sodium-ion batteries.

Methods and Experimental

Graphene Oxide (GO) Preparation:

Graphene oxide (GO) water suspension was purchased from Graphene Supermarket (Graphene Laboratories Inc.), then was further treated according to a modified Hummers method to create more void space between the GO layers through exfoliation. $H_2SO_4$ and $H_3PO_4$ were mixed with a volume ratio of 9:1, then 1% wt. GO water suspension was added into the mixed acid solution. The mixture was heated to 50° C. and stirred for 10 hours, and then cooled with ice and an appropriate amount of added $H_2O_2$. After standing for one-hour, the supernatant liquid was removed and the rest of the mixture was diluted with water, repeating the procedure several times. The remaining solid material was then washed with water, HCl and ethanol several times, and then filtered and dried at 60° C. in air overnight.

RP/rGO Flash-Heat-Treatment Synthesis:

RP fine powder with 99% purity (Spectrum Chemical Mfg. Corp.) was dried at 90° C. to remove moisture and sieved to pass through a 30 μm mesh. The RP and GO powder precursors were placed in a ceramic boat with a RP/GO/RP three-layer structure with a ceramic cover on the boat. The mass ratio between RP and GO is 5:1. The boat with chemicals was loaded into a tube furnace under argon flow with a mixture of 5% hydrogen ($Ar/H_2$). The boat was first placed in the location outside the hot zone. After heating the furnace to 500° C., the boat was moved into the hot zone. Once P condensation on the inner surface of the quartz tube downstream of the hot zone was seen (~1 minute), the boat was moved back to the original position to cool down. The temperature of the boat was maintained at 290° C. overnight to convert potential white P to red P. The resulted RP/rGO composite was transferred into an Ar-filled glovebox, washed with methanol and dried accordingly.

RP/rGO Film Preparation:

the film was prepared through vacuum filtration. A small amount of RP/rGO powder was first added to the filtration equipment to obtain a thin layer of rGO network at the bottom. The RP/rGO composite was mixed with ethanol, and the mixture was added to form the main part of the film. In order to obtain a smooth film with excellent mechanical properties, the power of the vacuum pump and the material loading rate during the filtration process were carefully adjusted. The obtained film was pressed to increase the mechanical stability. The mass of the film electrodes was around 2 mg each. Then the film was transferred onto aluminum foil for the pressure synthesis.

Materials Preparation:

The flash-heat-treatment synthesis of the RP/rGO precursors is described is described in the previous sections. The RP/rGO precursor was assembled to a film through filtration, and then transferred onto 16 mm diameter alumina foil discs that serve as current collectors. The loading mass of the electrode material is ~2 mg. Then, 10 to 20 of these RP/rGO/Al discs were stacked together for RP to BP conversion. The discs were placed at the center of a 16 mm diameter hole drilled face-to-face through a 25 mm edge-length chromium-doped magnesium oxide octahedron, with the ends of the hole filled cell by two pryrophyllite rods. The assembly was placed in a 6-8 Kawai-type multi-anvil apparatus with pyrophyllite gaskets and 18 mm truncation edge length on the anvils and loaded in a 1000-ton hydraulic press. Using a room-temperature pressure calibration for this assembly based on the electrical resistivity transitions of Bi, the pressure was increased to 8 GPa over 10 hours, maintained for 6 hours, and then slowly released to ambient pressure over another 10 hours. The synthesized BP/rGO/Al discs were recovered and then directly employed as electrodes in the electrochemical tests.

Material Characterization:

The surface morphology and energy-dispersive X-ray maps of the samples were obtained with a JEOL JSM-7001 scanning electron microscope operating at 15 kV. Power X-ray diffraction (XRD) of materials at various stages of preparation and testing were obtained with Rigaku Ultima IV powder/thin-film diffractometer with Cu Kα radiation. Raman spectra were obtained with a Renishaw Raman spectrometer and 532 nm excitation laser and a laser spot size of ~1 A field emission transmission electron microscopy (JEOL JEM 2100F) was employed to obtain the TEM images and scanning transmission electron microscopy (STEM) images with EDS profiles. Samples were first dispersed in ethanol and then collected using carbon-film-covered copper grids for analysis. Thermogravimetric analysis (TGA) was carried out using a Netzsch STA at a heating rate of 1° C. $min^{-1}$ under $N_2$ atmosphere.

Electrochemical Measurements:

Electrochemical tests were conducted in CR2032 coin cells with Na metal as counter electrodes and 1 M $NaClO_4$ in dimethyl carbonate (DMC) electrolyte with 10% fluoroethylene carbonate (FEC) by volume as additive in order to form a strong and stable solid electrolyte interface (SEI) film. The electrodes were immersed in electrolyte for 24 hours before the battery cell assembling. All battery cells are assembled inside an argon-filled glovebox with both water and oxygen <0.1 ppm. In both cycling stability and rate capability tests, batteries were cycled in the voltage range of 0.01 to 1.5 V vs. $Na/Na^+$ at room temperature. All capacities were calculated based on the total mass of BP/rGO electrode material. In the cycling stability test of the BP/rGO anode at 40 A/g current density, the first sodiation process was performed with 1 A/g current density.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. Sun, J.; Lee, H.-W.; Pasta, M.; Sun, Y.; Liu, W.; Li, Y.; Lee, H. R.; Liu, N.; Cui, Y. Carbothermic Reduction Synthesis of Red Phosphorus-Filled 3D Carbon Material as a High-Capacity Anode for Sodium Ion Batteries. Energy Storage Mater. 2016, 4, 130-136; b
2. Zhou, J.; Liu, X.; Cai, W.; Zhu, Y.; Liang, J.; Zhang, K.; Lan, Y.; Jiang, Z.; Wang, G.; Qian, Y. Wet-Chemical Synthesis of Hollow Red-Phosphorus Nanospheres with Porous Shells as Anodes for High-Performance Lithium-Ion and Sodium-Ion Batteries. Adv. Mater., 2017, 29, 1700214;
3. Li, W.; Hu, S.; Luo, X.; Li, Z.; Sun, X.; Li, M.; Liu, F.; Yu, Y. Confined Amorphous Red Phosphorus in MOF-Derived N-Doped Microporous Carbon as a Superior Anode for Sodium-Ion Battery. Adv. Mater. 2017, 29, 1605820;
4. Sun, J.; Lee, H.-W.; Pasta, M.; Yuan, H.; Zheng, G.; Sun, Y.; Li, Y.; Cui, Y. A Phosphorene-Graphene Hybrid Material as a High-Capacity Anode for Sodium-Ion Batteries. Nat. Nanotech. 2015, 10, 980-985;
5. Xu, G.-L.; Chen, Z.; Zhong, G.-M.; Liu, Y.; Yang, Y.; Ma, T.; Ren, Y.; Zuo, X.; Wu, X.-H.; Zhang, X.; Amine, K. Nanostructured Black Phosphorus/Ketjenblack-Multi-walled Carbon Nanotubes Composite as High Performance Anode Material for Sodium-Ion Batteries. Nano Lett. 2016, 16, 3955-3965;
6. Zhang, Y.; Sun, W.; Luo, Z. Z.; Zheng, Y.; Yu, Z.; Zhang, D.; Yang, J.; Tan, H. T.; Zhu, J.; Wang, X.; Yan, Q.; Dou, S. X. Functionalized Few-Layer Black Phosphorus with Super-Wettability towards Enhanced Reaction Kinetics for Rechargeable Batteries. Nano Energy, 2017, 40, 576-586; and
7. Huang, Z.; Hou, H.; Zhang, Y.; Wang, C.; Qiu, X.; Ji, X. Layer-Tunable Phosphorene Modulated by the Cation Insertion Rate as a Sodium-Storage Anode. Adv. Mater. 2017, 29, 1702372.

What is claimed is:

1. A method for forming an anode of a sodium ion battery, the method comprising:
    a) placing a red phosphorus precursor and reduced graphene oxide powder into a reaction chamber; and
    b) heat treating the red phosphorus precursor and reduced graphene oxide powder under vacuum at a first temperature that vaporizes the red phosphorus precursor such that red phosphorus structures grow on the reduced graphene oxide powder as a reaction product; and
    c) maintaining the reaction product at a second temperature of 250 to 350° C. to convert white phosphorus to red phosphorus, c) cooling down reaction products formed in step b).

2. The method of claim 1 wherein the red phosphorus structures are nanostructures or microstructures.

3. The method of claim 1 wherein the red phosphorus structures are nanodots.

4. The method of claim 1 wherein first temperature is from about 550° C. to 650° C.

5. The method of claim 1 wherein the reduced graphene oxide powder includes reduced graphene oxide sheets or flakes.

6. A method for forming an anode of a sodium ion battery, the method comprising:
   a) placing a red phosphorus precursor and a graphene oxide precursor in a reaction chamber;
   b) establishing a reducing environment in the reaction chamber;
   c) heating the red phosphorus precursor and the graphene oxide precursor to a first temperature that is sufficient temperature to form a composite of red phosphorus and reduced graphene oxide as a reaction product, wherein red phosphorus deposition and graphene oxide reduction are completed simultaneously in a single-step heat treatment; and
   d) maintaining the reaction product at a second temperature of 250 to 350° C. to convert white phosphorus to red phosphorus.

7. The method of claim 6 wherein the first temperature is from about 400 to 550° C.

8. The method of claim 6 wherein the composite of red phosphorus and reduced graphene oxide includes nanostructures or microstructures.

9. The method of claim 6 wherein the reducing environment includes molecular hydrogen and an inert gas.

10. The method of claim 6 wherein the red phosphorus precursor and the graphene oxide precursor are arranged in a layered structure.

11. The method of claim 10 wherein the red phosphorus precursor and the graphene oxide precursor are arranged in the layered structure with a graphene precursor layer interposed between two red phosphorus layers.

12. A method for forming an anode of a sodium ion battery, the method comprising:
   a) arranging red phosphorus powder and graphene oxide powder in a layered structure having alternating layers of phosphorus powder and graphene oxide;
   b) heat treating the layered structure at a first temperature to form a red phosphorus/reduced graphene oxide combination film;
   c) placing the red phosphorus/reduced graphene oxide combination film on a substrate; and
   d) applying a pressure to the red phosphorus/reduced graphene oxide combination film that is sufficient to convert red phosphorus to black phosphorus such that a black phosphorus/reduced graphene oxide combination film is formed, the pressure being greater than or equal to about 5 GPa.

13. The method of claim 12 wherein the substrate is a metal sheet or metal foil that is used as a current collector in a battery.

14. The method of claim 12 wherein a plurality of red phosphorus/reduced graphene oxide combination film are stacked and then subject to the pressure.

15. The method of claim 12 wherein the pressure is applied with the red phosphorus/reduced graphene oxide combination film being at a second temperature of about 20 to 40 degrees C.

16. The method of claim 12 wherein the red phosphorus powder includes nanostructures or microstructures.

17. The method of claim 12 wherein first temperature is from about 450° C. to 650° C.

18. The method of claim 12 wherein graphene oxide powder includes reduced graphene oxide powder.

19. The method of claim 12 wherein the pressure is from about 5 to 12 GPa.

20. The method of claim 12 wherein phosphorus powder layers and graphene oxide layers are formed by filtration.

* * * * *